(12) United States Patent
Ikezawa et al.

(10) Patent No.: US 7,925,530 B2
(45) Date of Patent: Apr. 12, 2011

(54) SYSTEM FOR AND METHOD OF FACILITATING SALES ACTIVITIES, AND PROGRAM GENERATOR FOR GENERATING A PROGRAM FOR REALIZING THE SAME

(75) Inventors: Toyoji Ikezawa, Kanagawa (JP); Masao Koide, Kanagawa (JP); Yuji Matano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1160 days.

(21) Appl. No.: 11/567,097

(22) Filed: Dec. 5, 2006

(65) Prior Publication Data

US 2007/0094086 A1    Apr. 26, 2007

Related U.S. Application Data

(62) Division of application No. 10/101,860, filed on Mar. 21, 2002, now Pat. No. 7,305,352.

(30) Foreign Application Priority Data

| Mar. 21, 2001 | (JP) | 2001-081365 |
| Mar. 26, 2001 | (JP) | 2001-088813 |
| Mar. 27, 2001 | (JP) | 2001-089070 |
| Mar. 27, 2001 | (JP) | 2001-089121 |
| Mar. 27, 2001 | (JP) | 2001-090258 |

(51) Int. Cl.
*G06F 17/30* (2006.01)
(52) U.S. Cl. .......................................................... 705/10
(58) Field of Classification Search ................... 705/11, 705/10
See application file for complete search history.

(56) References Cited

U.S. PATENT DOCUMENTS 5,555,021 A    9/1996   Igarashi
5,930,764 A  * 7/1999   Melchione et al. ............. 705/10
(Continued)

FOREIGN PATENT DOCUMENTS

JP    7-230442    8/1995
(Continued)

OTHER PUBLICATIONS

Caudron "Sale-Force Automation Comes of Age: Sale-Force Automation Technology which has been around for years, is starting to drastically change the selling process", May 1996, Industry week V245, n10, Dialog file 13, Accession No. 0053192023526095.*

(Continued)

*Primary Examiner* — Romain Jeanty
(74) *Attorney, Agent, or Firm* — Oblon, Spivak, McClelland, Maier & Neustadt, L.L.P.

(57) ABSTRACT

In response to a request from a terminal, a sales-force server creates a page for providing information regarding sales activities, and sends the created page to the terminal. An e-mail server sends an e-mail including a word(s) registered in a first word table to a new addressee. The sales-force server provides the terminal with data corresponding to a predetermined number of sales tools whose usage frequency is equal to or greater than a predetermined value. The sales-force server provides a staff terminal used by at least one sales staff with target information, based on calling history regarding telephone calls from at least one customer to a call center. The sales-force server provides the staff terminal with a correction message, upon detection of error information included in utterance of the sales staff which corresponds to voice data created by the staff terminal.

15 Claims, 62 Drawing Sheets

U.S. PATENT DOCUMENTS

| | | | |
|---|---|---|---|
| 6,067,525 A * | 5/2000 | Johnson et al. ............ 705/10 |
| 6,332,154 B2 | 12/2001 | Beck et al. |
| 6,466,915 B1 | 10/2002 | Suzuki et al. |
| 6,525,747 B1 | 2/2003 | Bezos |
| 6,910,072 B2 | 6/2005 | Macleod Beck et al. |
| 6,963,826 B2 * | 11/2005 | Hanaman et al. ............ 703/2 |
| 6,963,850 B1 | 11/2005 | Bezos et al. |
| 7,082,407 B1 | 7/2006 | Bezos et al. |
| 2002/0120567 A1 | 8/2002 | Caplan et al. |
| 2002/0143609 A1 | 10/2002 | Magouirk et al. |
| 2002/0147625 A1 | 10/2002 | Kolke, Jr. |
| 2002/0152163 A1 | 10/2002 | Bezos et al. |
| 2005/0171861 A1 | 8/2005 | Bezos et al. |

FOREIGN PATENT DOCUMENTS

| | | |
|---|---|---|
| JP | 9-138768 | 5/1997 |
| JP | 10-011498 | 1/1998 |
| JP | 10-63690 | 3/1998 |
| JP | 10-124584 | 5/1998 |
| JP | 10-187320 | 7/1998 |
| JP | 11-346266 | 12/1999 |
| JP | 2000-113053 | 4/2000 |
| JP | 2000-242713 | 9/2000 |
| JP | 2001-22835 | 1/2001 |

OTHER PUBLICATIONS

Dialog "Conjoint Field.First 2.0 Wins Prestigious Crosswords 2001 A-list Award; Portal Solution Maximizes Synergy Between Sales and Marketing".*

Marshall et al "The Current State of Sales Force Activities", Jan. 1999, Industrial Marketing Management, vol. 28, Issue 1, pp. 87-98.*

Yoshida, Takuya. "Managing Individuals of One-Million-Scale: New Product of New Database Marketing", Nikkei Computer, Nikkei Business Publications, Inc., Nov. 11, 1996: vol. 404: pp. 84 to 86.

Yoshida, Ikuyo, "Application Development Over 3400 from General Affairs Manuals to Electronic Draft Proposal", Aug. 13, 1998, No. 22, pp. 52-54, Maeda Corp., Lotus Notesmagazine, Japan, Softbank Corp.

Nakamori, Motoo., et al. "Put in Practice by SI Vendor, CSI! Methods for e-CRM Development/Operation, 18 Tips for practical e-CRM System Explained in the Form of Questions and Answers", Aug. 1, 2000 vol. 5 No. 8, pp. 34-55, Notes/Domino Magazines, Japan, Softbank Publishing Corp.

* cited by examiner

FIG. 5

| 103 | 104 | 105 |
|---|---|---|
| buy | best | product |
| sell | good | service |
| suggest | extra | price |
| give | special | cost |
| ⋮ | ⋮ | ⋮ |

| manufacture | plan | want | rokuro ueno |
|---|---|---|---|
| industrial | project | expect | shichiro tanaka |
| factory | trial | appreciate | hachiro nakano |
| produce | regulation | glad | kuro nogami |
| ⋮ | ⋮ | ⋮ | ⋮ |

Columns: 106, 107, 108, 109 — table 16

DATE :

①OFFICE: SAPPORO OFFICE

②SALES STAFF: ICHIRO YAMAKAWA

③MATURITY LEVEL : 5

④CUSTOMER INFORMATION:
COMPANY: ○○ CORPORATION
SECTION: ○○ SECTION
PERSON TO CONTACT: ICHIRO KAWADA
PHONE NUMBER: ○○-○○○○-○○○○

⑤PRODUCT NAME: AAA1

⑥UNIT PRICE: ××, ×××

⑦NUMBER OF PRODUCT(S) ORDERED: ××

⑧SUCCESS POSSIBILITY: 3

⑨IT PROGRESSIVE LEVEL: 2

| MATURITY LEVEL |
| PRODUCT NAME |
| INSTRUCTION MATTER |

| MATURITY LEVEL |
| PRODUCT NAME |
| SOURCE DATA |

FIG. 51

| | 156 | 99 | 157 |
| --- | --- | --- | --- |
| UNDERSTANDING OF PRODUCT | | AAA | |
| PRESENTATION ABILITY | | BB | |
| APPROACHING ABILITY | | C | |
| SUGGESTING ABILITY | | BBB | |
| ⋮ | | ⋮ | |
| TOTAL | | B | |

SYSTEM FOR AND METHOD OF FACILITATING SALES ACTIVITIES, AND PROGRAM GENERATOR FOR GENERATING A PROGRAM FOR REALIZING THE SAME

CROSS REFERENCE TO RELATED APPLICATIONS

This application is a Divisional Application of, and claims the benefit of priority under 35 U.S.C. §120 from, U.S. application Ser. No. 10/101,860, filed Mar. 21, 2002, and claims the benefit of priority under 35 U.S.C. §119 from Japanese Patent Applications Nos. 2001-81365 filed on Mar. 21, 2001, 2001-88813 filed on Mar. 26, 2001, 2001-89121 filed on Mar. 27, 2001, 2001-89070 filed on Mar. 27, 2001, and 2001-90258 filed on Mar. 27, 2001. The disclosures of the above identified applications are incorporated herein by reference.

BACKGROUND OF THE INVENTION

1. Field of the Invention

The present invention relates to a computer network system for facilitating sales activities.

2. Description of the Related Art

IT (Information Technology) has become common in various sales processes. For example, a sales staff may sometimes transmit and receive an e-mail including information a business transaction, to and from a customer. To acquire data representing his/her schedule, the sales staff may access a corresponding database using a portable terminal, etc. The sales processes are computerized, thereby contributing to high efficiency of sales activities.

It should be mentioned that the sales abilities of each sales staff differ from any other sales staffs'. Hence, to desirably facilitate the sales activities, a system for sharing various information regarding the sale activities is demanded.

Further, in the sales activities, there are employed various sales tools, such as flyers, posters, specifications, price lists, voice messages, image messages, etc. Providing of useful sales tools in the sales activities are desirable from some aspects of energy saving, cost reduction, giving better image of a corresponding corporation.

SUMMARY OF THE INVENTION

The present invention has been made in consideration of the above. It is accordingly an object of the present invention to provide a system for appropriately providing information regarding sales activities, to facilitate the sales activities to be performed by a sales staff of a company, etc.

In order to attain the above object, according to the first aspect of the present invention, there is provided a computer network system for facilitating a plurality of sales activities to be performed by at least one sales staff, comprising:

a data input device which inputs a plurality of data components representing information regarding the plurality of sales activities in a business transaction currently being carried out between the at least one sales staff and at least one customer;

a database which sorts the plurality of data components input by the data input device, based on a plurality of maturity levels each corresponding to a progressive level of the business transaction, and stores the plurality of sorted data components;

a request-input device which inputs a request for requesting at least one of the plurality of data components stored in the database, and inputs also a corresponding maturity level of the business transaction;

a page creator which reads out at least one of the plurality of data components stored in the database, in order to create a page for providing the information regarding at least one of the plurality of sales activities, in response to the request input by the request-input device; and a page output device which displays the page created by the page creator.

According to this invention, the page creator can create a page for providing information regarding the plurality of sales activities, using the data components stored in the database, in response to a request input by the request-input device. The page created by the page creator is displayed by the page output device. As a result, the information regarding the sales activities is provided from the page output device, thereby successfully facilitating the sales activities in the business transaction.

The plurality of data components input by the data input device may represent instruction information for instructing the at least one sales staff in sales.

Each of the plurality of data components input by the data input device may be a source for forming a report or document regarding the plurality of sales activities.

In this structure, the page displayed by the page output device may include at least one field, for displaying an image corresponding both to the request input by the request input device and the maturity level of the business transaction.

The computer network system may further comprise a memo-data creator which creates an information component which has been formed by digitizing information regarding a business item memo, and wherein the information component created by the memo-data creator is stored in the database, and is read out therefrom by the page creator so as to create a page for providing the business item memo, in response to a request input by the request-input device.

The data input device may input history information regarding one or more previous business transactions made with the at least one customer, repairs of a predetermined product purchased by the at least one customer before, and an inquiry from the at least one customer; and the database may store the history information input by the data input device; and the page creator may read out the history information stored in the database to create a page for providing the history information, in response to a request input by the request-input device.

In this structure, the page to be displayed by the page output device may include at least one field for displaying text corresponding to a request input by the request input device.

The computer network system may further comprise an e-mail transmitter which transmits an e-mail including new history information, in a case where the new history information is stored in the database.

The e-mail transmitter may determine at least one addressee of the e-mail to be transmitted, in accordance with a proportion of a total number of rejection messages representing that a corresponding e-mail has been rejected to a total number of e-mails transmitted in advance; and the proportion may be calculated in association with each of a plurality of e-mail receivers registered in a mailing list.

The data input device may be included in a first terminal used by the at least one sales staff or a manager of the at least one sales staff; and the request-input device and the page output device may be included in a second terminal installed in an office for selling products.

In order to attain the above object, according to the second aspect of the present invention, there is provided a computer network system for facilitating a plurality of sales activities to be performed by at least one sales staff, comprising:

an e-mail storage section which stores a plurality of e-mails;

a detector which detects an e-mail, regarding at least one of the plurality of sales activities in a business transaction to be carried out between the at least one sales staff and at least one customer, and stored in the e-mail storage section; and an e-mail sender which transmits the e-mail detected by the detector to a new addressee.

According to this invention, the e-mail sender may send the detected e-mail regarding the business transaction to a new address. As a result, the information regarding the business transaction can be distributed to a large number of people through the e-mail, and thus providing the information regarding the sales activities.

In this structure, the detector may search the plurality of e-mails for at least one word corresponding to at least one of the plurality of sales activities in the business transaction.

The e-mail sender may determine at least one addressee of an e-mail, in accordance with an e-mail importance value of the e-mail detected by the detector.

The computer network system may further comprise a customer list which indicates a customer importance value of the at least one customer; and a product list which indicates a product importance value of at least one product, and wherein the e-mail sender refers to the customer list and the product list, thereby specifying the e-mail importance value of the e-mail.

The computer network system may further comprise a mailing list which stores a plurality of e-mail addresses in association with their address importance values, and wherein the e-mail sender calculates a sum of the customer importance value corresponding to the at least one customer shown in the e-mail detected by the detector and the product importance value corresponding to the at least one product shown in the e-mail detected by the detector, and selects, from the mailing list, one of the e-mail addresses which corresponds to an address importance value which is smaller than the calculated sum.

The computer network system may further comprise a word table which stores a plurality of words corresponding to e-mail addresses respectively assigned to a plurality of sections in a company that the at least one sales staff belongs to, and wherein the e-mail sender searches the e-mail detected by the detector for at least one word stored in the word table, and selects, from the word table, at least one e-mail address of an e-mail corresponding to the at least one word shown in the e-mail.

In this structure, in a case where a proportion, calculated in association with each of the words stored in the word table, of a total number of rejection messages representing rejection of a corresponding e-mail to a total number of previously-transmitted e-mails is equal to or greater than a predetermined threshold value, the e-mail sender deletes at least one word corresponding to the calculated proportion.

The e-mail to be sent by the e-mail sender may include an e-mail message of the e-mail detected by the detector and also one of a plurality of maturity levels which corresponds to a progressive level of the business transaction corresponding to the detected e-mail.

In order to attain the above object, according to the third aspect of the present invention, there is provided a computer network system for facilitating a plurality of sales activities to be performed by at least one sales staff, comprising:

a tool generator which generates a plurality of sales tools used in an office for selling products;

a database which sorts data used by the tool generator for generating the plurality of sales tools, based on a plurality of maturity levels corresponding to a progressive level of a business transaction currently being carried out between the at least one sales staff and at least one customer and also on products, and stores the sorted data;

a terminal which is installed in the office, and supplies the tool generator with data acquired from the database; and a sales-force server comprising a tool manager which transmits the data stored in the database to the terminal, a plurality of tool lists which are prepared in accordance with one of the plurality of maturity levels which corresponds a progressive level of the business transaction, and store data for managing the plurality of sales tools, a data retriever which acquires information representing a total number of sales tools provided to the at least one customer, and updates the plurality of tool lists, and a verification processor which verifies validity of the sales tools provided to the at least one customer, based on the data stored in each of the plurality of tool lists.

According to this invention, the tool manager supplies the data for generating the sales tools, to the terminal from the database. In addition, the verification processor can verify the validity of each of the sales tools, based on the tool list updated by the data retriever. Accordingly, an advanced system for generating the sales tools, through the data communications, can be realized.

The data retriever may calculate a usage frequency of each of the plurality of sales tools, the usage frequency indicating a proportion of a total number of sales tools generated by the tool generator to a total number of sales tools corresponding to the data transmitted by the tool manager.

In this case, the usage frequency calculated by the data retriever may be stored in each of the plurality of tool lists, in association with each of the plurality of sales tools therein.

The verification processor may delete data representing any of the plurality of sales tools which corresponds to the usage frequency smaller than a predetermined threshold value.

The verification processor may assign a numerical number to each of the plurality of sales tools corresponding to the data stored in the database, in descending order of the usage frequency calculated by the data retriever.

The tool manager may transmit data corresponding to one or more sales tools whose usage frequency is equal to or greater than a predetermined value.

The terminal may create customer-management data representing a state in which the business transaction is carried out between the at least one customer and the at least one sales staff; and the tool manager may transmit the data stored in the database to the terminal, upon reception of the customer-management data created by the terminal.

The customer-management data may represent the maturity level of the business transaction.

The tool manager may transmit, to the terminal, data representing at least one sales tool corresponding to one maturity level which is higher by one level than the maturity level shown in the received customer-management data.

The computer network system may further comprise a customer-data storage which stores the customer-management data created by the terminal, in a state wherein the customer-management data is sorted by maturity level and product.

In order to attain the above object, according to the fourth aspect of the present invention, there is provided a computer network system for facilitating a plurality of sales activities to be performed by at least one sales staff in a business transaction carried out between the at least one sales staff and at least one customer, comprising a first terminal which is used by the at least one customer;

a second terminal which is used by the at least one sales staff;

a database which stores customer-management data representing information regarding the at least one customer;

a first server which provides the first terminal with at least one Web page, upon accessing of the first terminal toward the first server, stores access-history information representing access history of the first terminal, in an access-history storage; and a second server which receives the access-history information from the first server, acquires customer-management data corresponding to the at least one customer specified in the access-history information, from the database, creates target information, based on the access-history information and the customer-management data, and provides the second terminal with the created target information, thereby informing the at least one sales staff about a most suitable time and way to carry out the business activities toward the at least one customer.

According to this invention, the second server creates target information, based on the access-history information received from the first server and the customer-management data retrieved from the database. The target information is provided to the second terminal used by the sales staff. As a result, the sales staff can know the most appropriate time and way to carry out the sales activities in the business transaction.

In this structure, the database may store transaction-history information regarding the business transaction between the at least one sales staff and the at least one customer; and the second server may acquire transaction-history information corresponding to the at least one customer specified in the access-history information, from the database, in order to create the target information.

It is preferred that the second server analyze behavior of the at least one customer, based on the access-history information, the customer-management data and the transaction-history information, in order to create the target information.

The first server may create the access-history information corresponding to the at least one customer, and sends the created information to the second server in response to an instruction for making contact with the at least one sales staff from the first terminal.

The computer network system may further comprise a call center which:

executes at least one task regarding a telephone call from the at least one customer; and stores call-history information including an inquiry from the at least one customer, in a call-history storage, and wherein the second server receives the call-history information from the call center, acquires customer-management data corresponding to the at least one customer specified in the call-history information, from the database, and create the target information based on the call-history information and the customer-management data.

The target information created by the second server may include data representing a channel through which the at least one sales staff makes contact with the at least one customer.

In order to attain the above object, according to the fifth aspect of the present invention, there is provided a computer network system for facilitating a plurality of sales activities to be performed by at least one sales staff in a business transaction carried out between the at least one sales staff and at least one customer, comprising:

a terminal which is used by the at least one sales staff;

a database which stores customer-management data representing information regarding at least one customer;

a call center which executes at least one task regarding a telephone call from the at least one customer, storing call-history information including an inquiry from the at least one customer, in a call-history storage; and a server which receives the call-history information from the call center, acquires customer-management data corresponding to the at least one customer specified in the call-history information, from the database, create the target information based on the call-history information and the customer-management data, and provides the terminal with the target information, thereby informing the at least one sales staff about a most suitable time and way to carry out the business activities toward the at least one customer.

In this structure, the database may store transaction-history information regarding the business transaction to be carried out between the at least one sales staff and the at least one customer; and the server may acquire the transaction-history information corresponding to the at least one customer specified in the call-history information, from the database, in order to create the target information.

It is preferred that the server analyze customer behavior based on the call-history information, the customer-management data and the transaction-history information, in order to create the target information.

The call center may create the call-history information of the at least one customer, and sends the created call-history information to the server upon reception of a request for asking the at least one sales staff to visit the at least one customer from the at least one customer.

The target information created by the server may include data representing a channel through which the at least one sales staff makes contact with the at least one customer.

In order to attain the above object, according to the sixth aspect of the present invention, there is provided a computer network system for facilitating a plurality of sales activities to be performed by at least one sales staff in a business transaction to be achieved between the at least one sales staff and at least one customer, comprising:

a terminal including an input device which encodes a voice signal, in order to create voice data, and an output device; and a sales-force server including
a voice recognizer which detects error information included utterance of the at least one sales staff which corresponds to the voice data created by the input device, and
a message creator which creates a correction message, in order to output correction information from the output device, in a case where the error information is detected by the voice recognizer.

The computer network system may further comprise
a database which stores information items which respectively represent the sales activities to be performed by the at least one sales staff, one or more business items, at least one product, and customer needs, in association with each other, and
wherein the message creator reads out information corresponding to a recognition result of the voice recognizer from the database, and sends information regarding the voice data created by the input device to the terminal, thereby outputting the sent information on the output device.

The computer network system may further comprise:
a converter which converts the voice data created by the input device into text data;
a storage controller which stores the text data output from the converter into the database; and
a solution provider which determines at least one business solution based on the text data output from the converter, and causes the output device of the terminal to output information representing the determined business solution.

The computer network system may further comprise a skill processor which evaluates skill of the at least one sales staff based on the recognition result of the voice recognizer, and causes the output device of the terminal device to output information regarding a material or training for the detected skill of the sales staff.

The computer network system may further comprise:
an advice provider; and
a skill processor which evaluates skill of the at least one sales staff based on the recognition result of the voice recognizer, and causes the advice provider to output an advice corresponding to the evaluated skill.

In order to attain the above object, according to the seventh aspect of the present invention, there is provided a method of facilitating a plurality of sales activities to be performed by at least one sales staff in a business transaction to be achieved between the at least one sales staff and at least one customer, comprising the steps of:
sorting a plurality of data components representing information regarding a plurality of sales activities, based on a plurality of maturity levels corresponding to a progressive level of the business transaction, and storing the sorted data components in a database;
reading at least one of the plurality of data component stored in the database, in order to create a page showing information regarding the sales activities, in response to a request, which is sent from a terminal through a network and which corresponds to the at least one data component; and
displaying the page corresponding to the at least one data component read out from the database, on the terminal having sent the request therefor.

Each of the plurality of data components may represent instruction information for instructing the at least one sales staff in sales.

Each of the plurality of data components may be a source for forming a report or document regarding the sales activities.

The method may further comprise the steps of:
storing an information component which has been formed by digitizing information regarding a business item memo, in the database;
reading the information component stored in the database in order to create the page for providing the business item memo, in response to a request input from the terminal; and
displaying the page corresponding to information component read out from the database, on the terminal from which the request has been transmitted.

The method may further comprise the steps of:
storing, in the database, history information regarding one or more previous business transaction made with the at least one customer, repairs of a predetermined product purchased by the at least one customer before, and an inquiry from the at least one customer;
reading the history information stored in the database in order to create the page for providing the history information, in response to a request sent form the terminal through a network; and
displaying the page corresponding the history information read out from the database, on the terminal from which the request has been transmitted.

The method may further comprise the step of
sending an e-mail including new history information, in a case where the new history information is stored in the database.

The method may further comprise the step of
determining at least one addressee of the e-mail to be transmitted, in accordance with a proportion of a total number of rejection messages representing that a corresponding e-mail has been rejected to a total number of e-mails transmitted in advance, and
wherein the proportion is calculated in association with each of a plurality of e-mail receivers registered in a mailing list.

In order to attain the above object, according to the eighth aspect of the present invention, there is provided a method of facilitating a plurality of sales activities to be performed by at least one sale staff, comprising the steps of:
storing a plurality of e-mails;
detecting an e-mail, regarding at least one of the plurality of sales activities in a business transaction to be carried out between the at least one sales staff and at least one customer, and included in the plurality of e-mails; and
transmitting the detected e-mail to a new addressee.

The method may further comprise the step of
searching the plurality of e-mails for at least one word corresponding to the at least one of the plurality of sales activities in the business transaction.

The method may further comprise the steps of:
determining an e-mail importance value of the e-mail, by referring to a customer list which indicates a customer importance value of the at least one customer and a product list which indicates a product importance value of at least one product; and
determining at least one addressee of the e-mail in accordance with its e-mail importance value.

The method may further comprise the steps of:
preparing a mailing list which stores a plurality of e-mail addresses in association with their address importance values;
calculating a sum of the customer importance value corresponding to the at least one customer shown in the e-mail detected at the detecting step and the product importance value corresponding to the at least one product shown in the e-mail detected at the detecting step, and selecting, from the mailing list, one of the e-mail addresses which corresponds to an address importance value which is smaller than the calculated sum.

The method may further comprise the steps of:

preparing a word table which stores a plurality of words corresponding to e-mail addresses respectively assigned to a plurality of sections in a company;

searching the e-mail detected at the detecting step for at least one word stored in the word table; and selecting, from the word table, at least one e-mail address of an e-mail corresponding to the at least one word shown in the e-mail.

The method may further comprise the step of, in a case where a proportion, calculated in association with each of the words stored in the word table, of a total number of rejection messages representing rejection of a corresponding e-mail to a total number of previously-transmitted e-mails is equal to or greater than a predetermined threshold value, deleting at least one word corresponding to the calculated proportion.

In order to attain the above object, according to the ninth aspect of the present invention, there is provided a method of facilitating a plurality of sales activities to be performed by at least one sales staff in a business transaction to be achieved between the at least one sales staff and at least one customer, comprising:

storing data for generating a plurality of sale tools in a database;

sending the data stored in the database to a terminal installed in an office for selling products to the at least one customer, in order to generate the sales tools;

acquiring, from the terminal, information representing a total number of sales tools provided to the at least one customer; and verifying validity of the sales tools provided to the at least one customer, based on the acquired information.

The method may further comprise the step of calculating a usage frequency indicating a proportion of a total number of sales tools provided to the at least one customer to a total number of sales tools corresponding to the data transmitted to the terminal, in order to verify validity of each of the sales tools.

The method may further comprise the steps of:

assigning a numerical number to each of the plurality of sales tools corresponding to the data stored in the database, in descending order of the usage frequency, in order to verify validity of each of the plurality of sales tools;

deleting data representing any of the plurality of sales tools which corresponds to the usage frequency smaller than a predetermined threshold value, from the database; and transmitting data corresponding to one or more sales tools whose usage frequency is equal to or greater than a predetermined value, to the terminal.

The method may further comprise the step of transmitting, to the terminal, the data stored in the database, upon reception of customer-management data representing both one of a plurality of maturity levels indicating a progressive level of the business transaction and also a state in which the business transaction is carried out between the at least one customer and the at least one sales staff.

The method may further comprise the step of transmitting, to the terminal, data representing at least one sales tool corresponding to one maturity level which is higher by one level than a maturity level shown in the customer-management data.

In order to attain the above object, according to the tenth aspect of the present invention, there is provided a method of facilitating a plurality of sales activities to be performed by at least one sales staff in a business transaction carried out between the at least one sales staff and at least one customer, the method comprising the steps of:

storing customer-management data representing information regarding the at least one customer, in a database;

providing a first terminal with at least one Web page, upon accessing of the first terminal used by the at least one customer;

acquiring the customer-management data corresponding to access-history information representing access history of the first terminal, from the database;

creating target information, based on the access-history information and the customer-management data; and providing a second terminal with the created target information, thereby informing the at least one sales staff about a most suitable time and way to carry out the business activities toward the at least one customer.

The target information may include data representing a channel through which the at least one sales staff makes contact with the at least one customer.

The method may further comprise the steps of:

storing transaction-history information regarding the business transaction;

acquiring transaction-history information corresponding to the access-history information, from the database, in order to create the target information; and analyzing behavior of the at least one customer, based on the access-history information, the customer-management data and the transaction-history information.

In order to attain the above object, according to the eleventh aspect of the present invention, there is provided a method of facilitating a plurality of sales activities to be performed by at least one sales staff in a business transaction to be carried out between the at least one sales staff and at least one customer, the method comprising the steps of:

storing customer-management data representing information regarding the at least one customer, in a database;

acquiring the customer-management data corresponding to call-history information including an inquiry from the at least one customer to a call center, in the database;

creating target information, based on the call-history information and the customer-management data; and providing a terminal used by the at least one sale staff with the created target information, thereby informing the sales staff about a most suitable time and way to carry out the business activities toward the at least one customer.

The target information may include data representing a channel through which the at least one sales staff makes contact with the at least one customer.

The method may further comprise the steps of:

storing transaction-history information regarding the business transaction to be carried out with the at least one customer, in the database;

acquiring the transaction-history information corresponding to the call-history information from the database, in order to create the target information; and analyzing behavior of the at least one customer, based on the call-history information, the customer-management data and the transaction-history information.

In order to attain the above object, according to the twelfth aspect of the present invention, there is provided a method of facilitating a plurality of sales activities to be performed by at least one sales staff in a business transaction to be achieved between the at least one sales staff and at least one customer, comprising the steps of:

encoding a voice signal, thereby creating voice data;

detecting error information included in utterance of the at least one sales staff which corresponds to the voice data created at the encoding step;

creating a correction message, thereby informing the at least one sales staff of the correction message.

The method may further comprise the steps of:

storing, in a database, information items which respectively represent the sales activities to be performed by the at least one sales staff, one or more business items, at least one product, and customer needs, in association with each other;

acquiring information regarding the voice data from the database; and sending the acquired information regarding the voice data to a staff terminal used by the at least one sales staff, thereby outputting the sent information.

The method may further comprise the steps of:

converting the voice data into text data;

storing the text data in the database;

determining at least one business solution based on the text data; and causing the staff terminal to output information representing the determined business solution.

The method may further comprise the steps of:

evaluating skill of the at least one sales staff based on the voice data; and causing the staff terminal to output information regarding a material or training for the detected skill of the sales staff.

The method may further comprise the steps of:

evaluating skill of the at least one sales staff based on the voice data; and causing a manager terminal used by a manager of the at least one sales staff to output an advice corresponding to the evaluated skill.

In order to attain the above object, according to the thirteenth aspect of the present invention, there is provided a computer program generator for facilitating a plurality of sales activities to be performed by at least one sales staff in a business transaction to be achieved between the at least one sales staff and at least one customer, in a computer network system, the generator comprising the instructions for:

sorting a plurality of data components representing information regarding the plurality of sales activities, based on a plurality of maturity levels indicating a progressive level of the business transaction, and storing the sorted data components in a database;

reading at least one of the plurality of data components stored in the database in order to create a page for providing the information regarding the sales activities, in response to a request which is sent from a terminal through a network and which corresponds to the at least one of the plurality of data components stored in the database; and displaying the page corresponding to the at least one of the plurality of data components which is read out from the database, on the terminal having sent the request therefor.

Each of the plurality of data components may represent instruction information for instructing the at least one sales staff in sales.

Each of the plurality of data components may be a source for forming a report or document regarding the sales activities.

The program generator may further comprise instructions for:

storing an information component which has been formed by digitizing information regarding a business item memo, in the database;

reading the information component stored in the database so as to create a page for providing the business item memo, in response to a request sent from the terminal through a network;

displaying the page corresponding to the read information component from the database, on the terminal having sent the request therefor.

The program generator may further comprise the instructions for:

storing, in the database, history information regarding one or more previous business transactions made with the at least one customer, repairs of a predetermined product purchased by the at least one customer before, and an inquiry from the at least one customer;

reading the history information stored in the database to create a page for providing the history information, in response to a request sent from the terminal through a network; and displaying the page corresponding to the history information read out from the database, on the terminal having sent the request therefor.

The program generator may further comprise the instruction for transmitting an e-mail including the history information, upon storage of new history information in the database.

The program generator may further comprise the instruction for determining at least one addressee of the e-mail to be transmitted, in accordance with a proportion of a total number of rejection messages representing that a corresponding e-mail has been rejected to a total number of e-mails transmitted in advance, the proportion being calculated in association with each of a plurality of e-mail receivers registered in a mailing list.

In order to attain the above object, according to the fourteenth aspect of the present invention, there is provided a computer program generator for facilitating a plurality of sales activities to be performed by at least one sales staff in a business transaction to be carried out between the at least one sales staff and at least one customer, the program generator comprising the instructions for:

storing a plurality of e-mails;

detecting an e-mail, regarding at least one of the plurality of sales activities in a business transaction, from the plurality of stored e-mails; and transmitting the detected e-mail to a new addressee.

The program generator may further comprise the instruction for:

searching the plurality of e-mails for at least one word corresponding to at least one of the plurality of sales activities in the business transaction, in order to find out one of the plurality of e-mails which corresponds to the business transaction.

The program generator may further comprise the instructions for:

determining an e-mail importance value of the e-mail, by referring to a customer list which indicates a customer importance value of the at least one customer and a product list which indicates a product importance value of at least one product; and determining at least one addressee of the e-mail in accordance with its e-mail importance value.

The program generator may further comprise the instructions for:

preparing a mailing list which stores a plurality of e-mail addresses in association with their address importance values;

calculating a sum of the customer importance value corresponding to the at least one customer shown in the detected e-mail and the product importance value corresponding to the at least one product shown in the detected e-mail, and selecting, from the mailing list, one of the e-mail addresses which corresponds to an address importance value which is smaller than the calculated sum.

The program generator may further comprise the instructions for:

preparing a word table which stores a plurality of words corresponding to e-mail addresses respectively assigned to a plurality of sections in a company;

searching the e-mail regarding the business transaction for at least one word stored in the word table; and selecting, from the word table, at least one e-mail address of an e-mail corresponding to the at least one word shown in the e-mail.

The program generator may further comprise the instruction for deleting at least one word corresponding to a proportion which is calculated in association with each of the words stored in the word table, in a case where the proportion of a total number of rejection messages representing rejection of a corresponding e-mail to a total number of previously-transmitted e-mails is equal to or greater than a predetermined threshold value.

In order to attain the above object, according to the fifteenth aspect of the present invention, there is provided a program generator for facilitating a plurality of sales activities to be performed by at least one sales staff in a business transaction between the at least one sales staff and at least one customer, the program generator comprising the instructions for:

storing data for generating a plurality of sale tools in a database;

sending the data stored in the database to a terminal installed in an office for selling products to the at least one customer, in order to generate the sales tools;

acquiring, from the terminal, information representing a total number of sales tools provided to the at least one customer; and verifying validity of the sales tools provided to the at least one customer, based on the acquired information.

The program generator may further comprise the instructions for calculating a usage frequency indicating a proportion of a total number of sales tools provided to the at least one customer to a total number of sales tools corresponding to the data transmitted to the terminal, in order to verify validity of each of the sales tools.

The program generator may further comprise the instructions for:

assigning a numerical number to each of the plurality of sales tools corresponding to the data stored in the database, in descending order of the usage frequency, in order to verify validity of each of the plurality of sales tools;

deleting data representing any of the plurality of sales tools which corresponds to the usage frequency smaller than a predetermined threshold value, from the database; and transmitting data corresponding to one or more sales tools whose usage frequency is equal to or greater than a predetermined value, to the terminal.

The program generator may further comprise the instructions for:

transmitting, to the terminal, the data stored in the database, upon reception of customer-management data representing both one of a plurality of maturity levels indicating a progressive level of the business transaction and also a state in which the business transaction is carried out between the at least one customer and the at least one sales staff.

The program generator may further comprise the instruction for transmitting, to the terminal, data representing at least one sales tool corresponding to one maturity level which is higher by one level than a maturity level shown in the customer-management data.

In order to attain the above object, according to the sixteenth aspect of the present invention, there is provided a program generator for facilitating a plurality of sales activities to be performed by at least one sales staff in a business transaction between the at least one sales staff and at least one customer, in a computer network system, the program generator comprising the instructions for:

storing customer-management data representing information regarding the at least one customer, in a database;

providing a first terminal with at least one Web page, upon accessing of the first terminal used by the at least one customer;

acquiring the customer-management data corresponding to access-history information representing access history of the first terminal, from the database;

creating target information, based on the access-history information and the customer-management data; and providing a second terminal with the created target information, thereby informing the at least one sales staff about a most suitable time and way to carry out the business activities toward the at least one customer.

The target information may include data representing a channel through which the at least one sales staff makes contact with the at least one customer.

The program generator may further comprise the instructions for:

storing transaction-history information regarding the business transaction;

acquiring transaction-history information corresponding to the access-history information, from the database, in order to create the target information; and analyzing behavior of the at least one customer, based on the access-history information, the customer-management data and the transaction-history information.

In order to attain the above object, according to the seventeenth aspect of the present invention, there is provided a computer program generator for facilitating a plurality of sales activities to be performed by at least one sales staff in a business transaction to be carried out between the at least one sales staff and at least one customer, the program generator comprising the instructions for:

storing customer-management data representing information regarding the at least one customer, in a database;

acquiring the customer-management data corresponding to call-history information including an inquiry from the at least one customer to a call center, in the database;

creating target information, based on the call-history information and the customer-management data; and providing a terminal used by the at least one sale staff with the created target information, thereby informing the sales staff about a most suitable time and way to carry out the business activities toward the at least one customer.

The target information may include data representing a channel through which the at least one customer makes contact with the at least one customer.

The program generator may further comprise the instructions for:

storing transaction-history information regarding the business transaction to be carried out with the at least one customer, in the database;

acquiring the transaction-history information corresponding to the call-history information from the database, in order to create the target information; and analyzing behavior of the at least one customer, based on the call-history information, the customer-management data and the transaction-history information.

In order to attain the above object, according to the eighteenth aspect of the present invention, there is provided a computer program generator for facilitating a plurality of sales activities to be performed by at least one sales staff in a business transaction to be carried out between the at least one sales staff and at least one customer, the program generator comprising the instructions for:

encoding a voice signal, thereby creating voice data;

detecting error information included in utterance of the at least one sales staff which corresponds to the voice data created at the encoding step;

creating a correction message, thereby informing the at least one sales staff of the correction message.

The program generator may further comprise the instructions for:

storing, in a database, information items which respectively represent the sales activities to be performed by the at least one sales staff, one or more business items, at least one product, and customer needs, in association with each other;

acquiring information regarding the voice data from the database; and sending the acquired information regarding the voice data to a staff terminal used by the at least one sales staff, thereby outputting the sent information.

The program generator may further comprise the instructions for:

converting the voice data into text data;

storing the text data in the database;

determining at least one business solution based on the text data; and causing the staff terminal to output information representing the determined business solution.

The program generator may further comprise the instructions for:

evaluating skill of the at least one sales staff based on the voice data; and causing the staff terminal to output information regarding a material or training for the detected skill of the sales staff.

The program generator may further comprise the instructions for:

evaluating skill of the at least one sales staff based on the voice data; and causing a manager terminal used by a manager of the at least one sales staff to output an advice corresponding to the evaluated skill.

BRIEF DESCRIPTION OF THE DRAWINGS

The object and other objects and advantages of the present invention will become more apparent upon reading of the following detailed description and the accompanying drawings in which:

FIG. 5 is a diagram showing an example of a first word table stored in the e-mail server of FIG. 2;

FIG. 6 is a diagram showing an example of a second word table stored in the e-mail server of FIG. 2;

FIG. 15 is a diagram showing an example of item-memo data;

FIG. 16 is a diagram showing an example of sales-instruction data;

FIG. 39 is a diagram showing an example of sales-tool data;

FIG. 51 is a diagram showing an example of a skill table;

DETAILED DESCRIPTION OF THE PREFERRED EMBODIMENTS

First Embodiment

A computer network system according to the first embodiment of the present invention will now be described with reference to the accompanying drawings. In this embodiment, an e-mail server 10 detects an e-mail regarding business activities to be performed by, for example, a sales staff of a company, etc. toward a target customer. The e-mail server 10 transmits the detected e-mail not only to the sales staff, but also to any other staffs.

In this embodiment, a sales-force server 20 acquires useful information for sales activities from a knowledge server 40. The sales-force server 20 performs data communications with a terminal 61, in order to provide the terminal 61 with the useful information for sales activities, so that the sales staff can refer to the provided information thereon. That is, the useful information for sales activities can be shared between a plurality of staffs within the company. Hence, the computer network system according to the first embodiment of the present invention can facilitate sales activities to be performed by the sales staff in a business transaction to be carried out between the sales staff and a corresponding customer.

Figure 1:
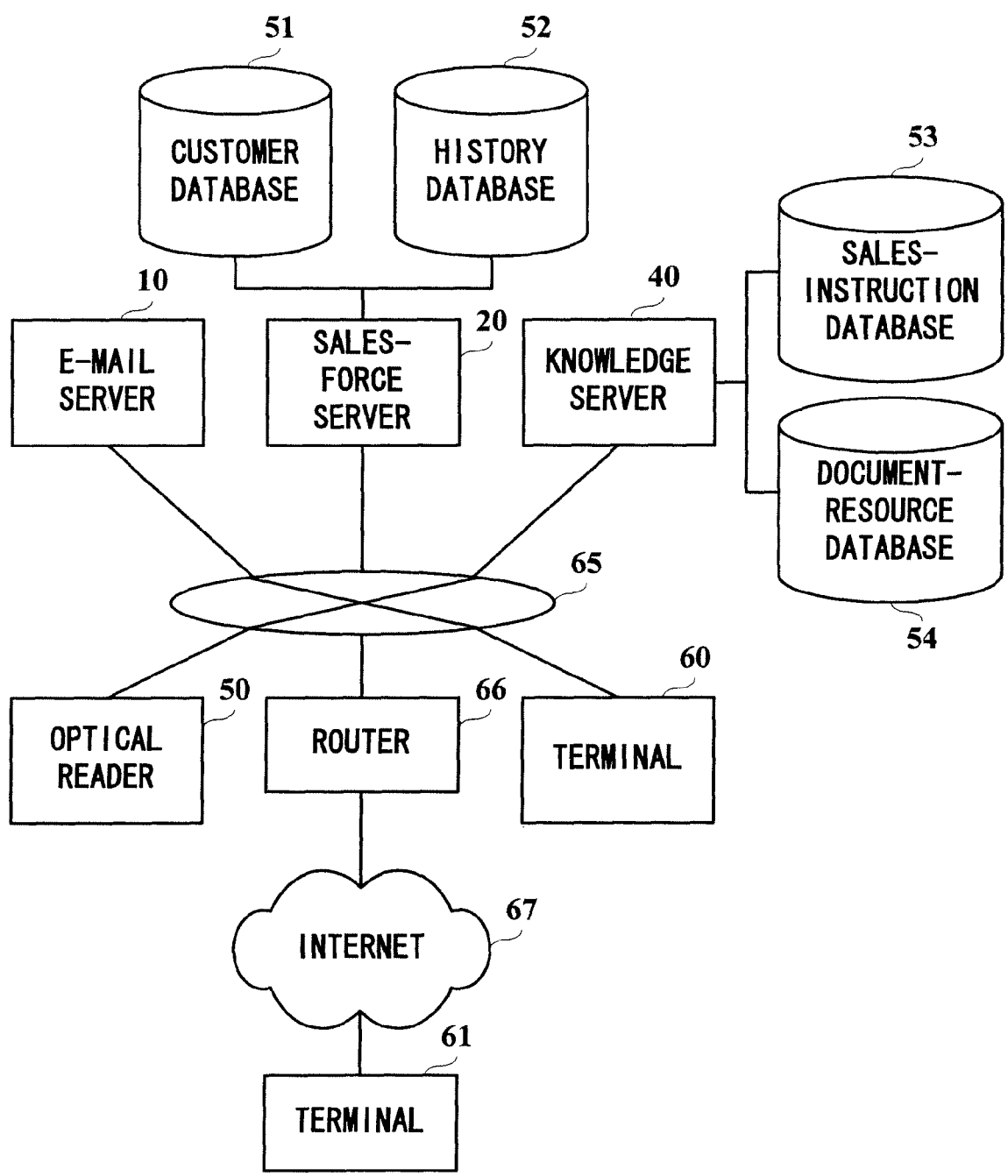
FIG. 1 is a diagram showing a computer network system according to the first embodiment of the present invention.

FIG. 1 shows the computer network system according to the first embodiment of the present invention. As shown in FIG. 1, the system comprises the e-mail server 10, the sales-force server 20, the knowledge server 40, an optical reader 50, a customer database 51, a history database 52, a sales-instruction database 53, a document-resource database 54, terminals 60 and 61, a LAN (Local Area Network) 65, a router 66 and a network 67, such as the Internet, etc. The router 66 connects the LAN 65 with the Internet 67.

The e-mail server 10 is a computer system, including a CPU (Central Processing Unit), a ROM (Read Only Memory), a RAM (Random Access Memory), an HDD (Hard Disk Drive) and a network interface.

Figure 2:
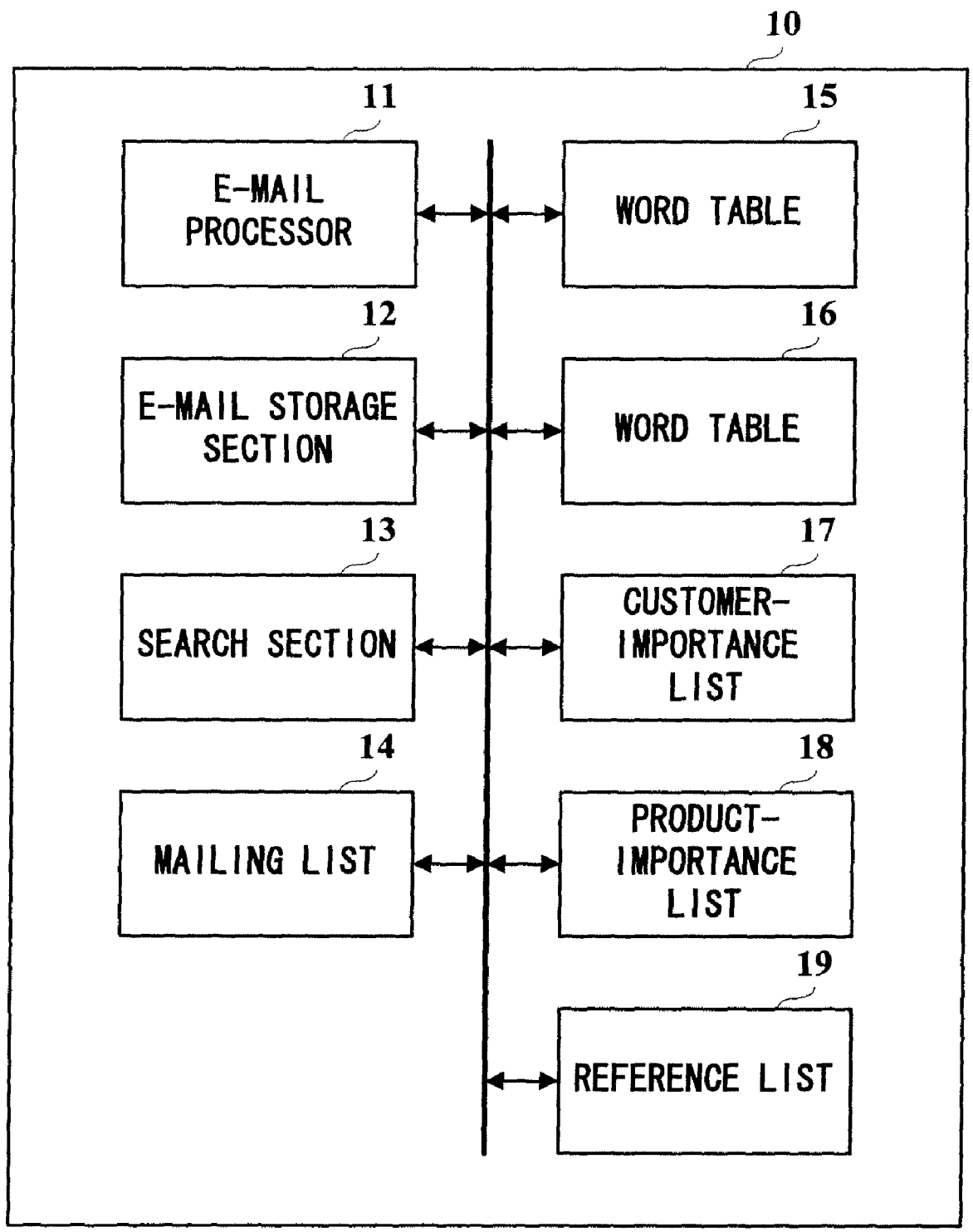
FIG. 2 is a diagram showing the structure of an e-mail server shown in FIG. 1.

FIG. 2 shows the structure of the e-mail server 10. The e-mail server 10 includes an e-mail processor 11, an e-mail storage section 12, a search section 13, a mailing list 14, a first word table 15, a second word table 16, a customer-importance list 17, a product-importance list 18 and a reference list 19. For example, the CPU of the e-mail server 10 executes a program stored in the HDD included therein, thereby realizing and controlling the structure of the e-mail server 10.

The e-mail processor 11 executes various procedures for processing e-mails.

Figure 3:
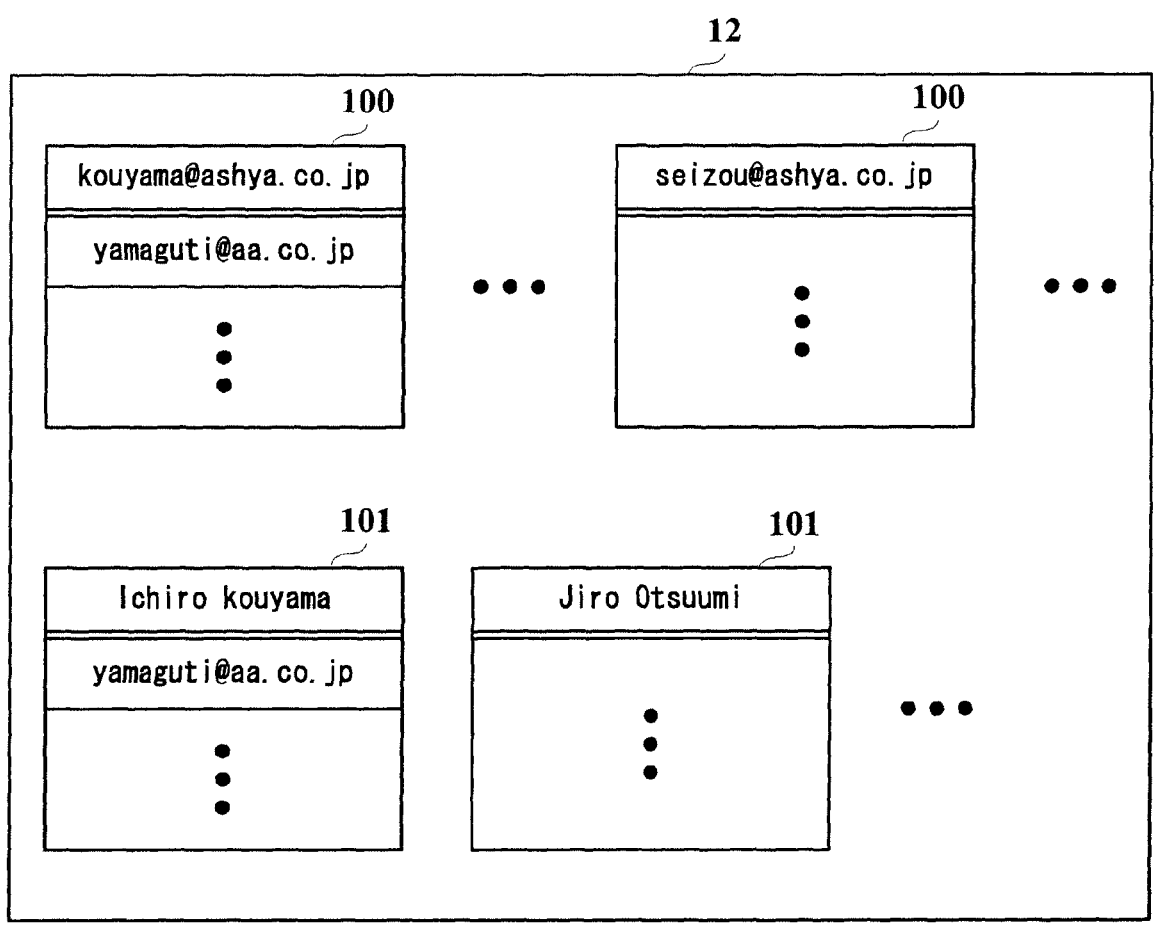
FIG. 3 is a diagram showing an e-mail storage section shown in FIG. 1.
Figure 4:
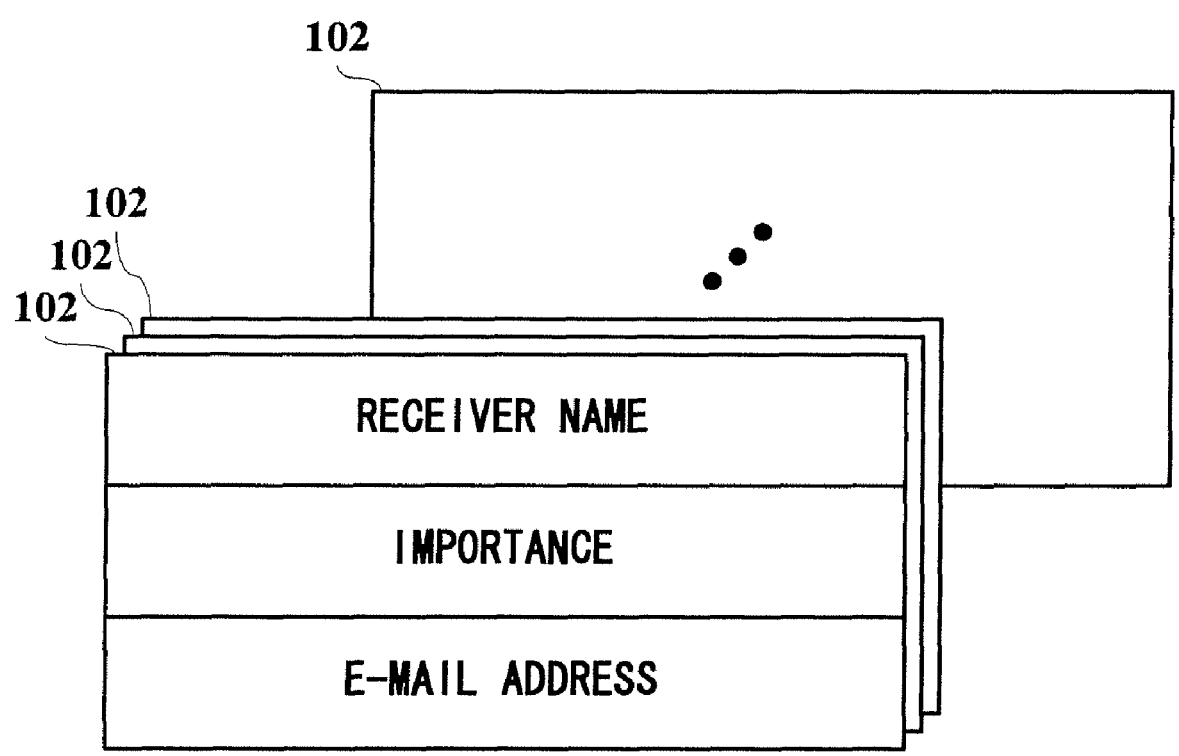
FIG. 4 is a diagram showing a mailing list stored in the e-mail server of FIG. 2.

The e-mail storage section 12 includes, as shown in FIG. 3, a plurality of e-mail boxes 100 and a plurality of e-mail memories 101. The plurality of e-mail boxes 100 are prepared in one-to-one correspondence with the plurality of sales staffs and sections of the company. Each of the e-mails is stored in one or more e-mail boxes 100 corresponding to the address of the e-mail. The plurality of e-mail memories 101 sort and store e-mails, which are sent from the plurality of sales staffs, by sales staff.

The search section 13 has the structure for executing a search operation for searching for a word(s) included in e-mails. The search section 13 searches for one or more e-mails stored in the e-mail storage section 12, based on words registered in the first word table 15.

The mailing list 14 shows e-mail addresses to which the e-mail processor 111 sends e-mails based on the search result of the search section 13. The mailing list 14 has a plurality of data groups 102 that are sorted by e-mail address. Each of the data groups 102 includes data items of "receiver name", "importance" and "e-mail address". Those receiver names shown in the mailing list 14 represents receivers of e-mails, transmitted by the e-mail processor 11 based on the search result of the search section 13. The data item of "importance", which is included in each data group 102 of the mailing list 14, represents a sum of a corresponding data item of "importance" shown in the customer-importance list 17 and a corresponding data item of "importance" shown in the product-importance list 18.

FIG. 5 shows an example of the first word table 15. FIG. 6 shows an example of the second word table 16. The first word table 15 shown in FIG. 5 includes three columns 103, 104 and 105. The second word table 16 shown in FIG. 6 includes three columns 106, 107 and 108. The columns 103 to 108 correspond to groups of words which are classified according to a predetermined plan.

For example, in the first word table 15, some verbs that are related to sales activities, such as "buy", "sell", "suggest", and "give" are registered in the first column 103, as first keywords. In addition, some adjectives, such as "best", "good", "extra", and "special" are registered in the second column 104, as second keywords, while some nouns, such as "product", "service", "price", and "cost" are registered in the third column 105, as third keywords.

In the second word table 16 shown in FIG. 6, the first column 106 contains some words, such as "manufacture", "industrial", "factory" and "produce" that are related to a manufacturing section of the company. The second column 107 contains some words, such as "plan", "project", "trial" and "regulation" that are related to a planning section of the company, while the third column 108 contains some words, such as "want", "expect", "appreciate", and "glad" that are related to the demand of customers. In addition, the second word table 16 includes the fourth column 109. The fourth column 109 contains sales staff names that would be keywords for transmitting e-mails to the sales staffs.

Figure 7:
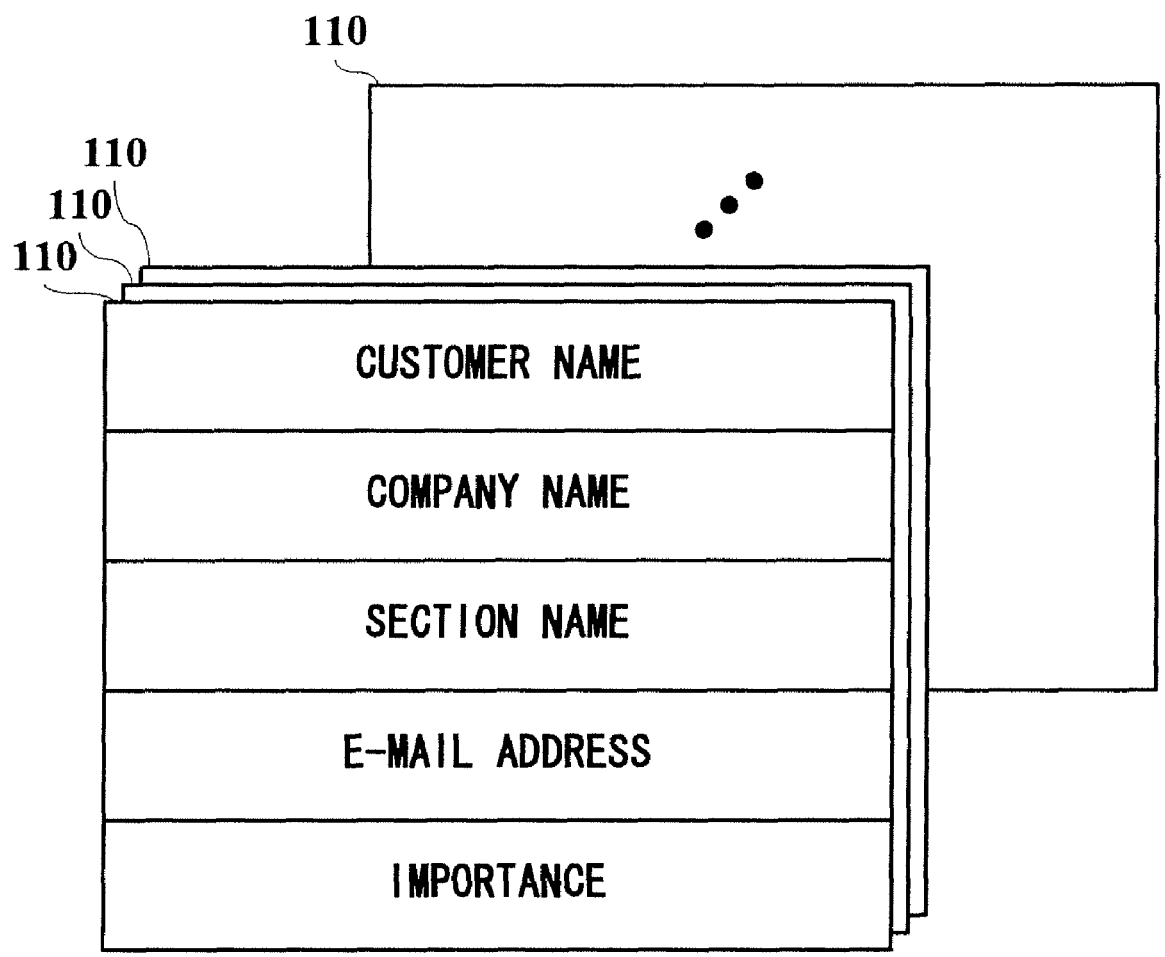
FIG. 7 is a diagram showing an example of a customer-importance list.

FIG. 7 shows an example of the customer-importance list 17. The customer-importance list 17 shown in FIG. 7 includes a plurality of data groups 110 that are sorted by customer. Each of the plurality of data groups 110 includes data items of "customer name", "company name", "section name", "e-mail address" and "importance". For example, in the case where a particular customer is ranked as one of the least important customers, the "importance" indicates "1" in his/her corresponding data group 110 of the customer importance list 17. On the other hand, in the case where another customer is ranked as one of the most important customers, the "importance" indicates "5" in the customer's corresponding data group 10. That is, in accordance with the importance of each customer, one of values "1" to "5" is assigned into the data item of "importance" in the data group 110.

Figure 8:
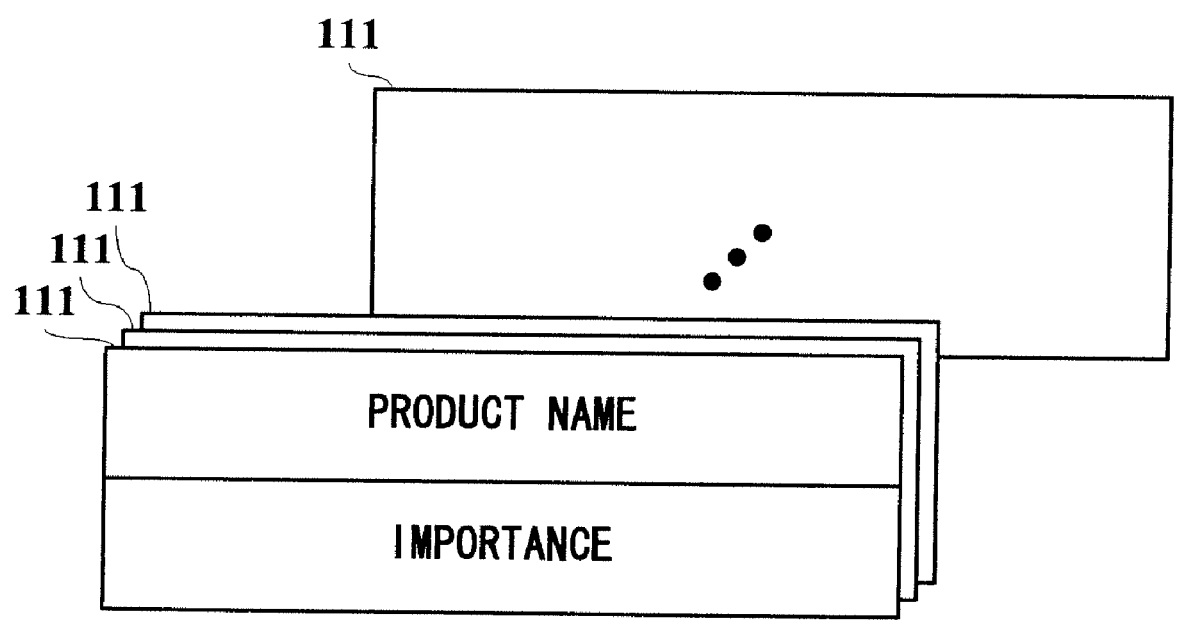
FIG. 8 is a diagram showing an example of a product-importance list.

FIG. 8 shows an example of the product-importance list 18. The product-importance list 18 shown in FIG. 8 includes a plurality of data groups 111 that are sorted by product. Each of the data groups 111 includes data items of "product name" and "importance". For example, in the case where a particular product is ranked as one of the least important products, the data item of "importance" indicates "1" in the particular product's corresponding data group 111 of the product-importance list 18. On the other hand, in the case where another product is ranked as one of the most important products, the data item of "importance" indicates "5" in the product's corresponding data group 11 of the product-importance list 18. That is, in accordance with the importance of each product, one of values "1" to "5" is assigned into the data item of "importance" in the data group 111 of the corresponding product. While the "importance" included in each data group 110 or 111 indicates a value within a range between "1" and "5", the "importance" included in the mailing list 14 indicates a value within a range between "2" and "10".

Figure 9:
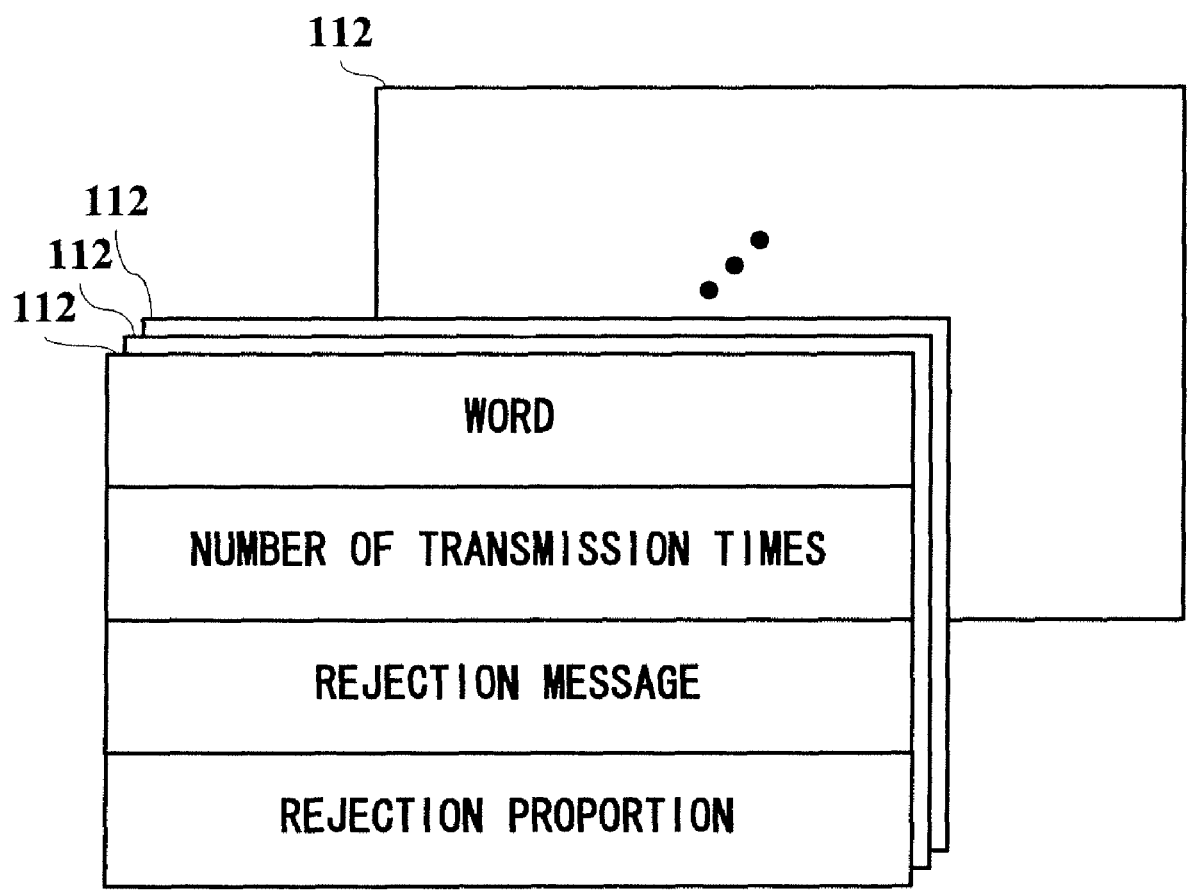
FIG. 9 is a diagram showing a reference list stored in the e-mail server of FIG. 2.

FIG. 9 shows an example of the reference list 19. The reference list 19 shown in FIG. 9 includes a plurality of data groups 112 that are classified by word included in the second word table 16. Each of the plurality of data groups 112 includes data items of "word" included in the second word table 16, "number of transmission times", "rejection message" and "rejection proportion".

The data item of "number of transmission times" shown in a data group 112 of the reference list 19 indicates the number of times the e-mail processor 11 has transmitted an e-mail including the word shown in the same data group 112.

The data item of "rejection message" shown in a data group 112 of the reference list 19 indicates the number of times the e-mail server 10 has received a message representing that a corresponding e-mail was rejected. In this case, the number of reception times is indicated in association with the "word" shown in the same data group 112 as that of the "rejection message".

The "rejection proportion" shown in the reference list 19 indicates the proportion of "rejection message" to "number of transmission times" which are shown in the same data group 112.

The sales-force server 20 shown in FIG. 1 has the same hardware structure as that of the e-mail server 10. The sales-force server 20 is a computer system serving as an SFA (Sales Force Automation) server. The sales-force server 20 executes the software for facilitating the information processing within the company. For example, such software includes components for performing: marketing analysis; behavior history management of sales staff; maturity level management of sales activities (note that "maturity level" in this specification represents a progressive level of business activities performed so far by the sales staff); electronic management of business records; information disclosure regarding products; information disclosure of sales tools.

Figure 10:
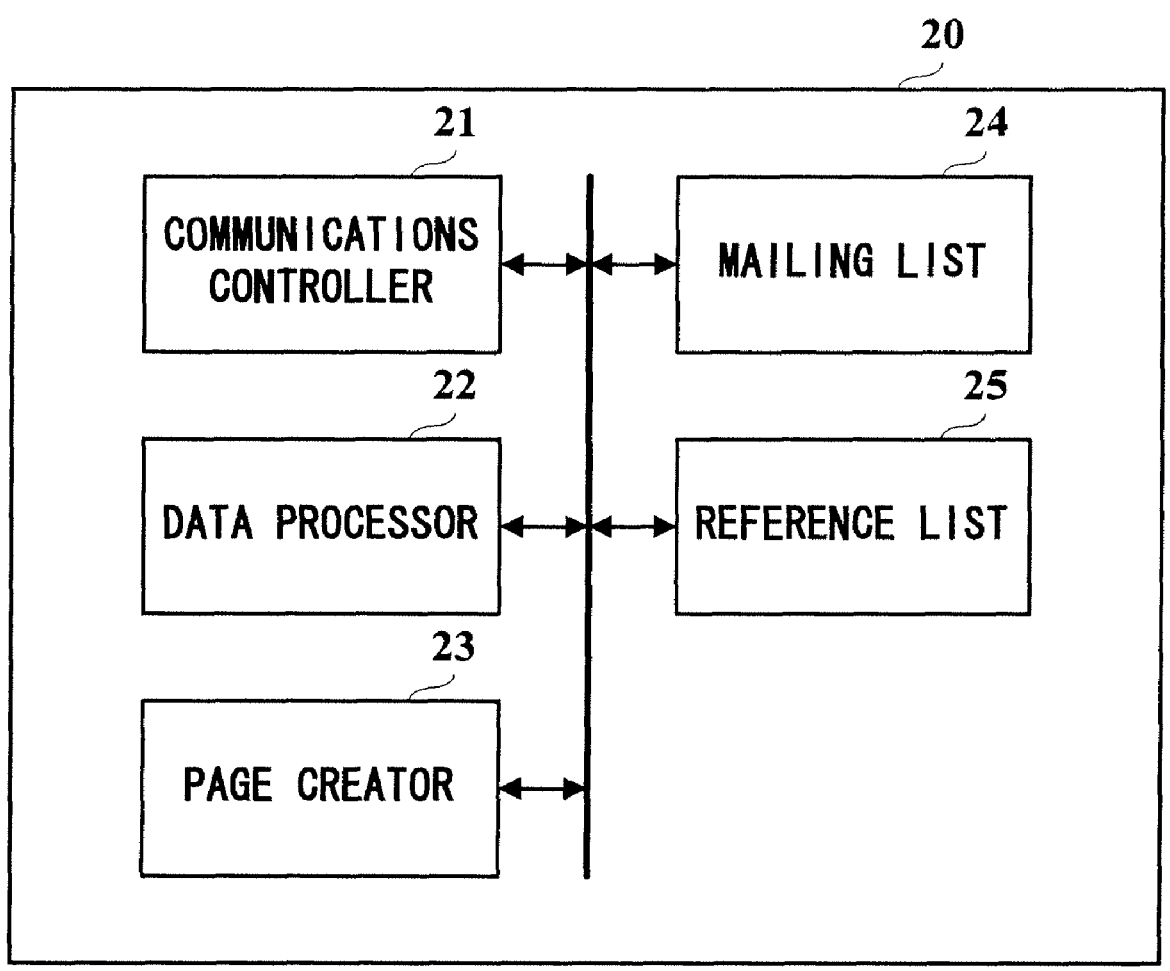
FIG. 10 is a diagram showing the structure of a sales-force server included in the computer network system according to the first embodiment.

As shown in FIG. 10, the sales-force server 20 included in the computer network system according to the first embodiment of the present invention includes a communications controller 21, a data processor 22, a page creator 23, a mailing list 24 and a reference list 25. For example, the CPU of the sales-force server 20 executes the program stored in the HDD thereof, thereby realizing and controlling such a structure.

The communications controller 21 performs data communications with the LAN 65, so as to receive and send various request and information from and to the terminals 60 and 61. In addition, the communications controller 21 receives information from the e-mail server 10, the knowledge server 40 and the optical reader 50.

The data processor 22 processes various data, so as to provide the terminals 60 and 61 with information for supporting sales activities. For example, the data processor 22 carries out a process for recording, in the customer database 51 or history database 52, the data sent from the e-mail server 10, the knowledge server 40, the optical reader 50 and the terminals 60 and 61. Further, the data processor 22 creates an e-mail for sending those receivers included in the mailing list 24 about the information recorded in the history database 52.

In response to a request from the terminals 60 and 61, the page creator 23 forms a GUI (Graphical User Interface) for sending information for supporting sales activities.

Figure 11:
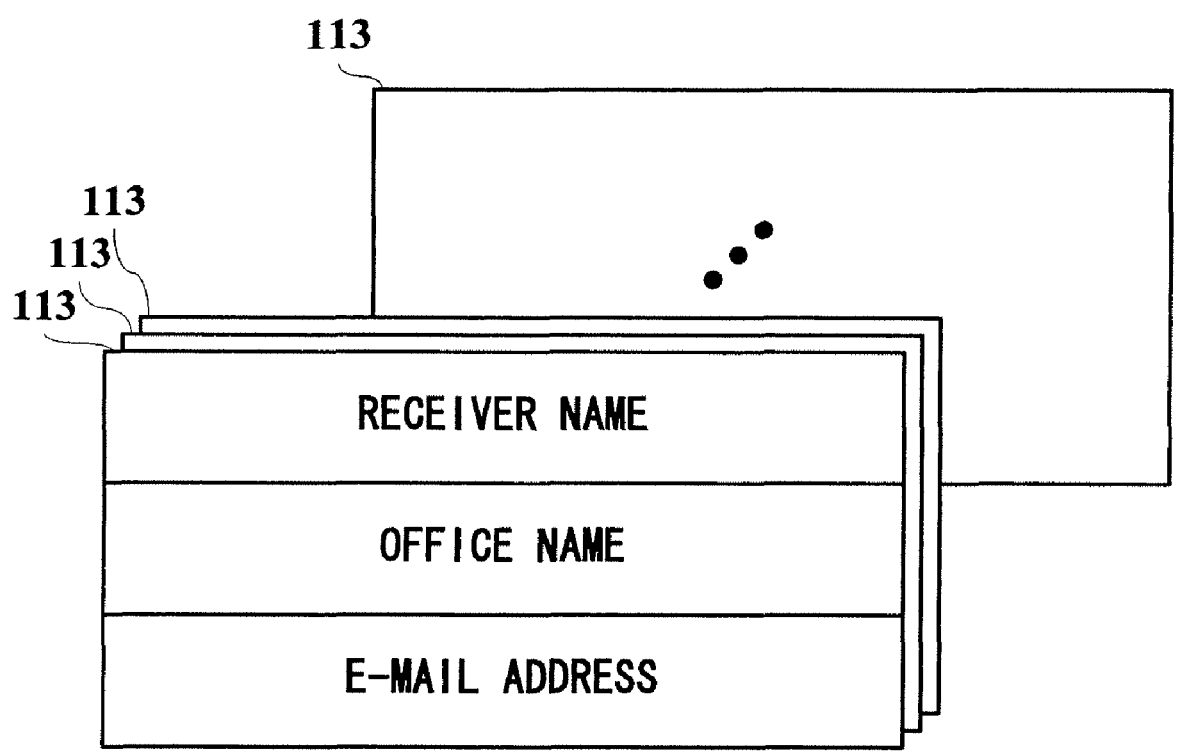
FIG. 11 is a diagram showing a mailing list stored in the sales-force server of FIG. 10.

The mailing list 24 shows addresses of e-mails created by the data processor 22. As shown in FIG. 11, the mailing list 24 has a plurality of data groups 113 that are sorted by e-mail address. Each of the plurality of data groups 113 includes data items of "receiver name", "office name", and "e-mail address".

Figure 12:
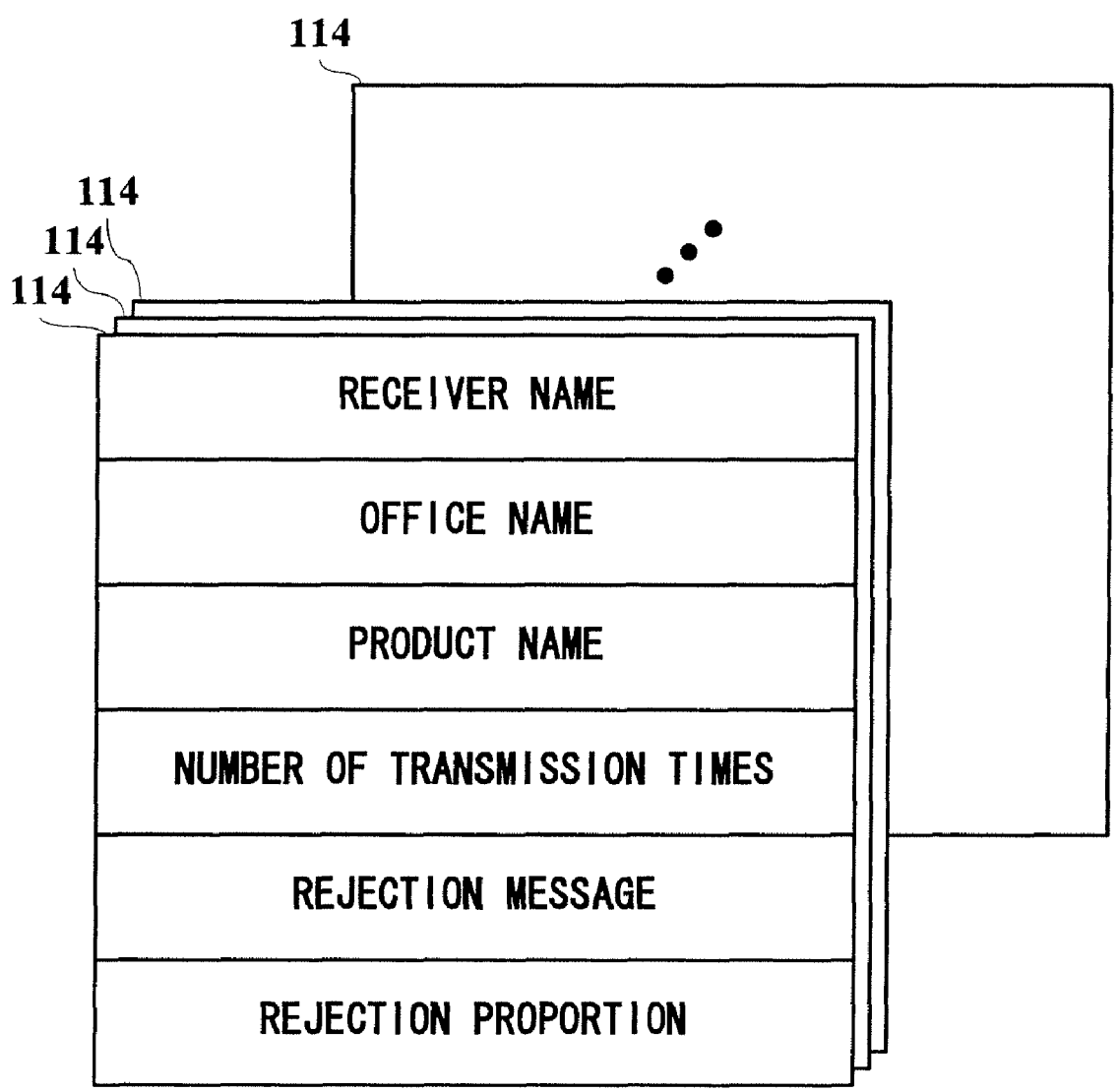
FIG. 12 is a diagram showing a reference list stored in the sales-force server of FIG. 10.

The reference list 25 shows some conditions based on which it is determined whether an e-mail should be sent to each receiver. FIG. 12 shows an example of the reference list 25. The reference list 25 shown in FIG. 12 includes a plurality of data groups 114 that are sorted by receiver registered in the mailing list 24. Each of the plurality of data groups 114 has data items of "receiver name", "office name", "product name", "number of transmission times", "rejection message" and "rejection proportion".

The data item of "number of transmission times" of a particular data group 114 indicates the number of times the e-mail created by the data processor 22 has been sent to a corresponding receiver shown in the same data group 114.

The data item of "rejection message" shown in the reference list 25 indicates the number of times the sales-force server 20 has received a message representing that an e-mail created by the data processor 22 was rejected.

The data item of "rejection proportion" shown in the reference list 25 indicates the proportion of the "rejection message" to the "number of transmission times".

Figure 13:
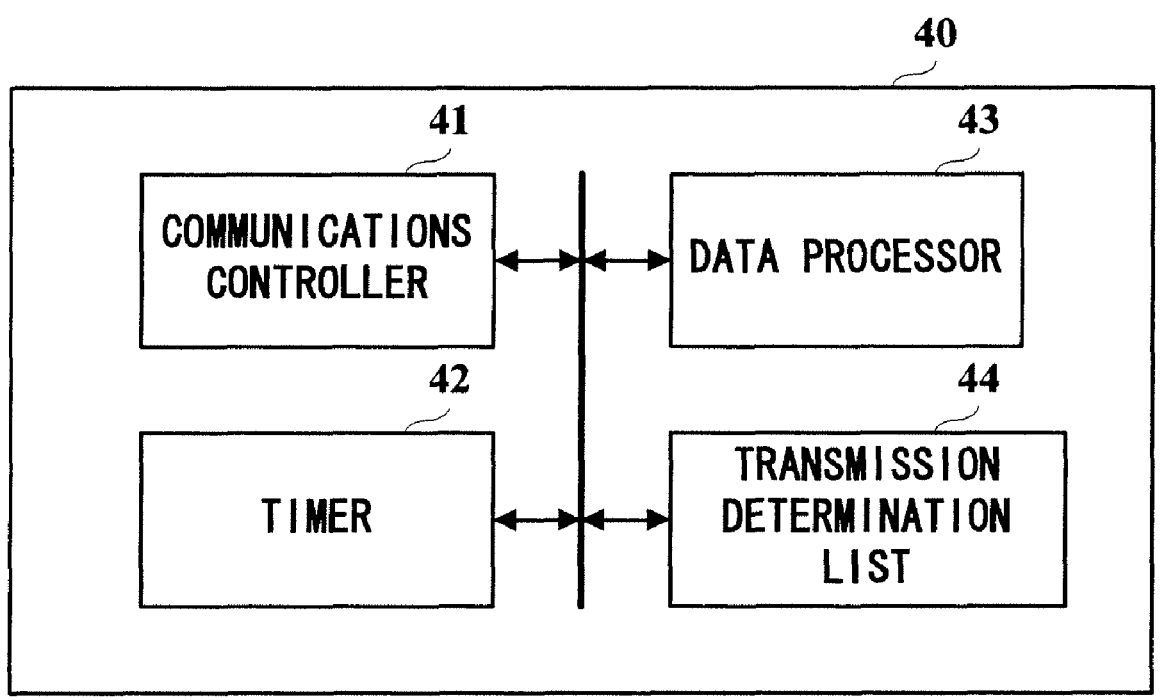
FIG. 13 is a diagram showing the structure of a knowledge server included in the computer network system of FIG. 1.

The knowledge server 40 shown in FIG. 1 serves as a DBMS (Database Management System) for managing data recorded in the sales-instruction database 53 and the document-resource database 54. The knowledge server 40 includes a communications controller 41, a timer 42, a data processor 43, a transmission-determination list 44, as shown in FIG. 13. For example, the CPU of the knowledge server 40 executes the program stored in the HDD thereof, thereby realizing and controlling such a structure of the knowledge server 40.

The communications controller 41 performs data communications with the LAN 65, so as to receive information sent from the terminal 60 and send information to the sales-force server 20.

The timer 42 times the current date and time.

The data processor 43 processes various data for managing information sent from the terminal 60. For example, the data processor 43 executes a process for recording the data sent from the terminal 60 either in the sales-instruction database 53 or the document-resource database 54, in accordance with the type of the data. Further, the data processor 22 transfers the data extracted from the sales-instruction database 53 and document-resource database 54, based on the time of the timer 42 and the transmission-determination list 44, to the sales-force server 20.

Figure 14:
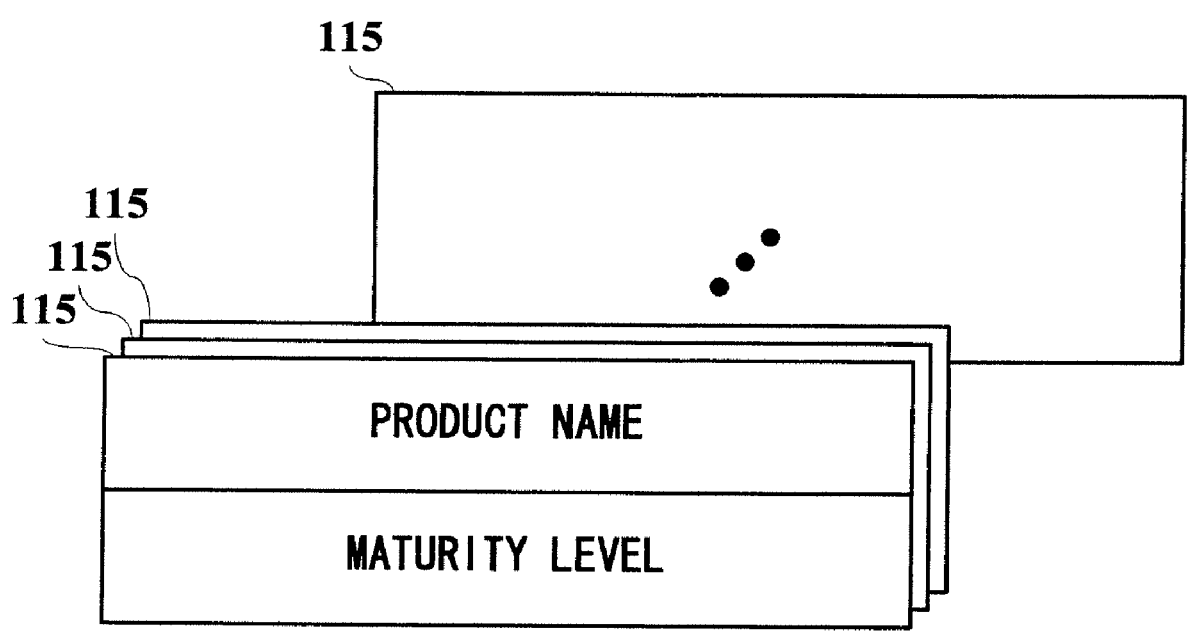
FIG. 14 is a diagram showing an example of a transmission-determination list stored in the knowledge server of FIG. 13.

The transmission-determination list 44 shows some conditions, based on which the data recorded in the sales-instruction database 53 and the document-resource database 54 are transferred to the sales-force server 20. FIG. 14 shows an example of the transmission-determination list 44. The transmission-determination list 44 shown in FIG. 14 includes a plurality of data groups 115 which are sorted by product. Each of the data groups 115 includes data items of "product name" and "maturity level". In this case, the data item of "maturity level" indicates one of the first to ninth progressive levels of sales activities.

The first maturity level (indicated by "1") stands for the stage in which a corresponding sales staff has just begun being in contact with a corresponding customer. In the first maturity level, the sales staff has just visited the customer at the first time or has tried to see a new customer.

The second maturity level (indicated by "2") stands for the stage in which the sales staff tries to be in contact with the customer more frequently. In the second maturity level, the sales staff often visits the customer, to try to know the customer well each other.

The third maturity level (indicated by "3") stands for the stage in which the sales staff studies about the customer. In the third maturity level, the sales staff inquires about the environment of the customer that may influence the progressive level of the sales activities or may include the conditions of sales. Specifically, the environment of the customer may include the customer company's facilities or its competitors, and such.

The fourth maturity level (indicated by "4") stands for the stage in which the sales staff tries to get attention of the customer to the product. In the fourth level, the sales staff provides the customer with some interesting information regarding the product, so as to persuade the customer to buy the product.

The fifth maturity level (indicated by "5") stands for the stage in which the sales staff is aware of the customer needs. In the fifth maturity level, the sales staff finds out the product that meets the customer needs.

The sixth maturity level (indicated by "6") stands for the stage in which the sales staff investigates any factors that should be solved, in order for the customer to buy the product. For example, in the sixth maturity level, the sales staff finds out the difference between the product on sale and the product corresponding to the customer needs.

The seventh maturity level (indicated by "7") stands for the stage in which the sales staff finally suggests the product in earnest. In the seventh stage, the sales staff talks to the customer, in order to provide the customer with the product corresponding to the customer needs.

The eighth maturity level (indicated by "8") stands for the stage in which the sales staff solves the factor(s) which disturbs the selling of the product.

The ninth maturity level (indicated by "9") stands for the stage in which the sales staff successfully receives an order for the product from the customer, finally. As the maturity level goes up from the first to ninth levels, it is more likely that the product is successfully sold.

The optical reader 50 shown in FIG. 1 optically reads out characters, letters, or drawings. The optical reader 50 digitizes the read information, and sends the digitized information to the sales-force server 20. In the first embodiment of the present invention, the optical reader 50 reads out an item memo which is given to the manager (boss) of the sales section from the sale staff. This item memo represents information regarding the sales activities done by the sales staff. FIG. 15 shows an example of item-memo data 116 which has been digitized by the optical reader 50. The item-memo data 116 shown in FIG. 15 includes data items of "date", "office name", "person to contact", "maturity level", "customer information", "product name", "unit price", "number of product(s) ordered", "success possibility", and "IT progressive level". The customer information shown in the item-memo data 116 includes data items of "customer name", "section name", "sales-staff name" and "phone number".

The maturity level shown in the item-memo data 116 represents the progressive level of the sales activities performed by the sales staff, likewise the maturity level shown in the transmission-determination list 44.

The "success possibility" shown in the item-memo data 116 numerically shows the possibility that a corresponding business transaction will be succeeded. For example, in the case where a corresponding business transaction seems hopeless, a numerical number "1" is assigned into the data item of "success possibility" shown in the item-memo data 116. On the contrary, in the case where a corresponding business transaction seems very hopeful, a numerical number "5" is assigned into the data item of "success possibility" shown in the item-memo data 116.

The data item of "IT progressive level" shown in the item-memo data 116 numerically represents the progressive level of IT (Information Technology) of the customer. For example, in the case where a LAN is not built in the section of the customer, a numeral number of "1" is assigned into the "IT progressive level" in the item-memo data 116. In the case where high-speed Intranet is built in the customer section, a numerical number of "5" is assigned in to the data item of "IT progressive level" in the item-memo data 116. In accordance with the level in IT of the customer section, one of the numerical numbers of "1" to "5" is assigned into the data item of "IT progressive level" in the item-memo data 116.

The customer database 51, the history database 52, the sales-instruction database 53 and the document-resource database 54 which are shown in FIG. 1 are built in a storage device, such as a hard disk drive, etc. The customer database 51 and the history database 52 may be prepared in the sales-force server 20. The sales-instruction database 53 and the document-resource database 54 may be prepared in the knowledge server 40.

The customer database 51 included in the computer network system according to the first embodiment stores the item-memo data 116 sent from the optical reader 50 to the sales-force server 20, sales-instruction data 117 and document-resource data 118 sent from the knowledge server 40 to the sales-force server 20, and other information regarding customers. The sales-instruction data 117 and the document-resource data 118 are data components representing information regarding the sales activities.

The sales-instruction data 117 represents information representing those instructions to be given to the sales staff, and hence resulting in the sales promotion. FIG. 16 shows an example of the sales-instruction data 117. The sales-instruction data 117 shown in FIG. 16 includes data items of "maturity level", "product name", and "instruction matter". The data item of "instruction matter" included in the sales-instruction data 117 is text data representing an instruction, which is set by the manager of the sales section and given to the sales staff, in association with the data items of "maturity level" and "product name" of the same sales-instruction data 117.

Figure 17:
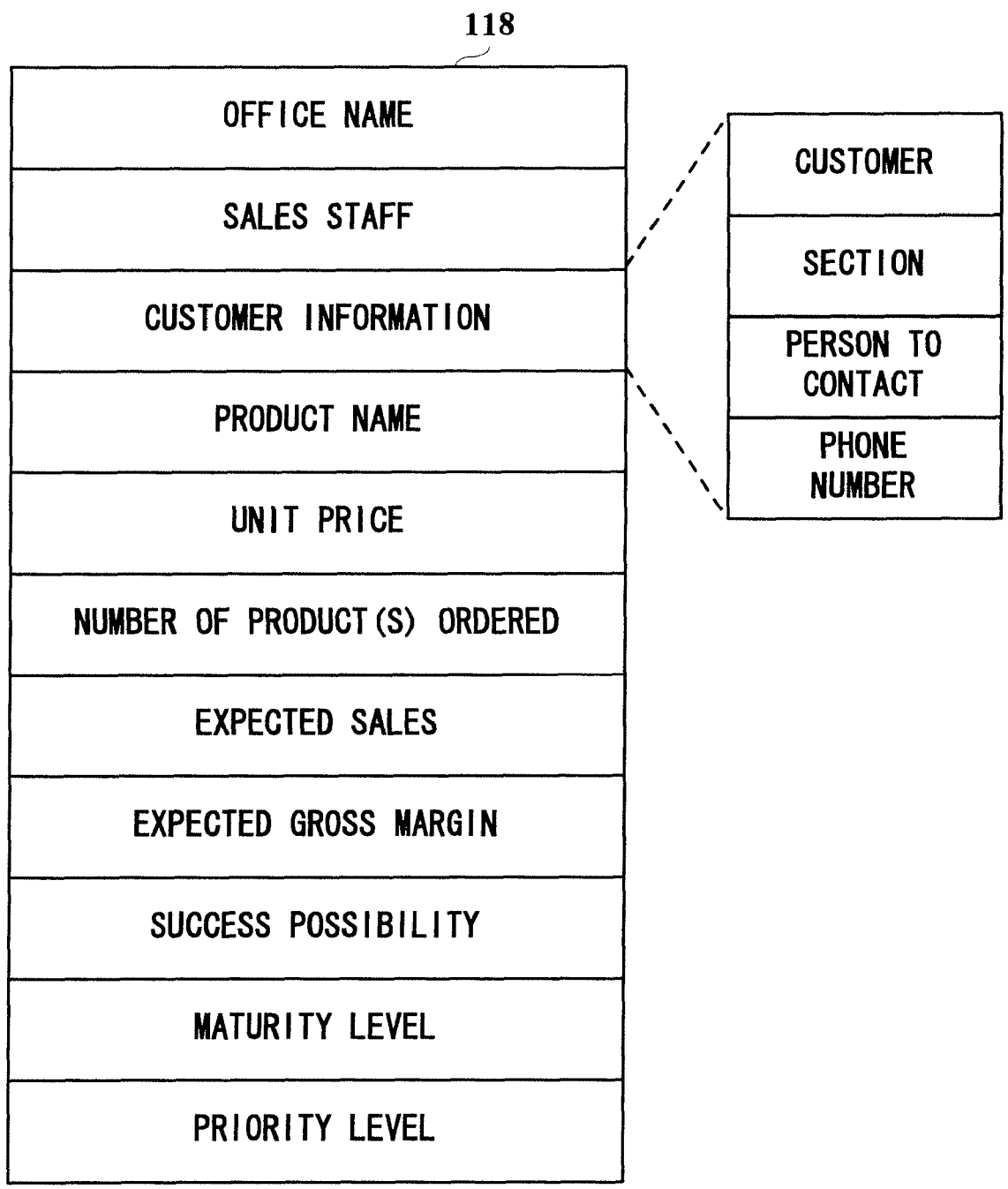
FIG. 17 is a diagram showing an example of document-resource data.

The document-resource data 118 is created based on the item memo provided from the sales staff to the manager. FIG. 17 shows an example of the document-resource data 118. The document-resource data 117 shown in FIG. 17 includes data items of "office name", "sales staff name", "customer information", "product name", "unit price", "number of product(s) ordered", "expected sales", "expected gross margin", "success possibility", "maturity level of sales activities", and "priority level". The customer information in the document-resource data 118 includes data items of "customer name", "section name", "sales-staff name", and "telephone number". The data item of "success possibility" in the document-resource data 118 numerically shows the possibility that the business transaction will be succeeded, likewise the case of the item-memo data 116. The data item of "priority level" included in the document-resource data 118 numerically shows the priority level of the sales activities done by the sales staff. The document-resource data 118 is sources for forming a report (document) of the sales activities.

The customer database 51 sorts the sales-instruction data 117 and the document-resource data 118 by maturity level, and stores the sorted data 117 and 118.

The history database 52 records history information of the business transaction with the customer, the repairs of sold product, the inquiries from the customer. The sales-instruction database 53 stores the sales-instruction data 117 which is sent from the terminal 60 to the knowledge server 40 in accordance with the manager operation. The document-resource database 54 records the document-resource data 118 which is sent from the terminal 60 to the knowledge server 40 in accordance with the manager operation.

Each of the terminals 60 and 61 shown in FIG. 1 is a portable information processor or desktop computer, including a CPU, ROM, RAM, HDD, display device, keyboard, etc. The terminal 60 is used by the staffs, including the manager, of the company. The terminal 61 is installed in an office for selling the products, such as a shop, a department store, a boutique, etc. The terminal 60 accesses the e-mail server 10 or sales-force server 20 through the LAN 65. The terminals 60 and 61 access the e-mail server 10 or sales-force server 20 through the Internet 67 and router 66.

Figure 18:
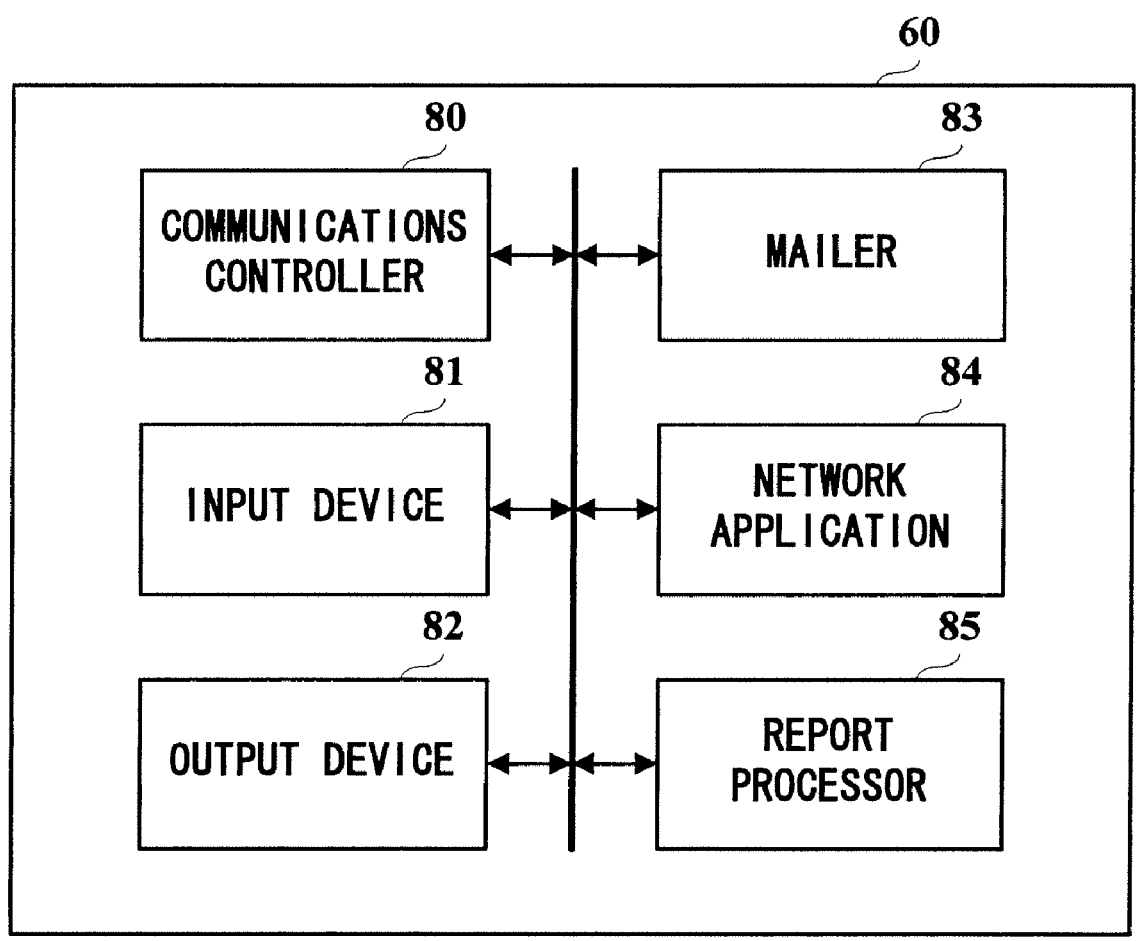
FIG. 18 is a diagram showing the structure of a terminal included in the computer network system according to the first embodiment of the present invention.

FIG. 18 shows the structure of the terminal 60 included in the network computer system according to the first embodiment. The terminal 60 shown in FIG. 18 includes a communications controller 80, an input device 81, an output device 81, a mailer 83, a network application 84 and a report processor 85. The CPU included in the terminal 60 executes the program stored in a storage device (ROM, RAM, HDD, etc.) thereof, thereby realizing and controlling such a structure of the terminal 60.

The mailer 83 acquires e-mails from the e-mail server 10, and controls the output device 82 to display the acquired e-mails. The network application 84 performs data communications with the sales-force server 20 or the knowledge server 40.

The report processor 85 creates various reports regarding the sales activities of the sales staff, using the document-resource data 118 retrieved from the document-resource database 54.

The terminal 60 may be replaced by a plurality of devices corresponding to the respective staff of the company.

Figure 19:
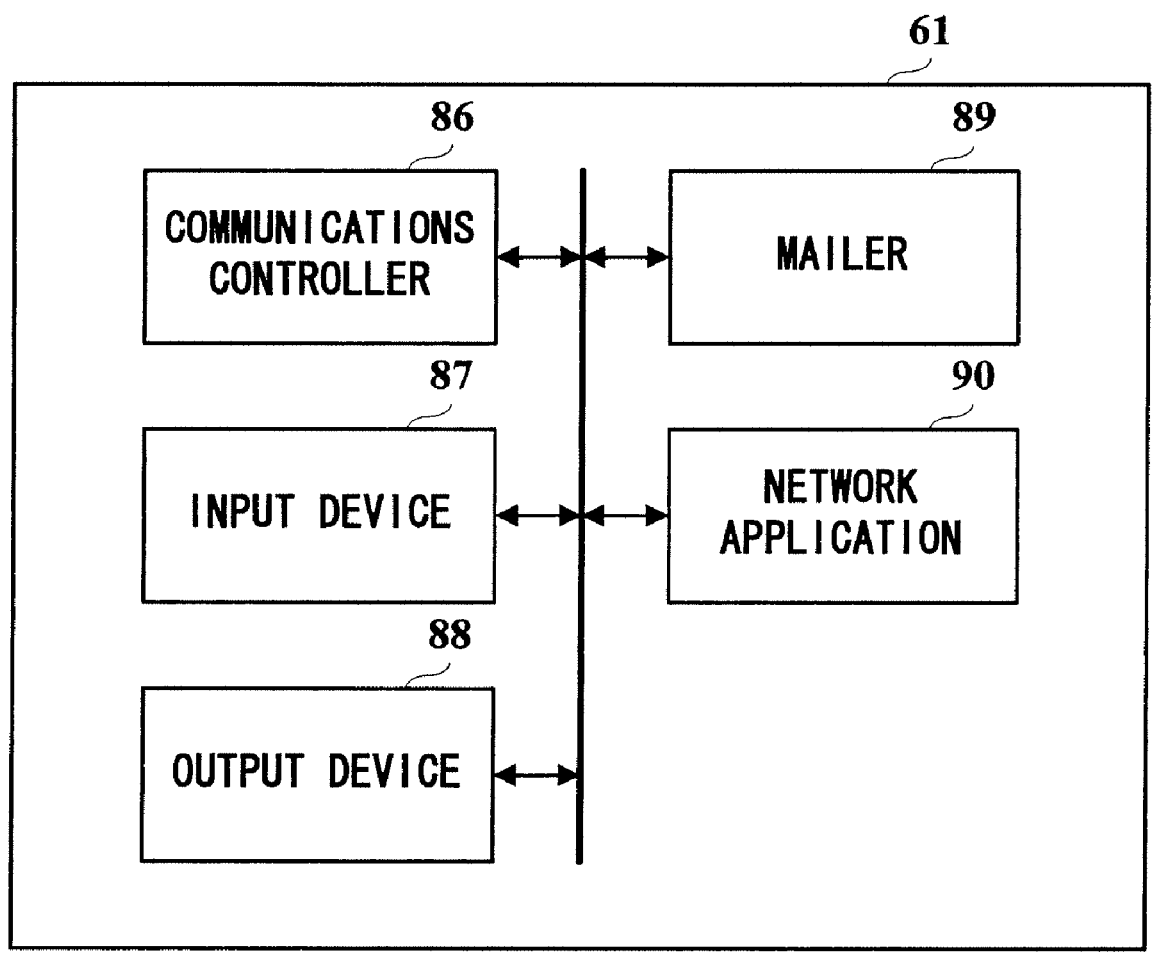
FIG. 19 is a diagram showing the structure of a terminal installed in an office for selling products.

FIG. 19 shows the structure of the terminal 61 included in the computer network system of the first embodiment. The terminal 61 shown in FIG. 19 includes a communications controller 86, an input device 87, an output device 88, a mailer 89, a network application 90. The CPU of the terminal 61 executes the program stored in the storage device (such as the ROM, RAM, HDD, etc.) thereof, thereby realizing and controlling such a structure of the terminal 61. Likewise the terminal 60, the terminal 61 may be replaced by a plurality of terminals which are installed in a plurality of offices, respectively.

Operations of the computer network system according to the first embodiment of the present invention will now be described.

Figure 20A:
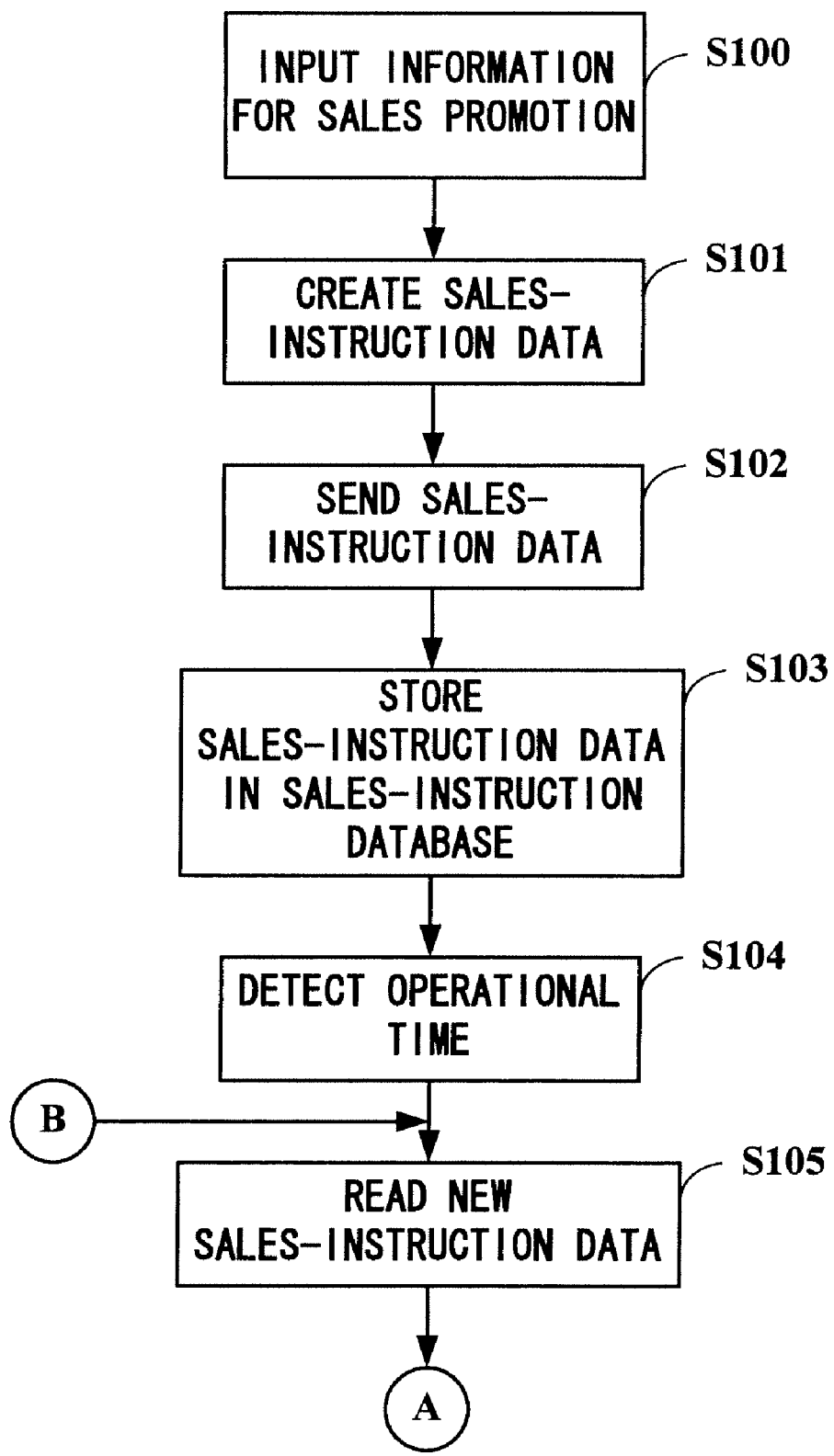
FIGS. 20A and 20B are flowcharts for explaining a process for storing the sales-instruction data in a customer database and a sales-instruction database.
Figure 20B:
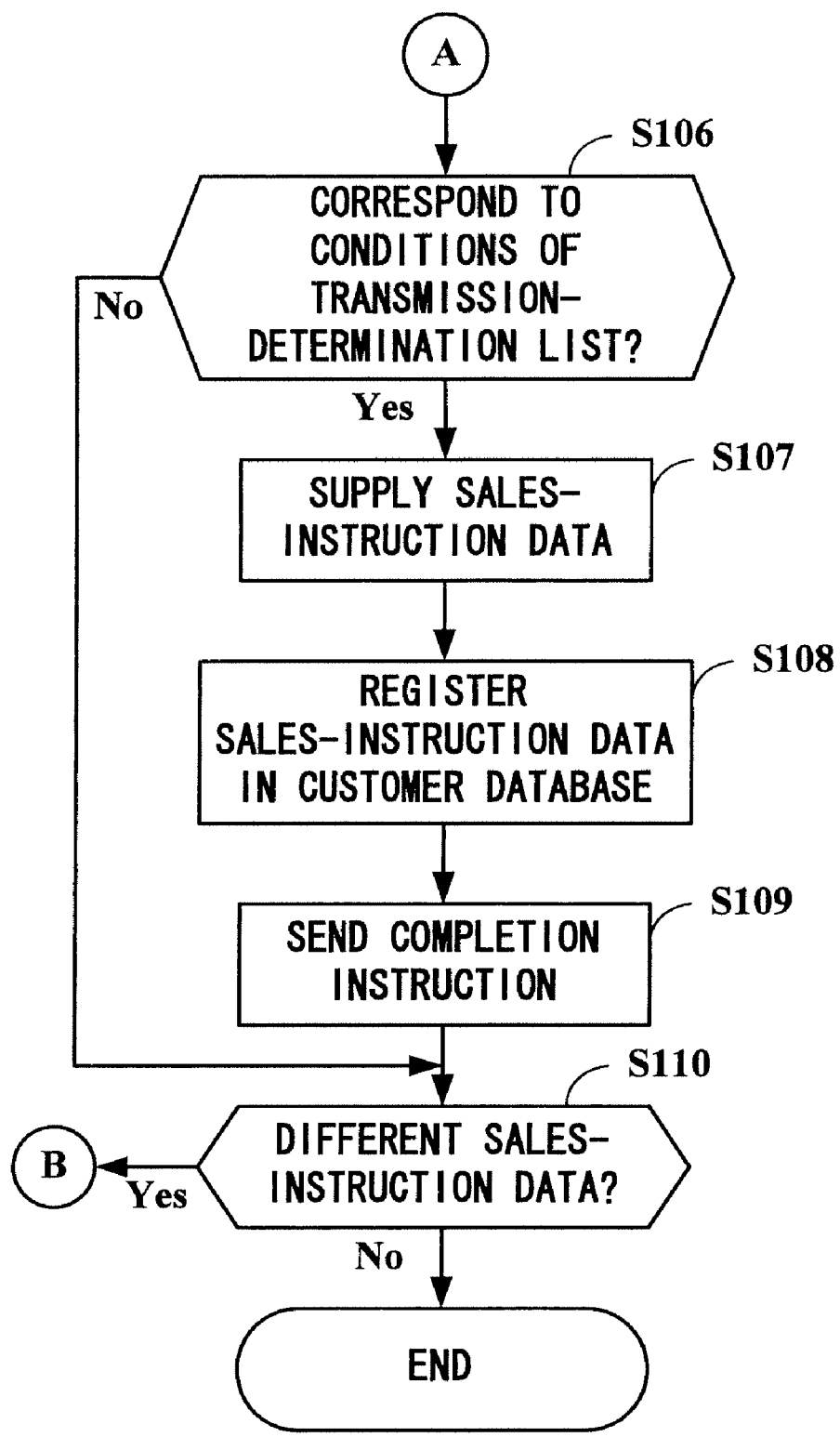

FIGS. 20A and 20B are flowcharts each showing a process for recording the sales-instruction data 117 in the customer database 51 and the sales-instruction database 53. At the beginning of the process shown respectively in FIGS. 20A and 20B, the manager checks the item memo given by the sales staff, in order to get information which may result in the sales promotion by instructing the sales staff.

The manager of the sales section operates the input device 81 of the terminal 60 to input information for the sales promotion (Step S100). In accordance with the operation by the manager, the terminal 60 creates the sales-instruction data 117 (Step S101). After the sales-instruction data 117 is thus completely created, the network application 84 of the terminal 60 sends an instruction to the communications controller 80, and sends the created sales-instruction data 17 to the knowledge server 40 (Step S102).

In the knowledge server 40, the data processor 43 stores the sales-instruction data 17 received from the terminal 60, in the sales-instruction database 53 (Step S103). The data processor 43 detects that the timer 42 indicates its operational time (Step S104). For example, the operational time is set in advance to 5:30 pm, the same time as the closing time of the store, shop, office, etc.

Upon detection of the operational time, the data processor 43 reads out the sales-instruction data 117 newly recorded in the sales-instruction database 53 (Step S105). The data processor 43 determines whether the read sales-instruction data 117 corresponds to the conditions shown in the transmission-determination list 44 (Step S106 of FIG. 20B). In more particular, the data processor 43 extracts the product name and maturity level from the sales-instruction data 117 read out from the sales-instruction database 53. The data processor 43 specifies the data group 115 including the same "product name" as that extracted from the sales-instruction data 117, from the transmission-determination list 44. The data processor 43 compares the maturity level of the sales-instruction data 117 and the maturity level of the specified data group 115.

In the case where the maturity level of the sales-instruction data 117 is equal to or greater than that of the data group 15, the data processor 43 determines that the sales-instruction data 117 corresponds to the conditions of the transmission-determination list 44.

On the contrary, in the case where the maturity level of the sales-instruction data 117 is smaller than that of the data group 115, the data processor 43 determines that the sales-instruction data 117 does not correspond to the condition of the transmission-determination list 44.

In the case where it is determined that the sales-instruction data 117 corresponds to the conditions of the transmission-determination list 44 in the step S106, the data processor 43 supplies the sales-force server 20 with the sales-instruction data 117 (Step S107). In the sales-force server 20, the data processor 22 records the sales-instruction data 117 received from the knowledge server 40 in the customer database 51 (Step S108). In this case, the sales-instruction data 117 is sorted by maturity level, and stored in the customer database 51. The sales-force server 20 sends a completion instruction to read different sales-instruction data 117, to the knowledge server 40 (Step S109).

In the case where it is determined that the sales-instruction data 117 does not correspond to the conditions of the transmission-determination list 44 in the step S106, the procedures of the steps S107 to S109 will be skipped.

After this, the data processor 43 determines whether different sales-instruction data 117 is recorded in the sales-instruction database 53 (Step S110). In the case where it is determined that there is different sales-instruction data 117 recorded in the sales-instruction database 53 in the step S110, the data processor 43 returns to the procedure of the step S105 shown in FIG. 20A.

On the contrary, in the case where it is determined that there is no different sales-instruction data 117 in the sales-instruction database 53 in the step S110, the data processor 43 completes the processes shown in FIGS. 20A and 20B.

Likewise the processes shown in FIGS. 20A and 20B, the customer database 51 and the document-resource database 54 may record the document-resource data 118. The item-memo data 116 may be recorded only in the customer database 51. The terminal 60 may create the item-memo data 116 using the optical reader 50. The history information regarding the business transaction to be dealt with the customer, the repairs of sold product, inquiries from the customer, are input by the terminal 60, and recorded in the history database 52.

In this first embodiment of the present invention, the sales-force server 20 receives six different kinds of requests from the terminals 60 and 61. The six different kinds of requests includes: a first request regarding the item-memo data 116; a second request regarding the sales-instruction data 117; a third request regarding the document-resource data 118; a fourth request regarding the repairing history; a fifth request regarding the inquiries from the customer; and a sixth request regarding the business with the customer. In the sales-force server 20, the page creator 23 creates a GUI in accordance with a request received from the terminal 60 or 61. For example, the GUI created by the page creator 23 is a Web page which is displayed under the control of the network application 84 of the terminal 60 and the network application 90 of the terminal 61, and which can be accessed by the sales staffs.

Figure 21:
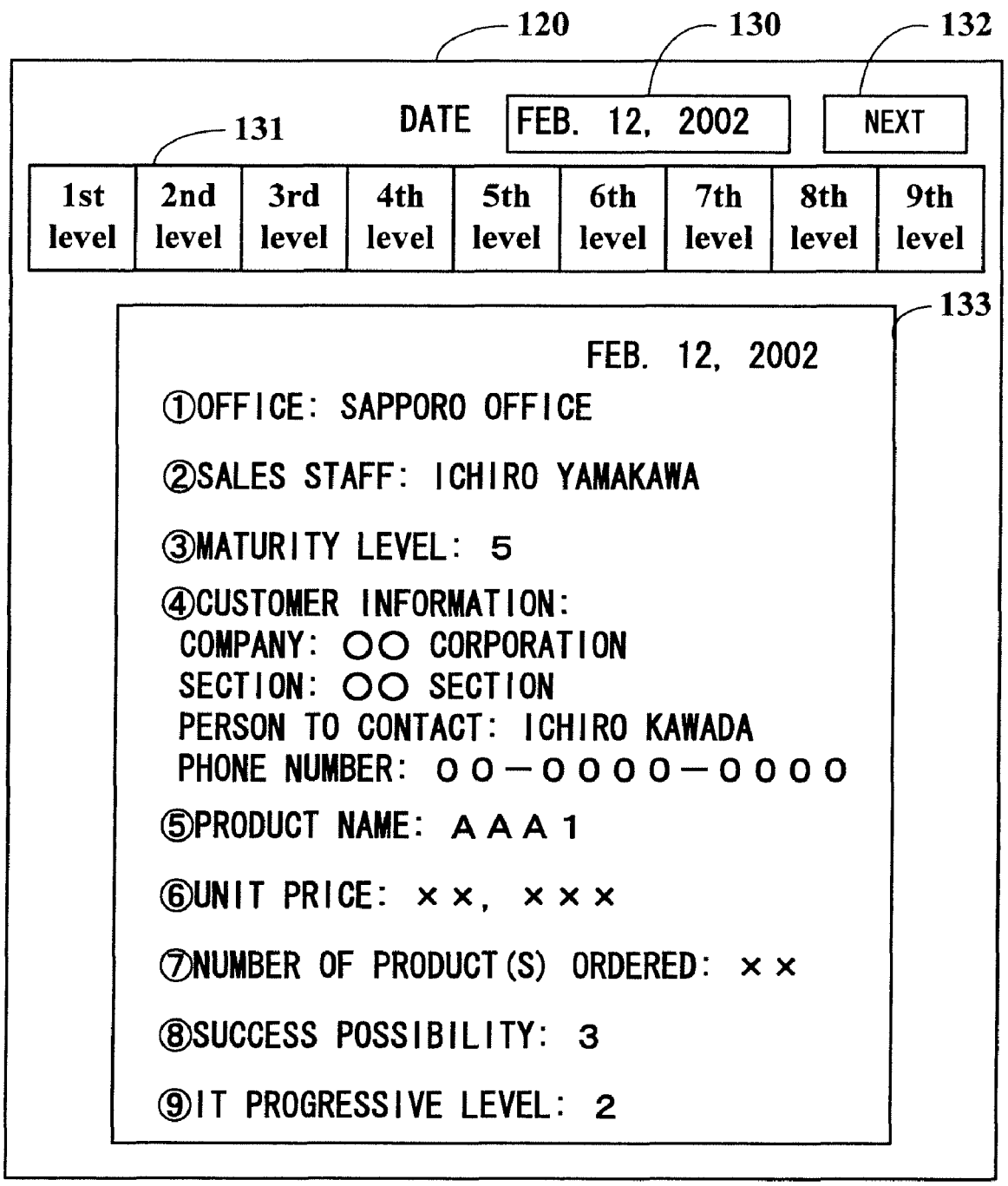
FIG. 21 is a diagram showing a page which is created by a page creator included in the sales-force server shown in FIG. 1.

In response to the first request, the page creator 23 creates a page 120 shown in FIG. 21. The page 120 includes four fields 130 to 133. The field 130 is so set that the date indicated in the item memo can be specified. The field 131 is so set that the maturity levels of the sales activities can graphically be displayed. The field 132 is so set that the different item memo can be requested. The field 133 is so set that an image representing the contents of a particular item memo can be displayed. The item-memo data 116 of the maturity level corresponding to a clicked portion of the field 131 is displayed in the field 133. The page creator 23 sends the page 120 to the terminal 60 or 61 having sent the first request therefor.

Figure 22:
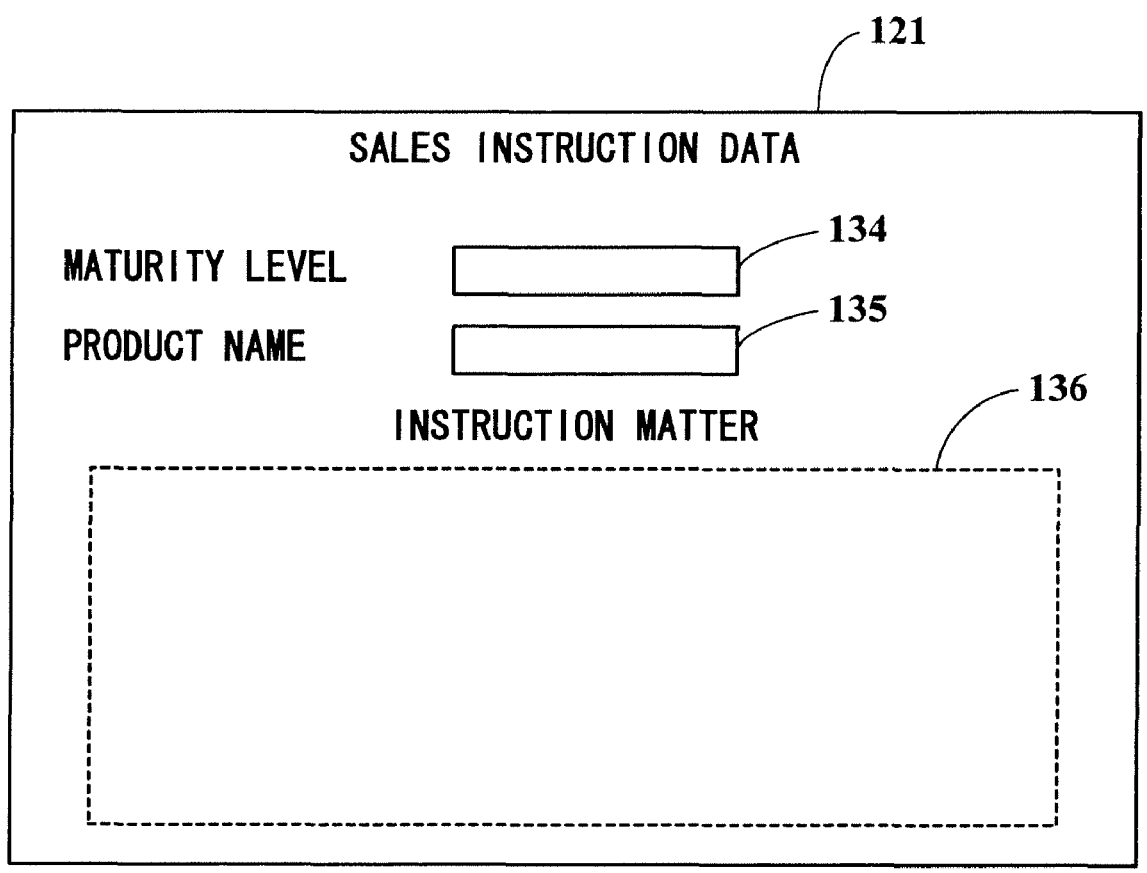
FIG. 22 is a diagram showing another page which is created by the page creator.

In response to the second request, the page creator 23 creates a page 121 shown in FIG. 22. The page 121 includes three fields 134 to 136. The field 134 is so set that the maturity level of the sales activities (the business transaction) can be specified. The field 135 is so set that the product name can be specified. The field 136 is so set that an image representing the instruction matter included in the sales-instruction data 117 can be displayed. The page creator 23 sends thus created page 121 to the terminal 60 or 61 having sent the second request therefor.

Figure 23:
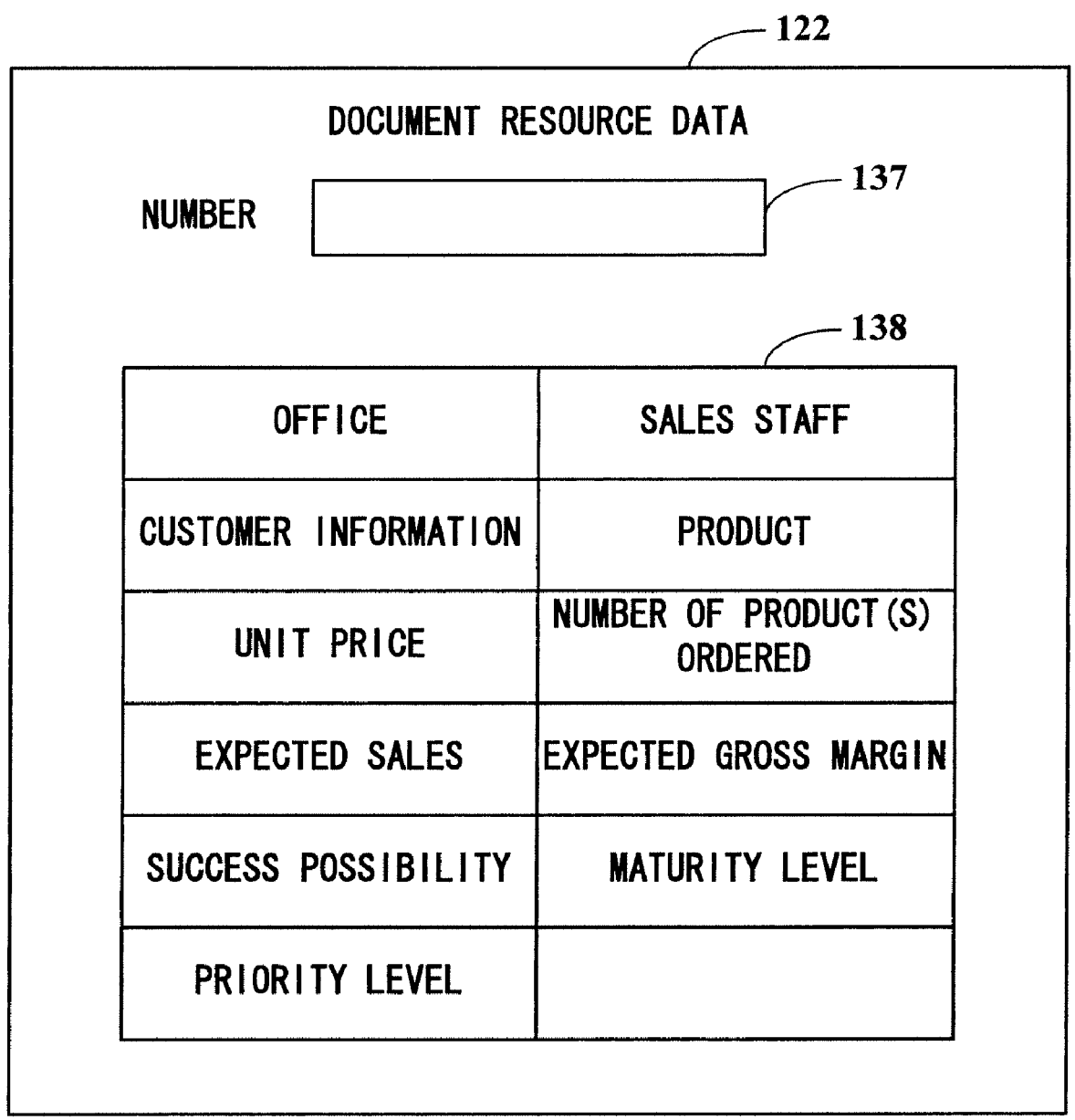
FIG. 23 is a diagram showing still another page created by the page creator.

In response to the third request, the page creator 23 creates a page 122 shown in FIG. 23. The page 122 includes two fields 137 and 138. The field 137 is so set that the number assigned to the document-resource data 118 can be specified. The field 138 is so set that the image representing the document-resource data 118 can be displayed therein. The page creator 23 sends the page 122 to the terminal 60 or 61 having sent the third request therefor.

Figure 24:
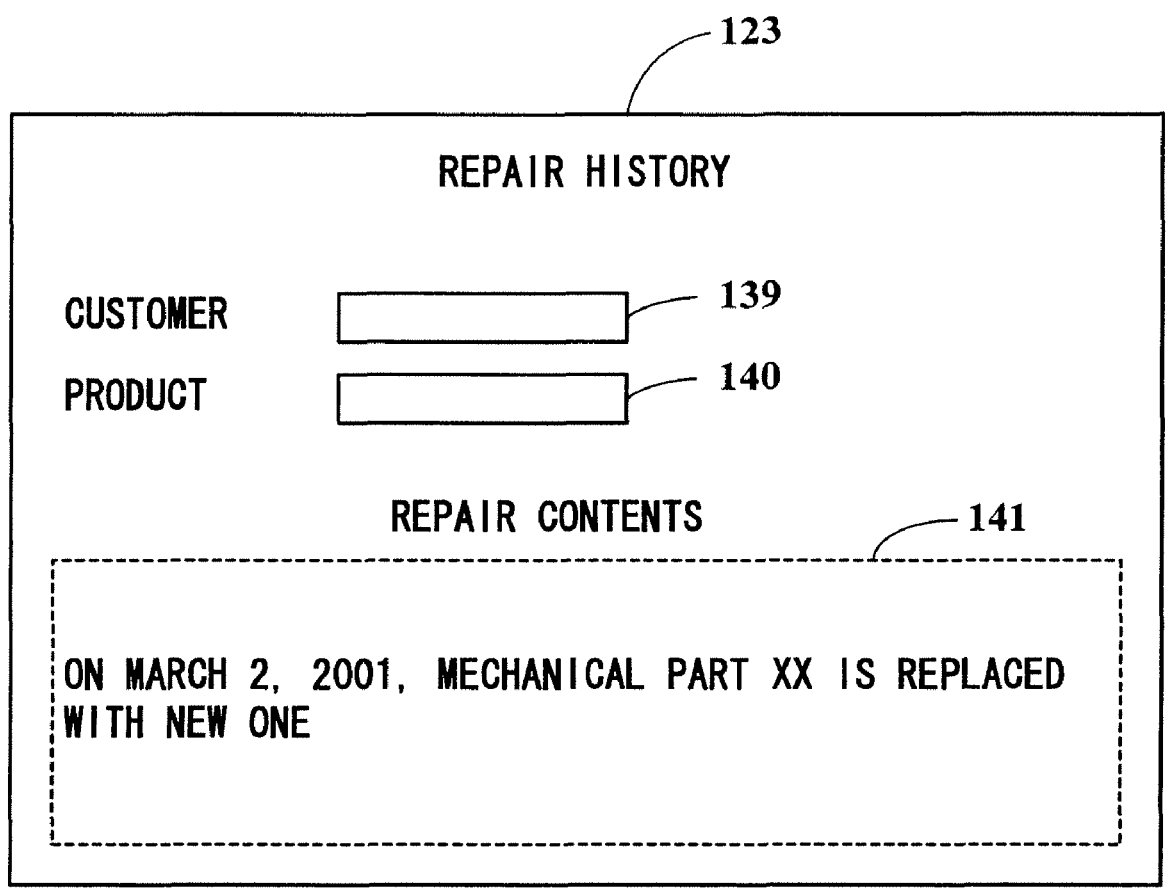
FIG. 24 is a diagram showing still yet another page created by the page creator.

In response to the fourth request, the page creator 23 creates a page 123 shown in FIG. 24. The page 123 includes three fields 139 to 141. The field 139 is so set that the customer name can be displayed therein. The field 140 is so set that the product name of a repaired product is displayed therein. The field 141 is so set that the text data regarding the repair of the product is displayed therein. The page creator 23 sends the page 123 to the terminal 60 or 61 having sent the fourth request therefor.

Figure 25:
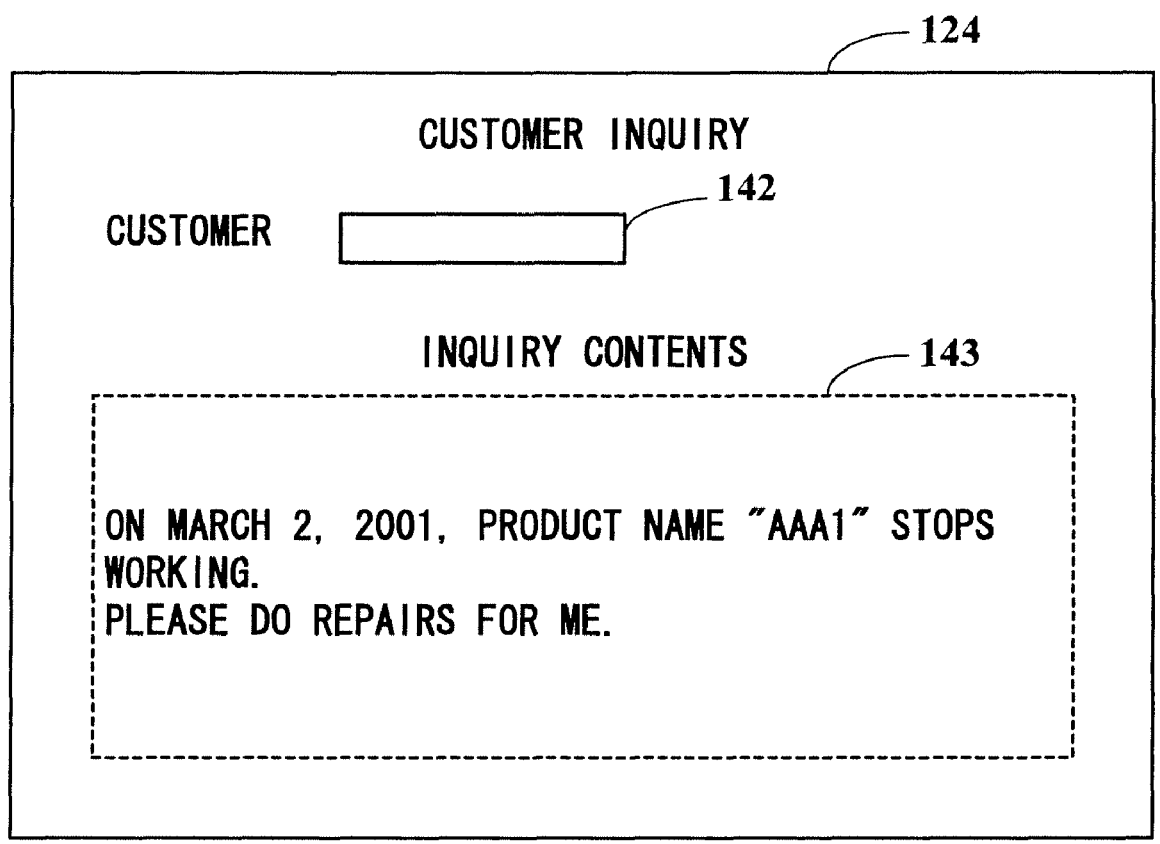
FIG. 25 is a diagram showing further page created by the page creator.

In response to the fifth request, the page creator 23 creates a page shown in FIG. 25. The page 124 includes two fields 142 and 143. The field 142 is so set that the customer name can be displayed therein. The field 143 is so set that the text information regarding the inquiry of the customer can be displayed therein. The page creator 23 sends the page 124 to the terminal 60 or 61 having sent the fifth request therefor.

Figure 26:
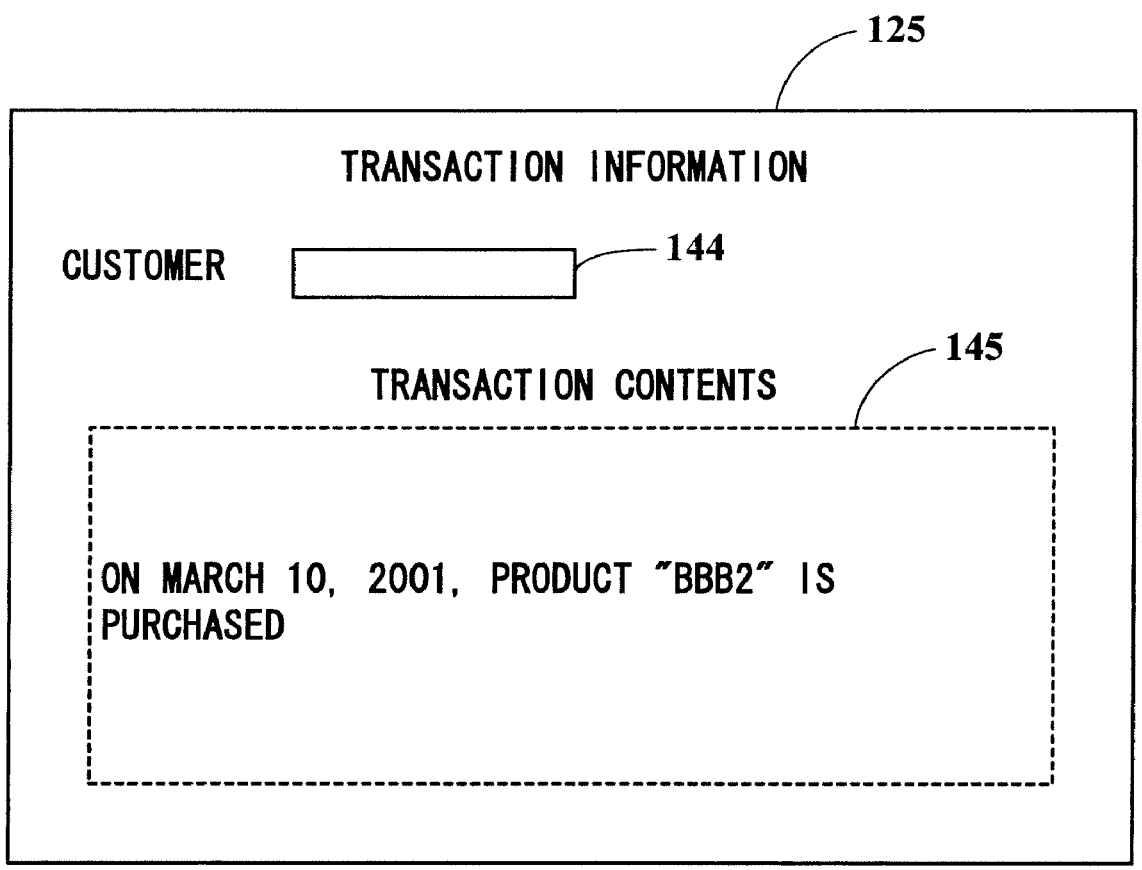
FIG. 26 is a diagram showing still further page created by the page creator.

In response to the sixth request, the page creator 23 creates the page 125 shown in FIG. 26. The page 125 includes two fields 144 and 145. The field 144 is so set that the customer name can be displayed therein. The field 145 is so set that the text information of the business transaction to be dealt with the customer can be displayed therein. The page creator 23 sends the page 125 to the terminal 60 or 61 having sent the sixth request therefor.

Upon reception of any of the pages 120 to 125 from the sales-force server 20, the network application 84 or 90 displays the received page on the output device 82 or 88.

Figure 27A:
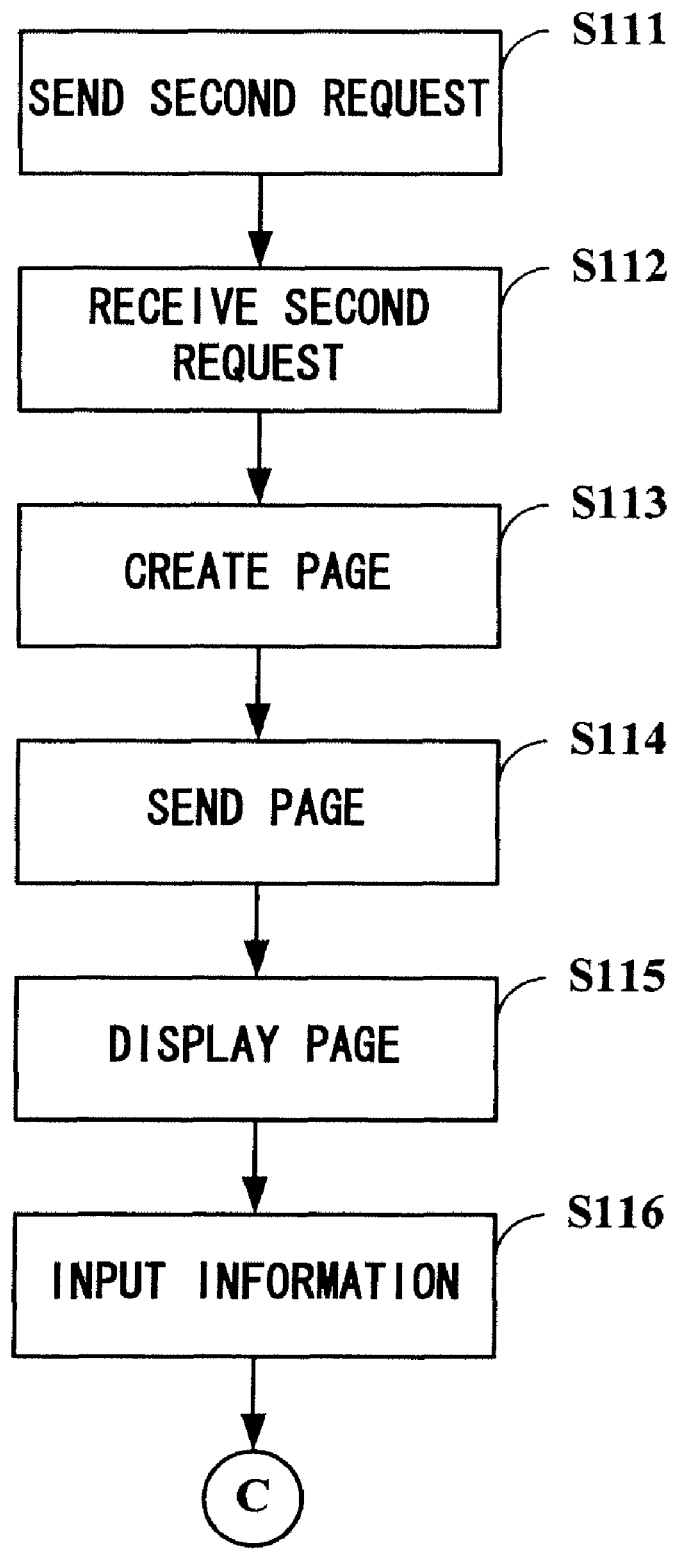
FIGS. 27A and 27B are diagrams showing a process for displaying sales-instruction data.
Figure 27B:
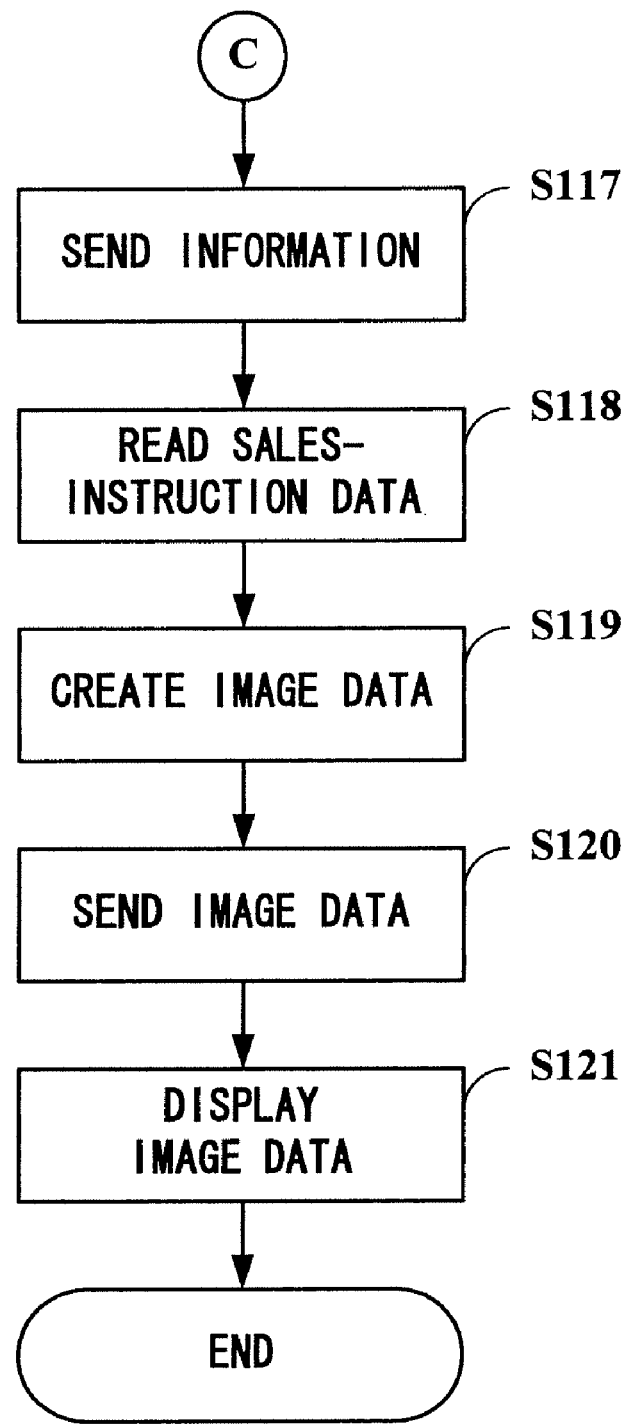

FIGS. 27A and 27B are flowcharts showing a process for displaying the sales-instruction data 117, using the output device 88.

In this process, in accordance with the sales-staff operation of the input device 87, the terminal 61 sends the second request regarding the sales-instruction data 117 to the sales-force server 20 (Step S111). Upon this, the sales-force server 20 receives the second request (Step S112).

Upon reception of the second request, the page creator 23 creates the page 121 shown in FIG. 22 (Step S113). After this, the page creator 23 sends the created page 121 to the terminal 61 having sent the second request therefor in the step S111 (Step S114).

In the terminal 61, the network application 90 controls the output device 88 to display the page 121 received from the sales-force server 20 (Step S115). In accordance with the sales-staff operation, the input device 87 inputs the maturity level corresponding to the sales-instruction data 117, in the field 134 of the page 121 shown in FIG. 22. In addition, the input device 87 inputs the product name in relation to the sales-instruction data 117, in the field 135 of the page 121 shown in FIG. 22. In this way, the information in relation to the sales-instruction data 117 is input in the terminal 61 (Step S116). The network application 90 sends the information input into the fields 134 and 135 to the sales-force server 20 (Step S117 of FIG. 27B)

In the sales-force server 20, the data processor 22 reads out the sales-instruction data 117 corresponding to the information received from the terminal 61, from the customer database 51 (Step S118). The data processor 22 creates image data representing the instruction matter, which is included in the sales-instruction data 117 and to be displayed in the field 136 of the page 121 shown in FIG. 22 (Step S119). The data processor 22 sends thus created image data to the terminal 61 (Step S120).

In the terminal 61, the network application 90 displays the image data received from the sales-force server 20 in the field 136 (Step S121).

Likewise the process shown in FIGS. 27A and 27B, the network application 84 of the terminal 60 can display the sales-instruction data 117 using the output device 82. In addition, the network applications 84 and 90 can acquire, from the sales-force server 20, the item-memo data 116, the document-resource data 118, and history information of: the business transaction with the customer; the repairs of sold product; and the inquiries from the customer.

For example, the network application 84 can acquire the document-resource data 118 from the sales-force server 20. Upon acquisition of the document-resource data 118, the report processor 85 is activated in response to the manager operation of the input device 81. The report processor 85 creates a report based on the document-resource data 118. The report created by the report processor 85 is displayed on or printed by the output device 82.

Figure 28A:
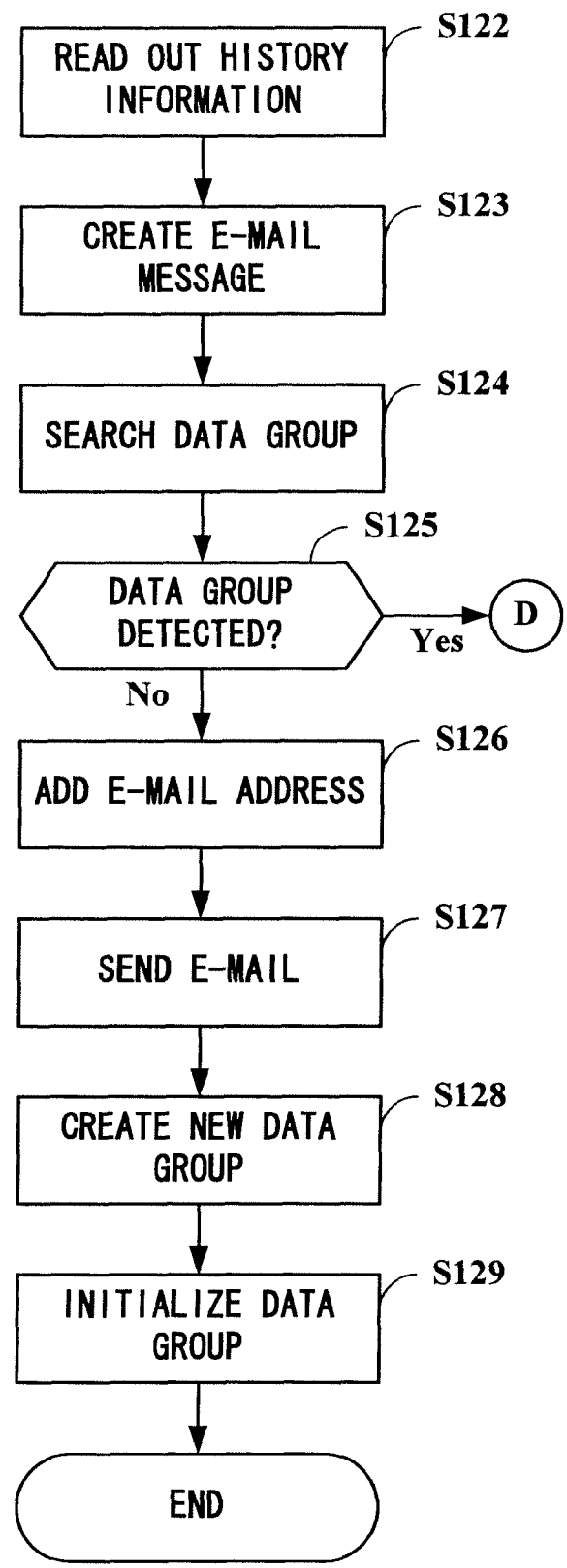
FIGS. 28A and 28B are diagrams showing a process for transmitting an e-mail including history information of repairs of products.
Figure 28B:
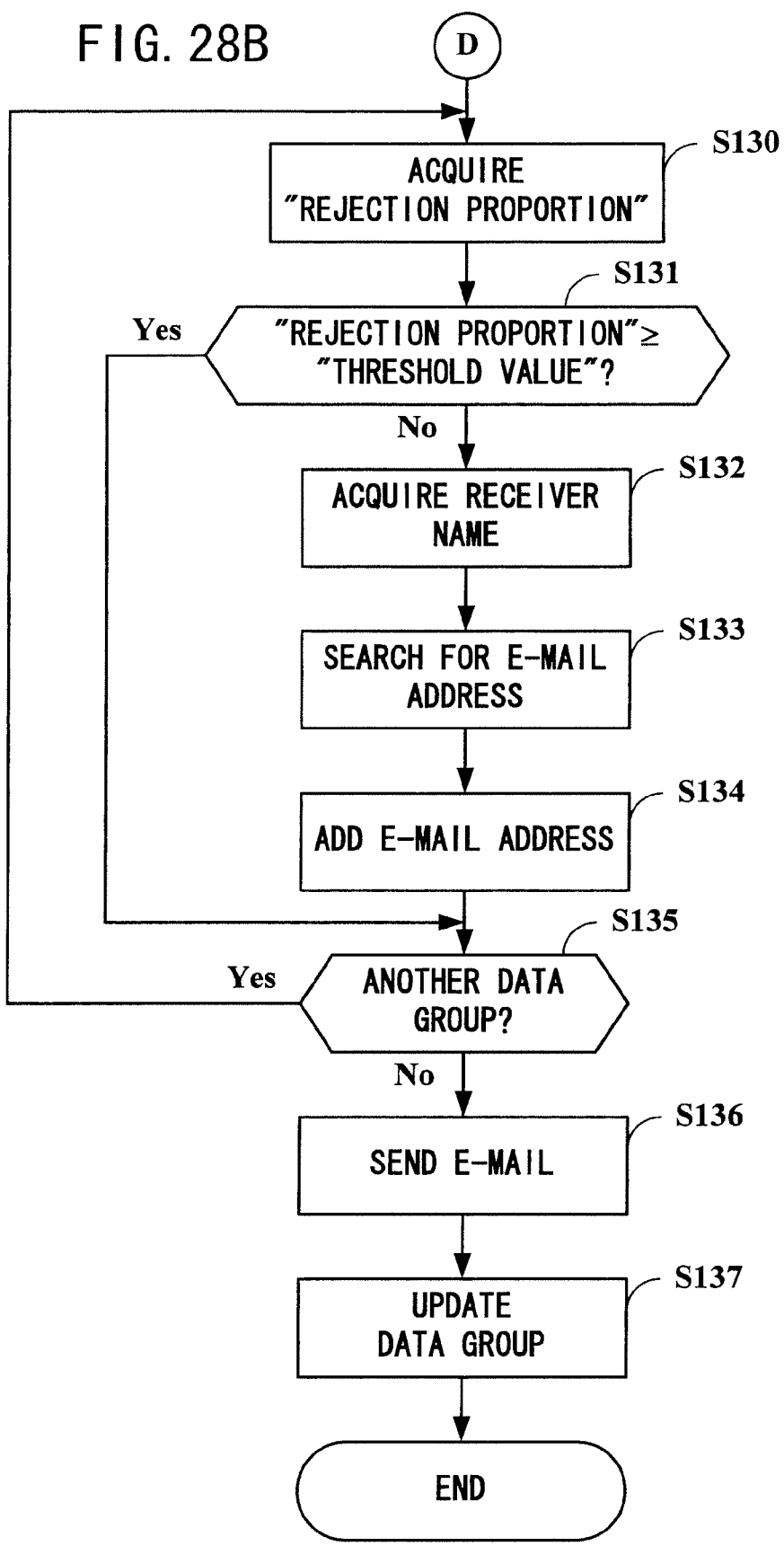

FIGS. 28A and 28B are flowcharts for explaining a process for sending an e-mail including the history information of the repairs of the product.

In this process, the data processor 22 reads out history information of the repairs of the product which is newly recorded in the history database 52 (Step S122). The data processor 22 composes an e-mail message including the history information read out in the step S122 (Step S123). The data processor 22 searches the reference list 25 for the one data group 114 including the same product name as that shown in the history information read out in the step S122 (Step S124). As a result of the step S124, the data processor 22 determines whether a corresponding data group 114 is detected (Step S125).

In the case where it is determined that there is no corresponding data group 114 in the step S125, the data processor 22 executes the procedures of steps S126 to S129, as will be described below.

The data processor 22 adds e-mail addresses of the mailing list 24, onto the e-mail message created in the step S123, so as to completely form the e-mail (Step S126). The data processor 22 controls the communications controller 21 to send the e-mail to the e-mail server 10 (Step S127). In the e-mail server 10, the e-mail processor 11 carries out a process for transmitting the e-mail received from the sales-force server 20 to the attached addresses. In the sales-force server 20, the data processor 22 creates a new data group 114 to register the product name shown in the history information of the reference list 25 (Step S128). The data processor 22 assigns a numeral number of "1" into the "number of transmission times" included in the data group 114 created in the step S128, in order to initialize the created data group 114 (Step S129). After the step S129, the data processor 22 completes the process shown in FIGS. 28A and 28B.

In the case where it is determined that the data group 114 exits in the step S125, the data processor 22 acquires the "rejection proportion" included in the corresponding data group 114 (Step S130 of FIG. 28B). The data processor 22 determines whether the acquired "rejection proportion" is equal to or greater than a predetermined threshold value (Step S131).

In the case where it is determined that the "rejection proportion" is smaller than the predetermined threshold value, the data processor 22 acquires the receiver name shown in the data group 114 including the data corresponding to the acquired "rejection proportion" (Step S132). After this, the data processor 22 searches the mailing list 24 for an e-mail address corresponding to the acquired receiver (Step S133). The data processor 22 attaches the e-mail address obtained in the step S133, to the e-mail message (Step S134). In the case where it is determined that the "rejection proportion" is equal to or greater than the predetermined threshold value, the procedures of the steps S132 to 134 are skipped.

The data processor 22 determines whether there is another data group 114 which has been retrieved by searching the reference list 25 in the step S124 (Step S135). In the case where it is determined that there is another data group 114, the data processor 22 returns to the procedure of the step S130. In the case where it is determined that there is no data group 114, the data processor 22 controls the communications controller 21 to send an e-mail to the e-mail server 10 (Step S136). In the e-mail server 10, the e-mail processor 11 executes a process for sending the e-mail received from the sales-force server 20. In the sales-force server 20, the data processor 22 updates the data group 114 in association with the received e-mail (Step S137).

Likewise the process shown in FIGS. 28A and 28B, the data processor 22 can send an e-mail including the history information of the transaction to the dealt with the customer and the history information of the inquiries from the customer.

Figure 29:
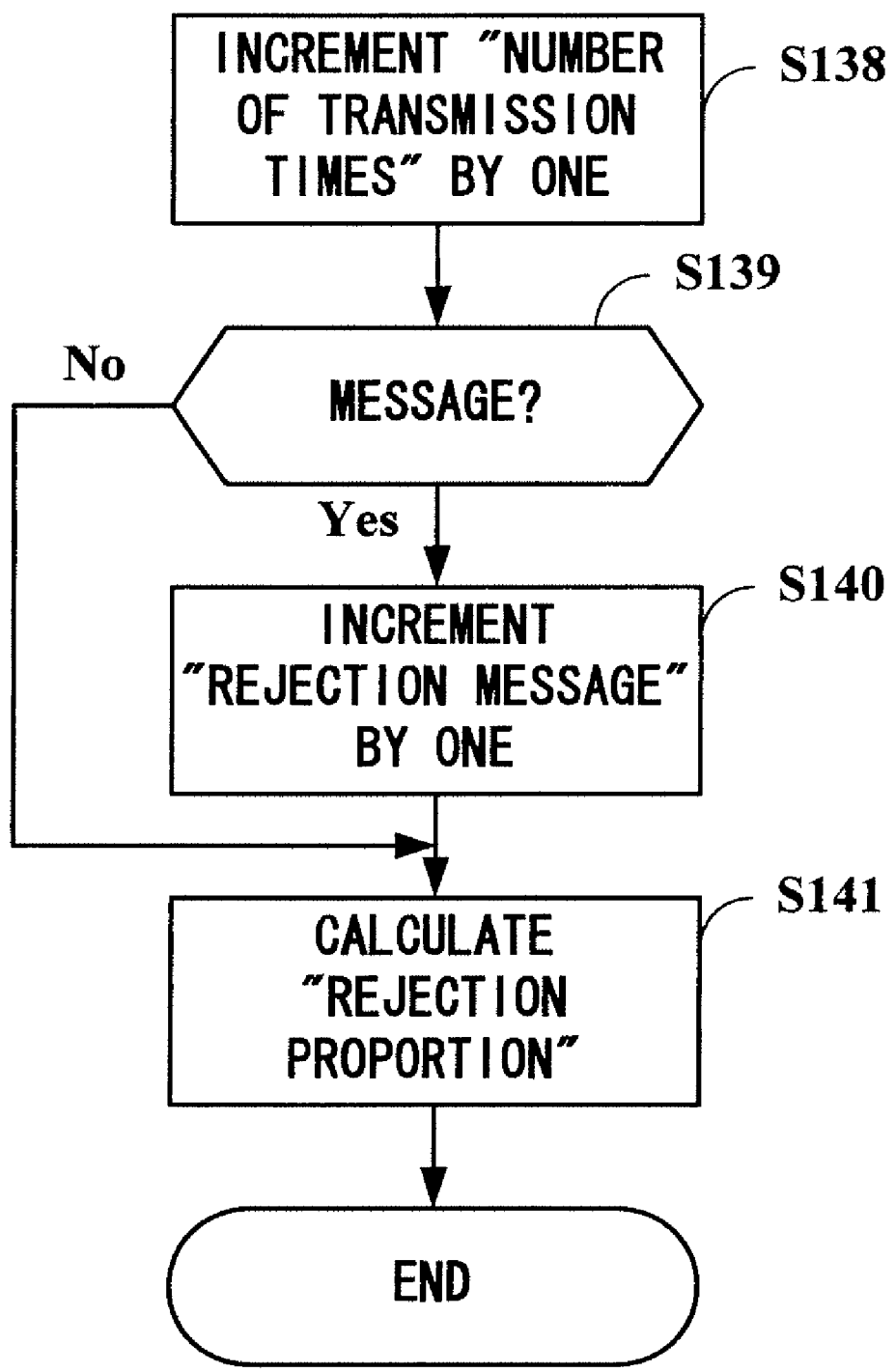
FIG. 29 is a flowchart for specifically explaining a part of the process of FIG. 28B.

FIG. 29 shows a flowchart for explaining the procedures of the step S137 shown in FIG. 28B, in more detail.

In FIG. 29, the data processor 22 increments the "number of transmission times" of the data group 114 by one, in association with the e-mail sent in the step S136 of FIG. 28B (Step S138). The data processor 22 determines whether a rejection message, representing that a corresponding e-mail has been rejected, is sent from the receiver of the corresponding e-mail (Step S139).

In the case where it is determined that the rejection message is sent, the data processor 22 increments the "rejection message" of the data group 114 by one (Step S140).

On the contrary, in the case where it is determined that there is no rejection message transmitted within a predetermined period of time, the procedure of the step S140 is not executed.

The data processor 22 obtains the rejection proportion of the "rejection message" to the "number of transmission times" in the data group 114 (Step S141). Having performed this, the rejection proportion included in the data group 114 is updated.

For example, a staff of a store operates the input device 87 of the terminal 61, in order to check the e-mail. In response to the staff operation of the input device 87, the mailer 89 accesses the e-mail server 10. The mailer 89 downloads an e-mail(s) from an e-mail box 100 corresponding to the staff to the terminal 61, thereby displaying the e-mail(s) on the output terminal 88.

Likewise the staff of the store, the sales staff or manager of the company operates the terminal 60, to check their e-mails.

As described above, information regarding the sales activities can be shared between the plurality of staffs in the company, and hence contributing to the sales promotion.

In the first embodiment of the present invention, the e-mail server 10 provides staffs other than the corresponding sales staff, with e-mails regarding the sales activities performed between the customer and the sales staff, so that such information can fully be used.

Figure 30A:
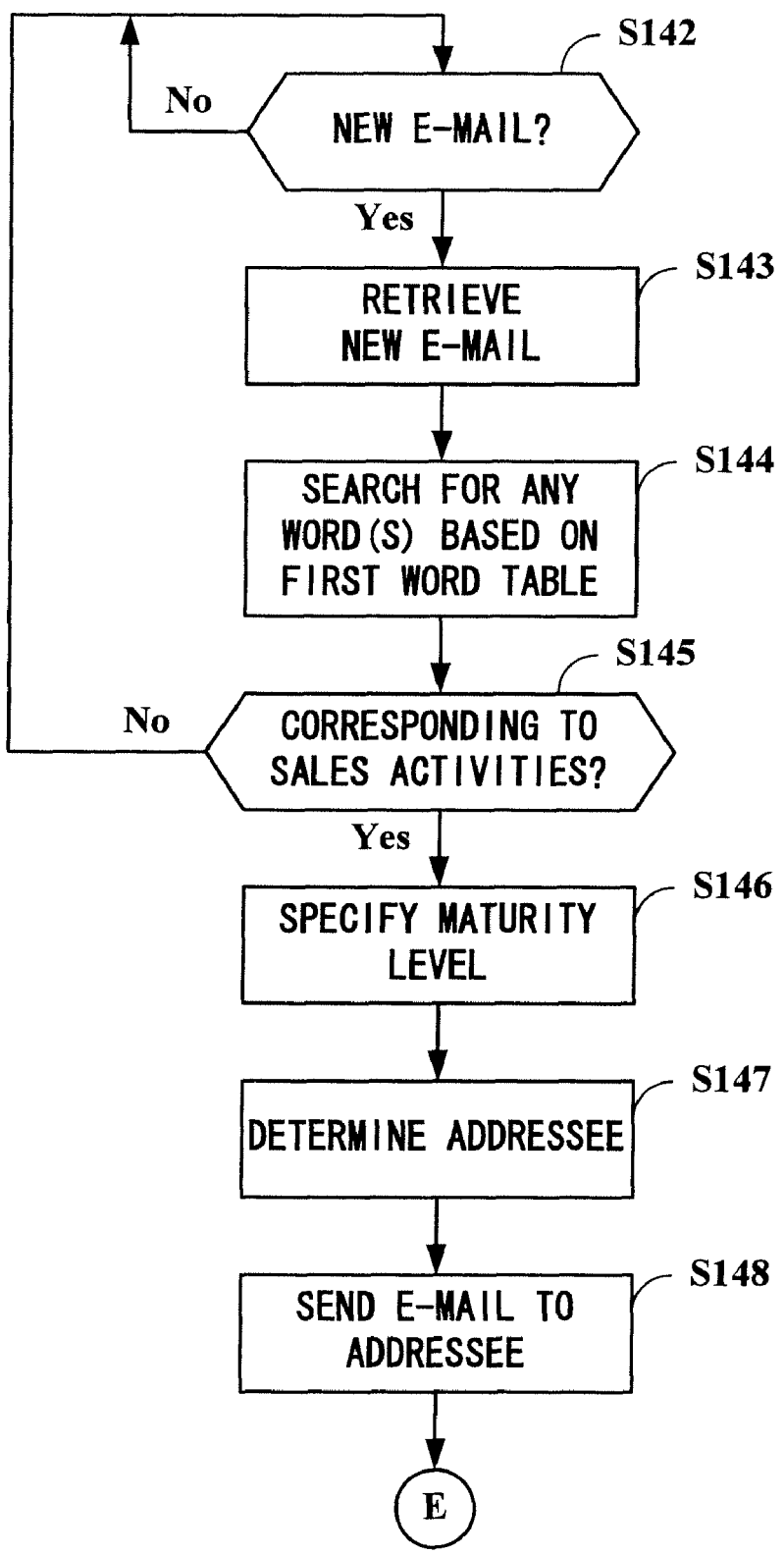
FIGS. 30A and 30B are flowcharts for explaining a process for transmitting an e-mail regarding sales activities.
Figure 30B:
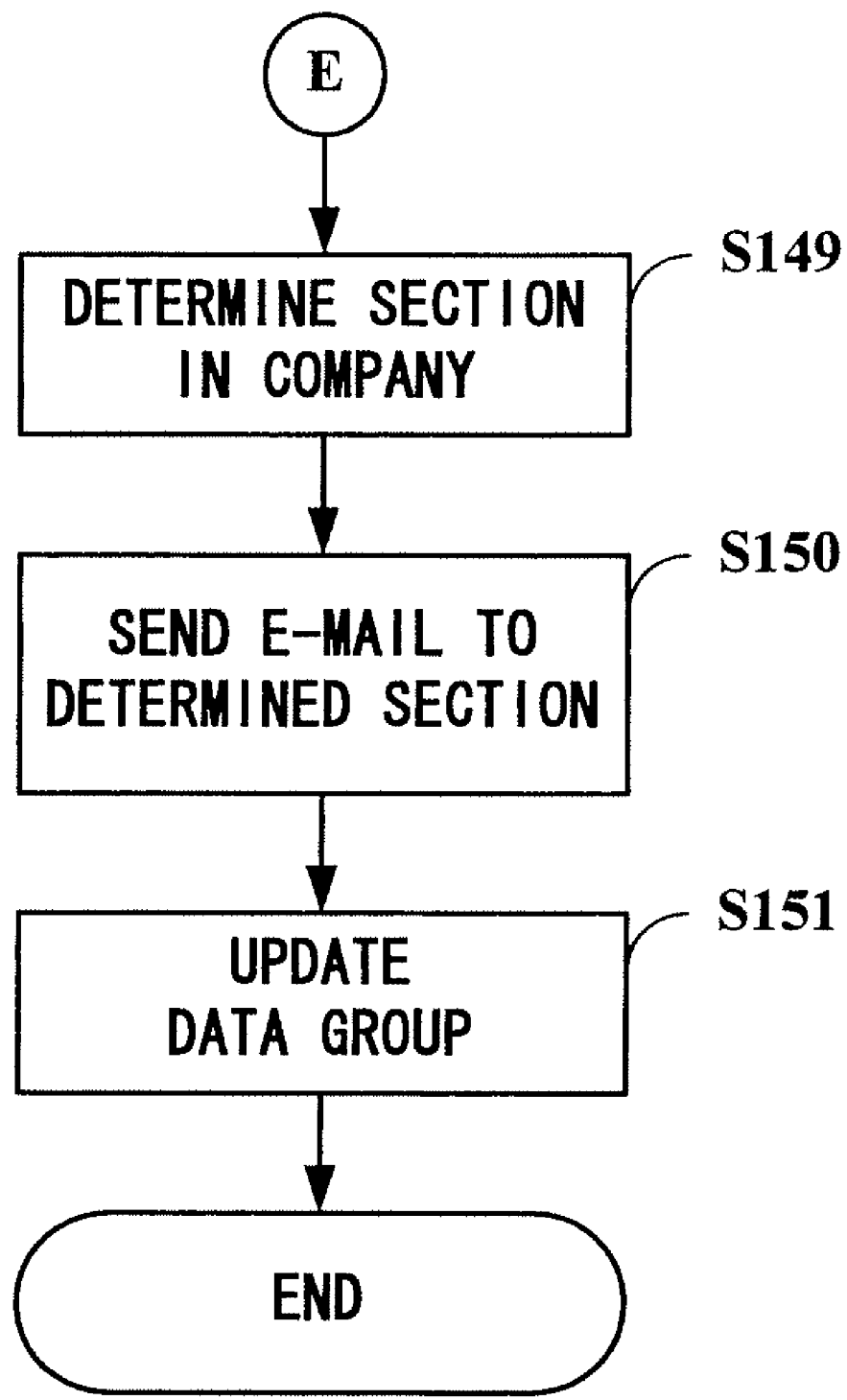

FIGS. 30A and 30B are flowcharts for explaining a process for transmitting an e-mail regarding the sales activities. At the beginning of the process shown in FIG. 30A, the e-mail processor 11 checks the plurality of e-mail boxes 100 and the plurality of e-mail memories 101 which are included in the e-mail storage section 12.

The e-mail processor 11 determines whether there is a new e-mail stored in the e-mail storage section 112 (Step S142). In the case where it is determined that a new e-mail is not detected in the step S142, the e-mail processor 11 is suspended, awaiting the detection of a new e-mail.

In the case where it is determined that a new e-mail is detected, the e-mail processor 11 retrieves the detected new e-mail from the e-mail storage section 12 (Step S143). The search section 13 searches the retrieved e-mail for any word(s) registered in the first word table 15 (Step S144).

The e-mail processor 11 determines whether the e-mail retrieved in the step S143 is one regarding the sales activities, based on the search result done using the first word table 15 (Step S145). In the case where it is determined that the retrieved e-mail has nothing to do with the sale activities, the e-mail processor 11 returns to the procedure of the step S142.

On the contrary, in the case where it is determined that the retrieved e-mail is one regarding the sales activities, the e-mail processor 11 specifies the maturity level of the sales activities corresponding to the e-mail (Step S146). The e-mail processor 11 picks up the address of the e-mail concerned from the mailing list 14 by referring to the customer-importance list 17 and the product-importance list 18 (Step S147). The e-mail processor 11 transmits an e-mail to the address picked up in the step S147 (Step S148). The e-mail transmitted by the e-mail processor 11 in the step S148 includes both an e-mail message of the e-mail retrieved from the e-mail storage section 12 in the step S143, and the maturity level specified in the step S146.

In addition, the search section 13 searches the e-mail retrieved in the step S143 for the words registered in the second word table 16. The e-mail processor 11 determines one section of the company, to which the e-mail retrieved in the step S143 is transmitted, based on the search result of the second word table 16 (Step S149 of FIG. 30B).

The e-mail processor 11 transmits an e-mail to the section determined in the step S149 (Step S150).

The e-mail processor 11 updates the data group 112 corresponding to one or more e-mails transmitted respectively in the steps S148 and S150, in the reference list 19 (Step S151).

Figure 31:
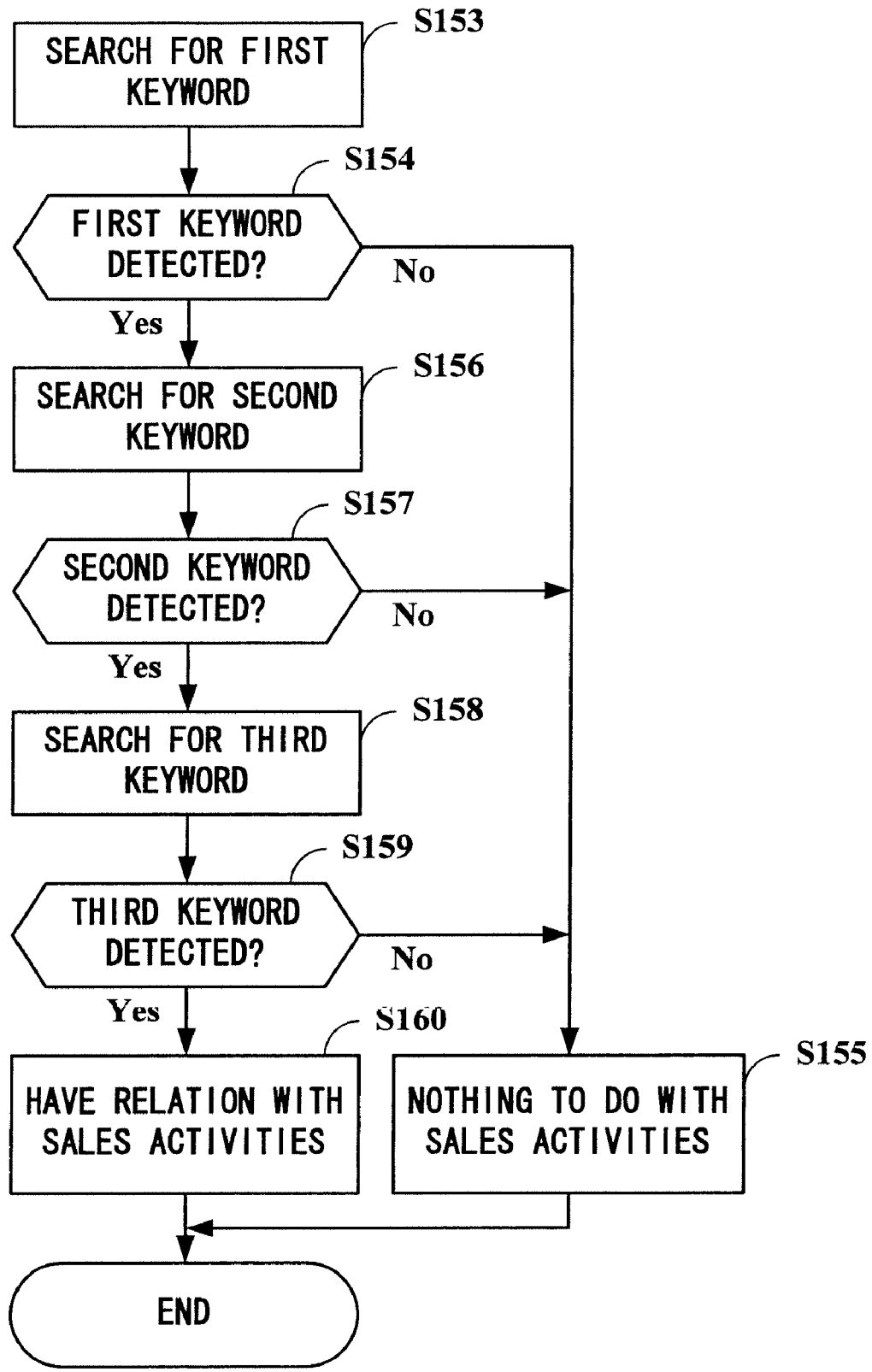
FIG. 31 is a flowchart for specifically explaining a part of the process of FIG. 30A.

FIG. 31 is a flowchart for explaining the procedure of the step S144 of FIG. 30A, in more detail.

As shown in FIG. 31, the search section 13 searches the e-mail message retrieved by the e-mail processor 11 in the step S143 of FIG. 30A, for a first keyword registered in the first column 103 of the first word table 15 (Step S153). The search section 13 determines whether the first keyword has been searched out (Step S154). In the case where it is determined that the first keyword has not been searched out in the step S154, the e-mail retrieved by the e-mail processor 11 has nothing to do with the sales activities (Step S155).

In the case where it is determined that the first keyword has been searched out in the step S154, the search section 13 searches the e-mail message for a second keyword registered in the second column 104 of the first word table 15, within a range of a predetermined number of words (e.g. five words) following the found first keyword (Step S156). The search section 13 determines whether the second keyword has been detected in the e-mail message (Step S157). In the case where the second keyword has not been detected in the step S157, it is determined the e-mail retrieved by the e-mail processor 11 has nothing to do with the sales activities, in the step S155.

In the case where it is determined that the second keyword(s) has been detected in the step S157, the search section 13 searches the retrieved e-mail for a third keyword registered in the third column 105 of the first word table 15, within a range of a predetermined number of words (e.g. five words) following the first keyword detected in the step S154 in the e-mail message (Step S158). The search section 13 determines whether there is detected the third keyword in the retrieved e-mail message (Step S159). In the case where it is determined that there is no third keyword detected in the e-mail message, it is determined that the e-mail retrieved by the e-mail processor 11 has nothing to do with the sales activities in the step S155.

In the case where it is determined that there is the third keyword detected in the e-mail message in the step S159, the e-mail retrieved by the e-mail processor 11 has some kind of relation with the sales activities (Step S160).

Figure 32:
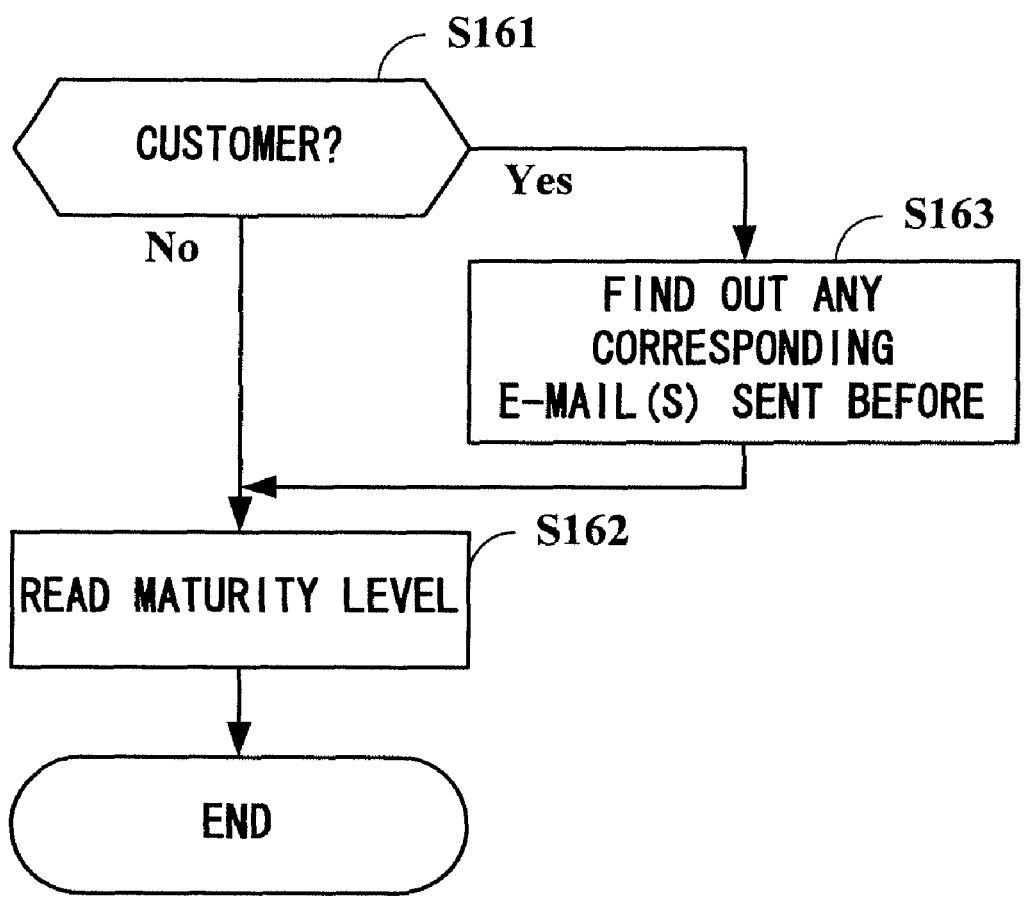
FIG. 32 is a flowchart for specifically explaining a part of the process of FIG. 30A.

FIG. 32 is a flowchart for explaining the procedure of the step S146 of FIG. 30A, in more detail.

As shown in FIG. 32, the e-mail processor 11 determines whether the sender of the e-mail retrieved in the step S143 of FIG. 30A is a customer (Step S161). For example, the e-mail processor 11 finds out the sender of the e-mail, by referring to the e-mail addresses included in the customer-importance list 17. If the e-mail address of the sender is the same as the one included in the customer-importance list 17, the sender is a customer.

On the contrary, in the case where the sender of the e-mail is not a customer, the e-mail has been sent from a sales staff of the company. In the case where it is determined that the sender of the e-mail is the sales staff, the e-mail processor 11 reads out a numeral number indicating the maturity level of the sales activities, from the e-mail message (Step S162).

In the case where it is determined that the sender of the e-mail is a customer in the step S161, the e-mail processor 11 obtains any e-mails addressed to the customer from the sales staff, from the e-mail memory 101 (Step S163). If there are a plurality of e-mails sent from the sales staff to the customer, the e-mail processor 11 reads out the latest e-mail, of the plurality of e-mails. After this, the e-mail processor 11 advances to the procedure of the step S162.

Figure 33:
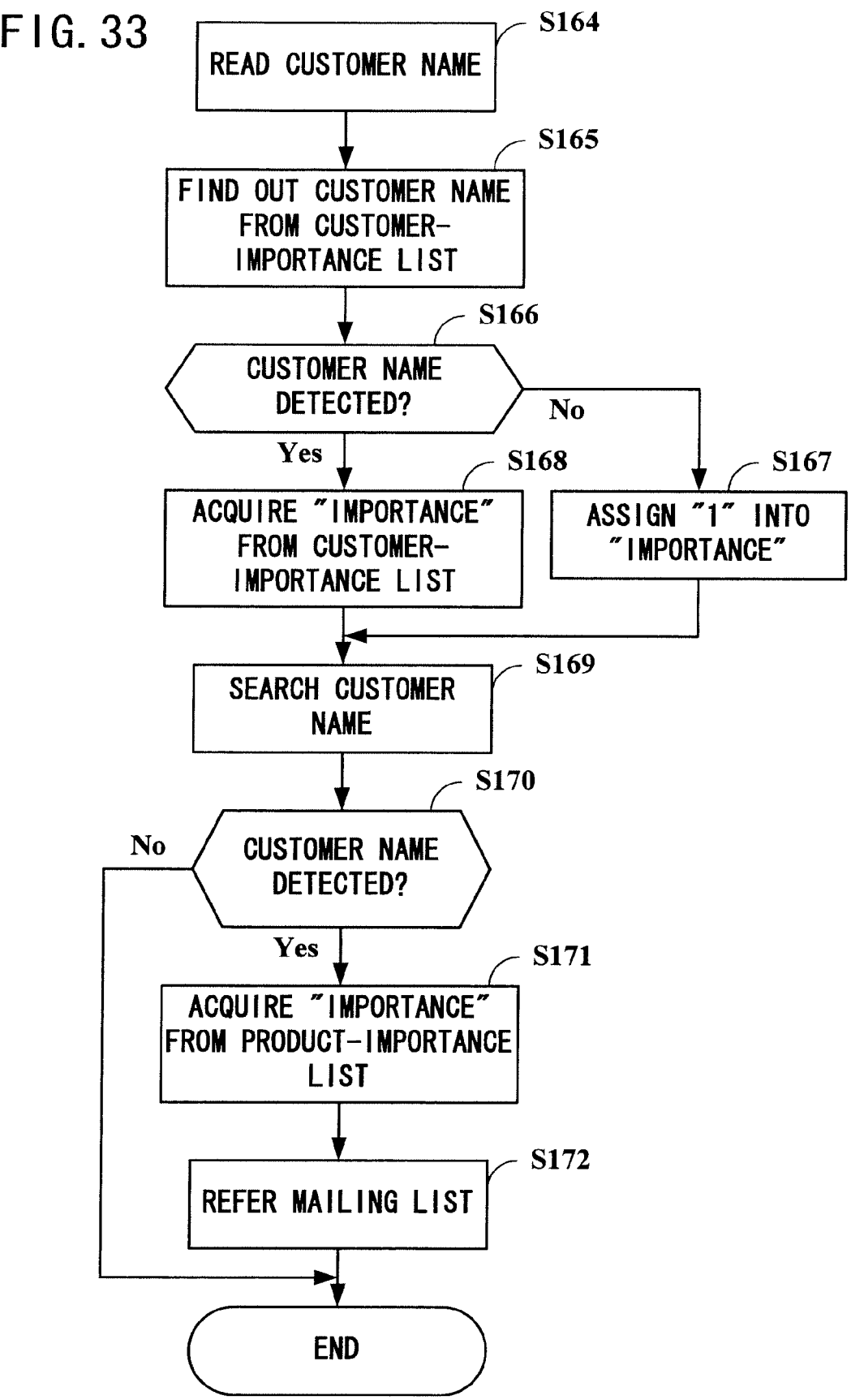
FIG. 33 is a flowchart for specifically explaining a part of the process of FIG. 30A.

FIG. 33 is a flowchart for specifically explaining the procedure of the step S147 of FIG. 30A.

As shown in FIG. 33, in the case where the e-mail retrieved in the step S143 of FIG. 30A has some kind of relation with the sales activities, the e-mail processor 11 reads out the customer name from the header of the e-mail (Step S164). The e-mail processor 11 searches the customer-importance list 17 for the customer name read out in the step S164 (Step S165).

The e-mail processor 11 determines whether a customer name has been detected from the customer-importance list 17, as a search result of the step S165 (Step S166). In the case where the customer name has not been detected in the step S166, the e-mail processor 11 assigns a numerical number of "1" into the "importance" corresponding to the customer (Step S167). In the case where it is determined that the customer has been detected in the step S166, the e-mail processor 11 acquires the "importance" shown in the data group 110 of the customer-importance list 17 having data of the detected customer (Step S168).

After the steps S167 and S168 are executed, the search section 13 searches the e-mail message for the product name registered in the product-importance list 18 (Step S169). As a search result of the step S169, the e-mail processor 11 determines whether the product name registered in the product-importance list 18 is detected (Step S170). In the case where the product name has not been detected in the step S170, the process shown in FIG. 33 is terminated at this moment.

In the case where it is determined that the product name has been detected in the step S170, the e-mail processor 11 acquires the "importance" of the data group including the data corresponding to the detected product name (Step S171). The e-mail processor 11 refers to the "importance" shown in the mailing list 14, in order to determine the addressee of the e-mail (Step S172). In more particular, the e-mail processor 11 calculates a sum of the "importance" included in the data group 110 and the "importance" included in the data group 111. The e-mail processor 11 compares the calculated sum and the "importance" included in each data group 102 of the mailing list 14. In the case where there is included a data group 102 showing the "importance" which is smaller than the calculated sum, the e-mail processor 11 acquires the e-mail address included in the same data group 102.

Figure 34:
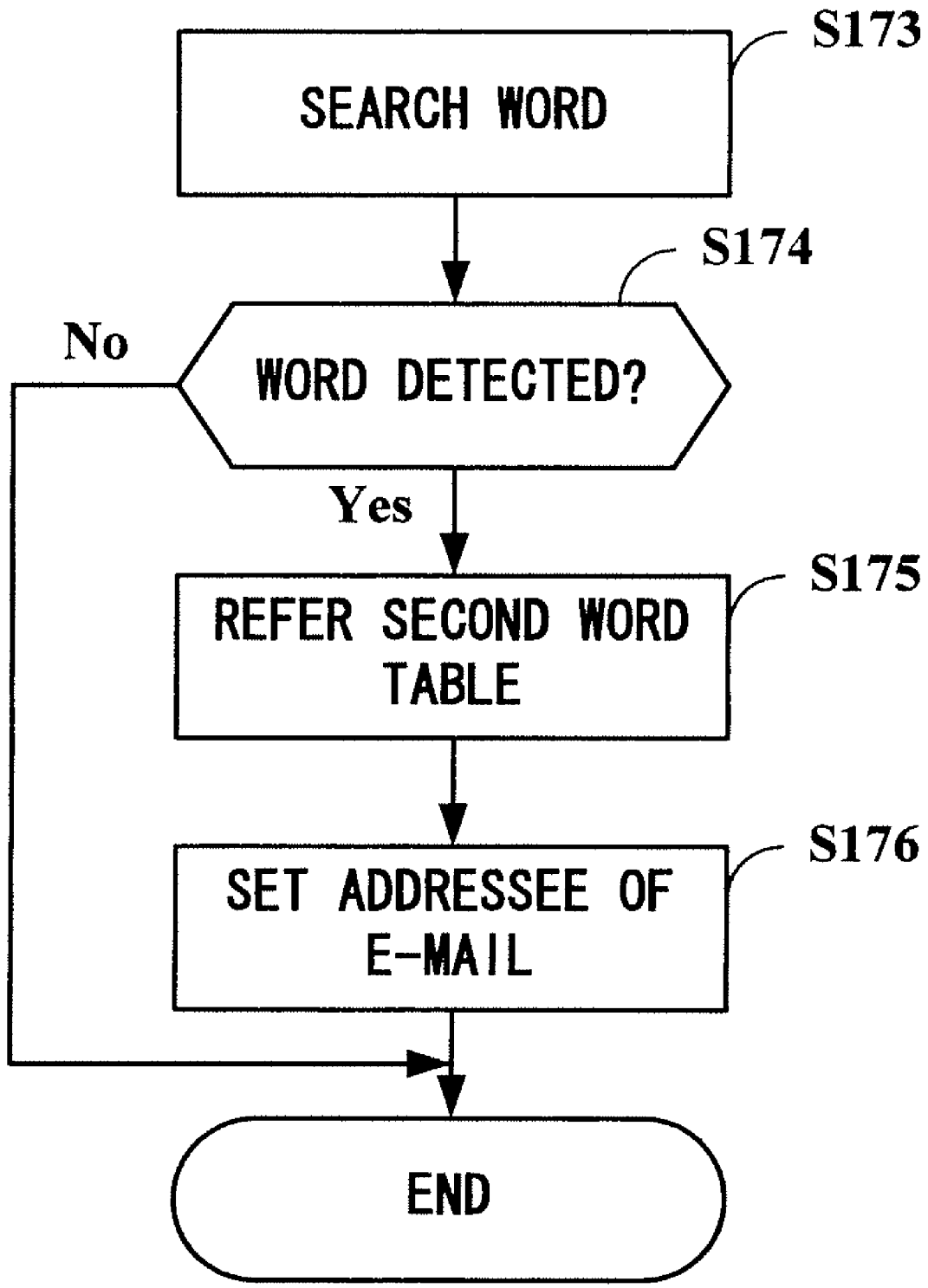
FIG. 34 is a flowchart for specifically explaining a part of the process of FIG. 30B.

FIG. 34 is a flowchart specifically showing the procedure of the step S149 of FIG. 30B.

As shown in FIG. 34, the search section 13 searches the e-mail message retrieved by the e-mail processor 11 in the step S143, for a word registered in the second word table 16 (Step S173). The e-mail processor 11 determines whether the word registered in the second word table 16 has been detected, in the step S173 (Step S174). In the case where it is determined that no word of the second word table 16 has been detected in the step S174, the process shown in FIG. 34 is terminated at this moment.

In the case where it is determined that the word of the second word table 16 has been detected, the e-mail processor 11 identifies a section of the company which corresponds to the detected word, based on the second word table 16 (Step S175). For example, the e-mail processor 11 identifies a section of the company which corresponds to any of the columns 106 to 108 including the detected word. The e-mail processor 11 sets the address of the identified section as the addressee of the target e-mail to be sent (Step S176).

Figure 35:
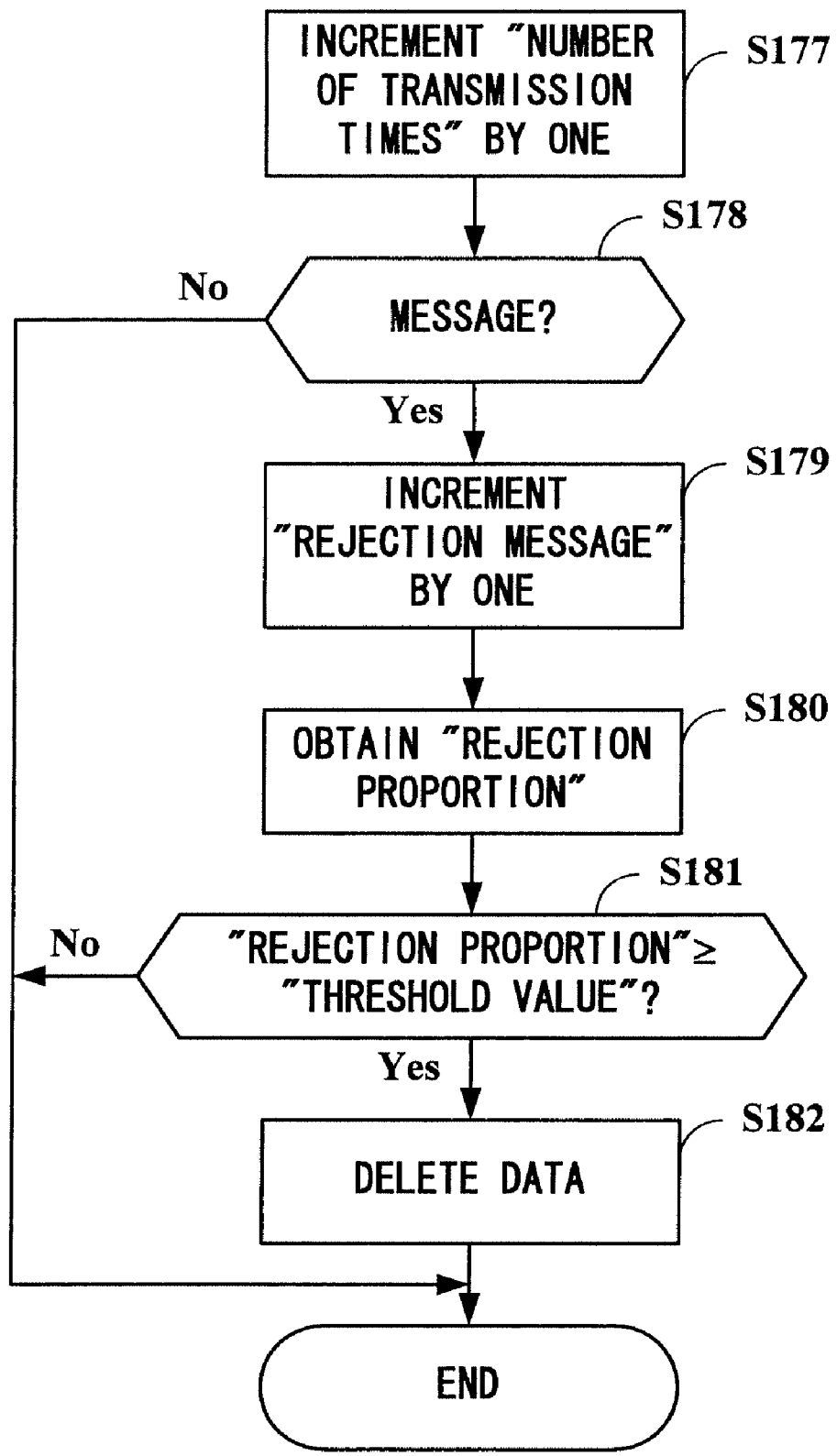
FIG. 35 is a flowchart for specifically explaining a part of the process of FIG. 30B.

FIG. 35 is a flowchart specifically showing the procedure of the step S151 of FIG. 30B.

As shown in FIG. 35, the e-mail processor 11 increments the "number of transmission times", by one, included in the data group 112 corresponding to the e-mail transmitted in the steps S148 and S150 (Step S177). The e-mail processor 11 determines whether there is transmitted a rejection message that the e-mail is rejected, from the receiver of the corresponding e-mail (Step S178). In the case where it is determined that the rejection message has been transmitted, the e-mail processor 11 increments the "rejection message" included in the data group 112 by one (Step S179). On the contrary, in the case where it is determined that no rejection message has been transmitted within a predetermined period of time, the process shown in FIG. 35 is terminated at this moment.

After this, the e-mail processor 11 obtains the "rejection proportion" of the "rejection message" to the "number of transmission times" shown in the corresponding data group 112 (Step S180). Then, the "rejection proportion" of the data group 112 is updated.

The e-mail processor 11 determines whether the updated "rejection proportion" is equal to or greater than a predetermined threshold value (Step S181). In the case where it is determined that the updated "rejection proportion" is smaller than the predetermined threshold value, the e-mail processor 11 terminates the process shown in FIG. 35 at this moment.

In the case where it is determined that the "rejection proportion" is equal to or greater than the predetermined threshold value, in the step S181, the e-mail processor 11 deletes the word corresponding to this "rejection proportion", from the second word table 16. Further, the e-mail processor 11 erases the data group 112 including this "rejection proportion" from the reference list 19 (Step S182).

Second Embodiment

A computer network system according to the second embodiment of the present invention will now be described. In the second embodiment, the sales-force server 20 calculates the usage frequency of a sales tool used for sales activities. The sales-force server 20 transmits data for creating the sales tool, which is frequently used, at first to the terminal 61. Hence, the computer network system according to the second embodiment of the present invention can adequately facilitate the sales activities of the sales staff.

Figure 36:
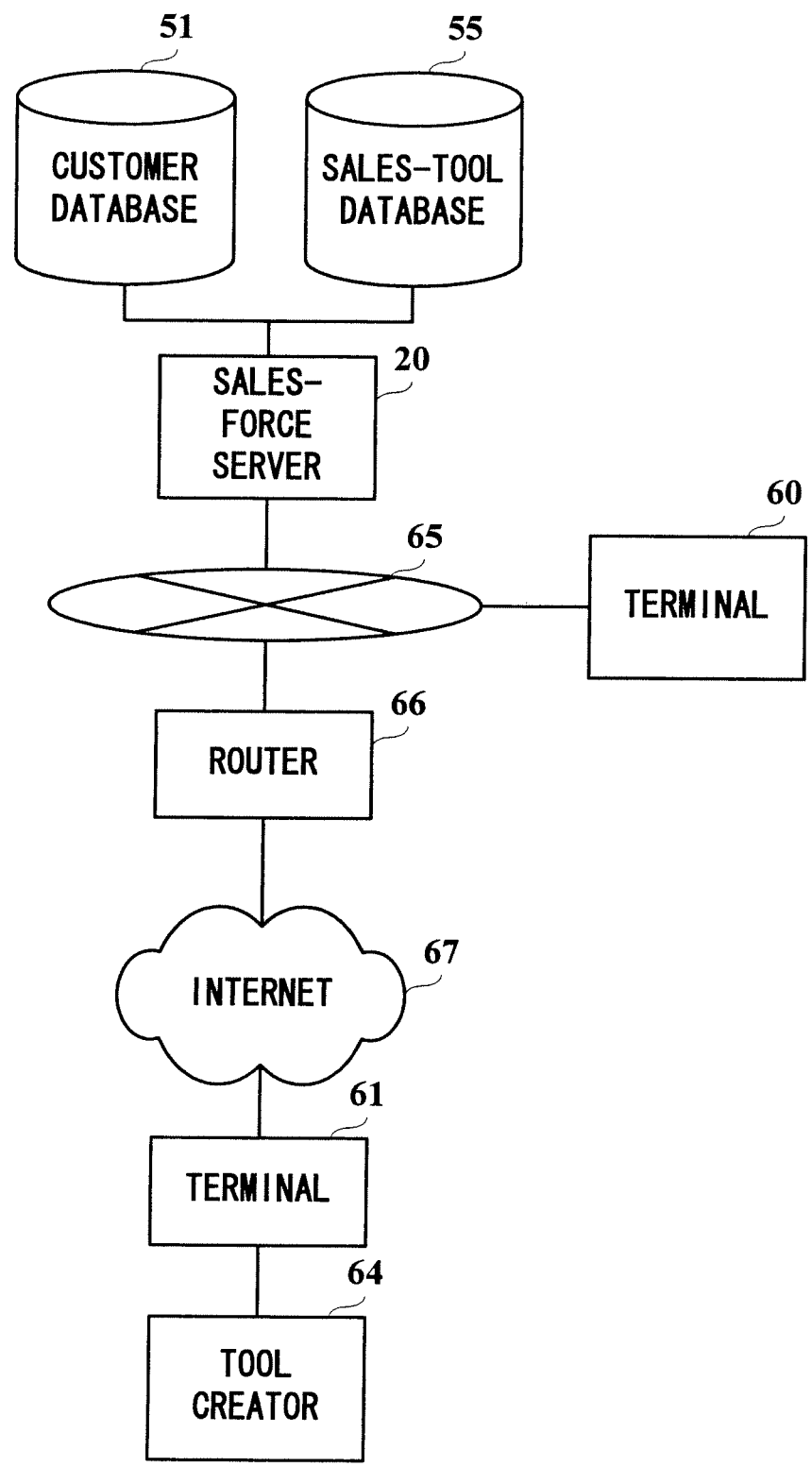
FIG. 36 is a diagram showing a computer network system according to the second embodiment of the present invention.

FIG. 36 shows the computer network system according to the second embodiment of the present invention. As shown in FIG. 36, the system of this embodiment includes the sales-force server 20, the customer database 51, a sales-tool database 55, the terminals 60 and 61, a tool creator 64, the LAN 65, the router 66 and the network 67, such as the Internet, etc.

Figure 37:
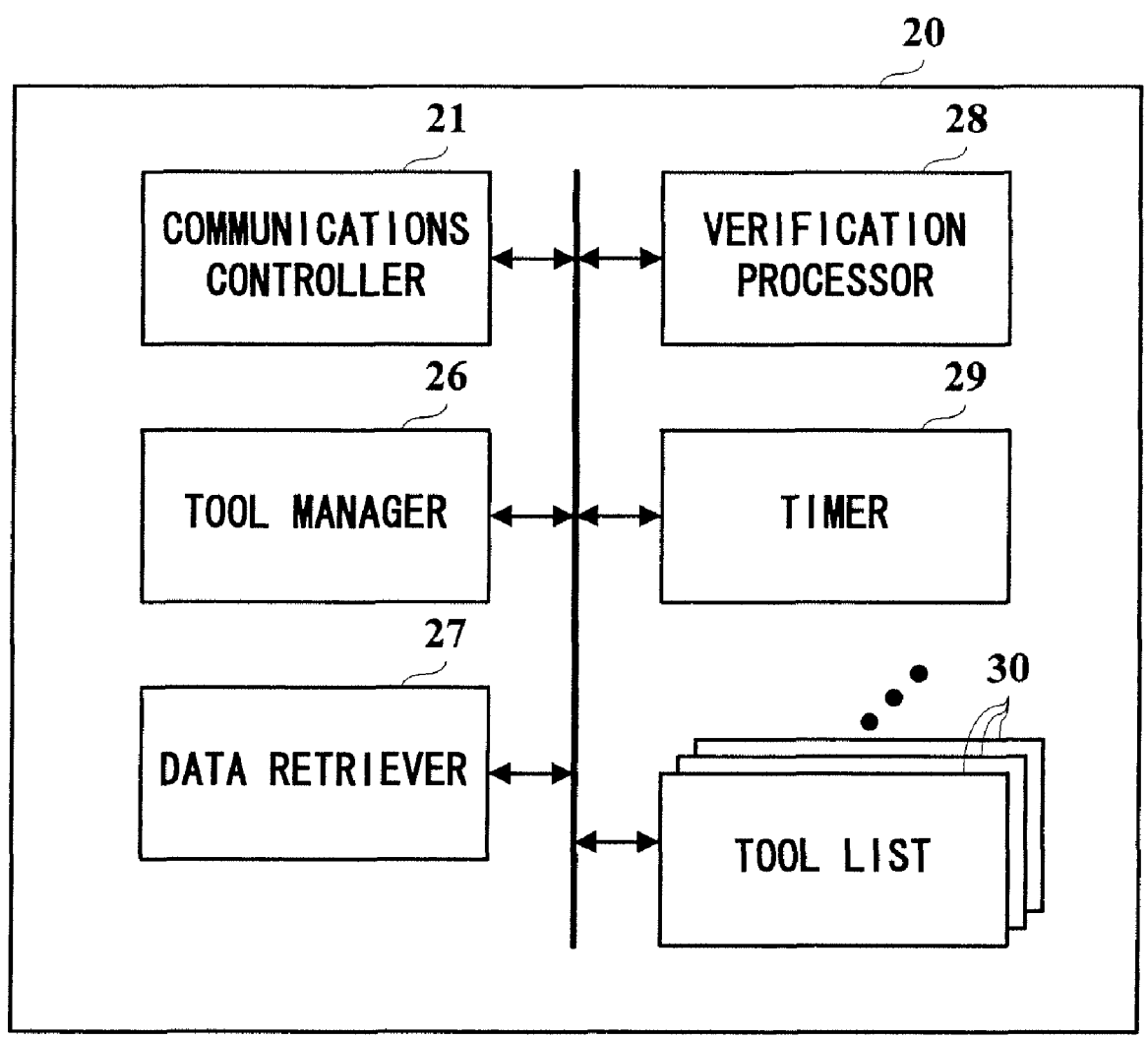
FIG. 37 is a diagram showing the structure of a sales-force server included in the computer network system of FIG. 36.

The sales-force server 20 included in the system of this embodiment includes, as shown in FIG. 37, the communications controller 21, a tool manager 26, a data retriever 27, a verification processor 28, a timer 29 and a plurality of tool lists 30. For example, the CPU of the sales-force server 20 executes the program stored in the HDD thereof, thereby realizing and controlling such a structure of the sales-force server 20.

The tool manager 26 records customer-management data 150 received from the terminal 61, in the customer database 51.

Figure 38:
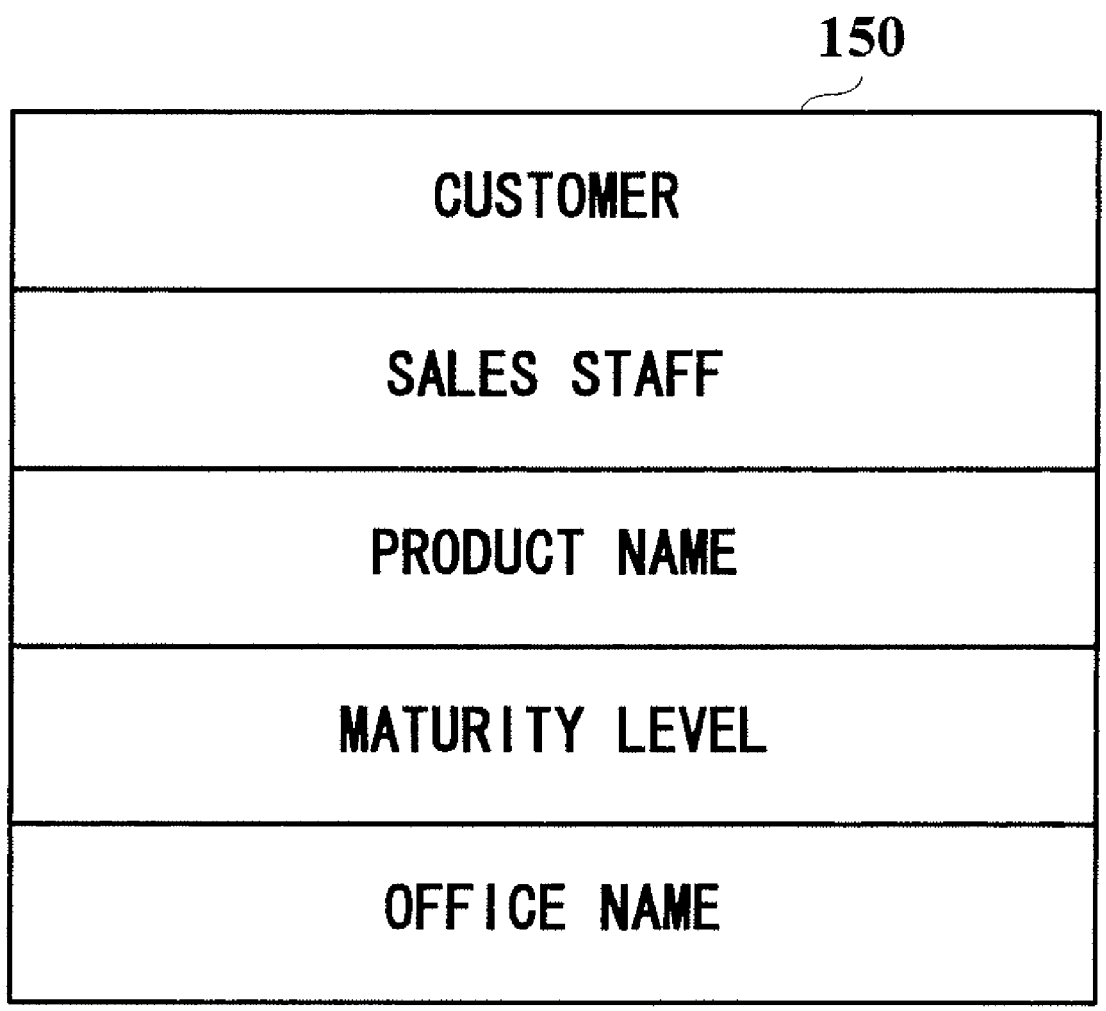
FIG. 38 is a diagram showing an example of customer-management data.

The customer-management data 150 shows the contents of the sales activities done by the sales staff toward the customer. FIG. 38 shows an example of the customer-management data 150. The customer-management data 150 shown in FIG. 38 includes data items of "customer name", "sales-staff name", "product name", "maturity level", and "office (for selling products)". The data item of "product name" included in the customer-management data 150 represents a target product name of a target product to be sold. The data item of "maturity level" included in the customer-management data 150 represents the progressive level of the sales activities, likewise the case of the first embodiment.

The tool manager 26 records the sales-tool data 151 received from the terminal 60 in the sales-tool database 55.

FIG. 39 shows an example of the sales-tool data 151. The sales-tool data 151 shown in FIG. 39 includes data items of "maturity level" of the sales activities, "product name", and "source data". The data item of "source data" included in the sales-source data 151 is used by the tool creator 64 for creating a sales tool.

Upon reception of the customer-management data 150 from the terminal 61, the tool manager 26 sends the sales-tool data 151 retrieved from the sales-tool database 55 to the terminal 61.

The data retriever 27 updates the tool lists 30, based on usage-context data 152 received from the terminal 61.

Figure 40:
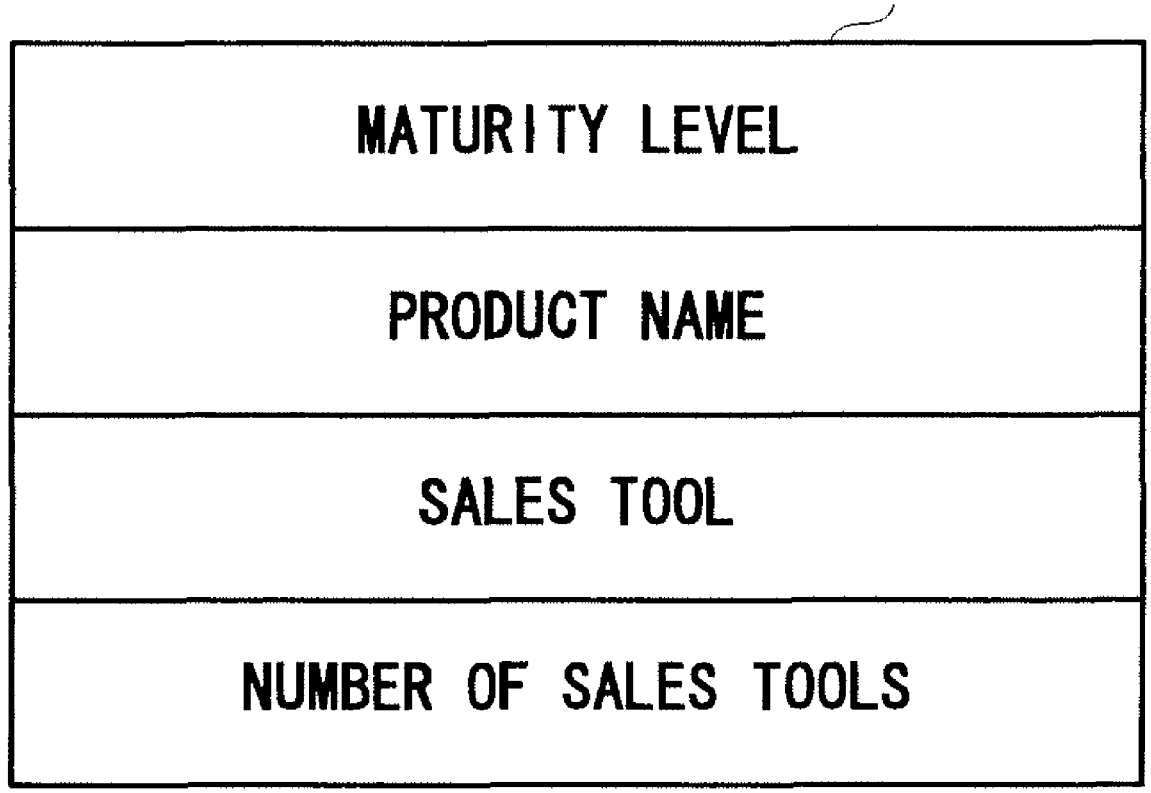
FIG. 40 is a diagram showing an example of usage-context data.

The usage-context data 152 shows the usage context of the sales tool in the office. FIG. 40 shows an example of the usage-context data 152. The usage-context data 152 includes data items of "maturity level" of sales activities, "product name", "sales tool name", and "number of used sales tools".

The verification processor 28 executes a process for verifying the validity of a target sales tool concerned.

The timer 29 time the current date and time.

Figure 41:
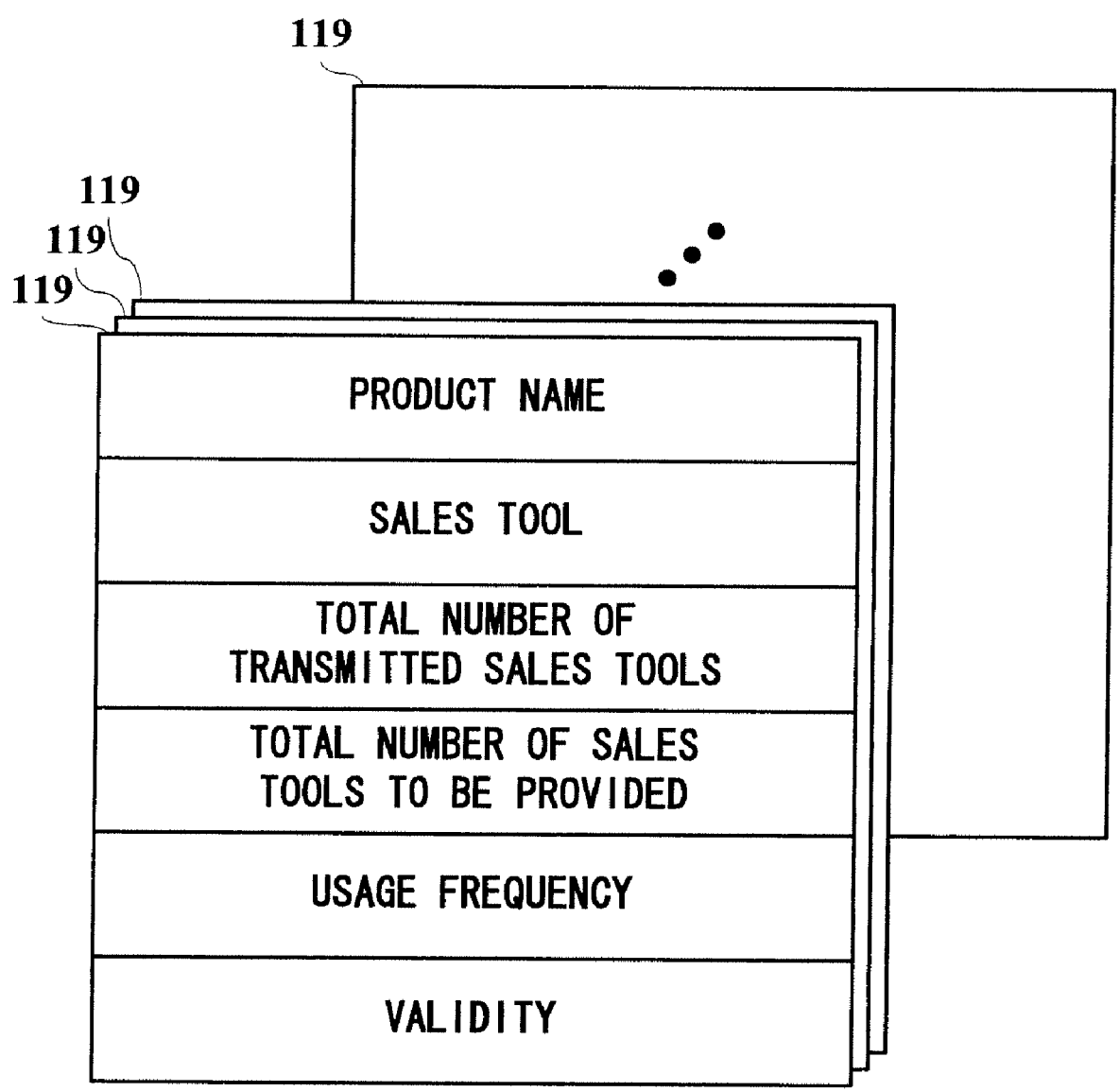
FIG. 41 is a diagram showing an example of a tool list.

The number of the tool lists 30 coincides with the numerical number of the maturity level of the sales activities. For example, nine tool lists 30 are prepared, if the maturity level of the sales activities is the ninth level. FIG. 41 shows an example of one tool list 30. The tool list 30 shown in FIG. 41 has a plurality of data groups 119 that are sorted by product and sales tool. Each of the plurality of data groups 119 includes data items of "product name", "sales-tool name", "total number of transmitted sales tools", "total number of sales tools to be provided", "usage frequency" and "validity".

The data item of "total number of transmitted sales tools" shown in the tool list 30 indicates the total number of sales tools sent from the sales-force server 20 to the terminal 61. The data item of "total number of sales tools to be provided" indicates the total number of sales tools created by the tool creator 64, for providing the customer with the sales tool at the office for selling products. The data item of "usage frequency" shown in the tool list 30 indicates the proportion of the "total number of sales tools to be provided" to the "total number of transmitted sales tools" both of which are included in the same data group 119. The data item of "validity" shown in the tool list 30 indicates the order that represents the usage frequencies of the respective tools corresponding to the "product name"

The customer database 51 included in the system of the second embodiment stores the customer-management data 150, which is sent from the terminal 61 to the sales-force server 20 and sorted based on the "maturity level" and "product name".

The sales-tool database 55 stores the sales-tool data 151 sent form the terminal 60 to the sales-force server 20. In this case, the sales-tool database 55 stores the sales-tool data 151 which is classified according to maturity level of the sales activities. The sales-tool database 55 may be prepared inside the sales-force server 20.

The terminal 60 included in the system of the second embodiment includes at least the communications controller 80, the input device 81, the output device 82, and the network application 84, which are shown in FIG. 18.

The terminal 61 included in the system of the second embodiment includes at least the communications controller 86, the input device 87, the output device 88, and the network application 90, which are shown in FIG. 19.

The tool creator 64 creates a sales tool, based on the sales-tool data 151 supplied from the terminal 61. For example, the tool creator 64 is a printer which creates a paper-made tool, such as a flyer, a poster, specifications, a price list, etc. The tool creator 64 may be a reproduction system which outputs voice messages, image messages, etc.

In this embodiment, in response to the manager operation of the input device 81, the terminal 60 creates the sales-tool data 151. The terminal 60 sends the sales-tool data 151 to the sales-force server 20.

In the sales-force server 20, the tool manager 26 reads out the maturity level, from the sales-tool data 151 sent from the terminal 60. The tool manager 26 stores the sales-tool data 151, which is sorted by maturity level, in the sales-tool database 55. For example, in the sales-tool database 55, new sales-tool data 151 is stored, following the sales-tool data 151 which has the same maturity level and which has been stored in the sales-tool database 55 before the new sales-tool data 151.

The tool manager 26 creates a new data group 119 in the tool list 30, in order to manage the new sales-tool data 151 stored in the sales-tool database 55. The "total number of transmitted sales tools" and "total number of sales tools to be provided" in the new data group 119 indicate "0".

Figure 42:
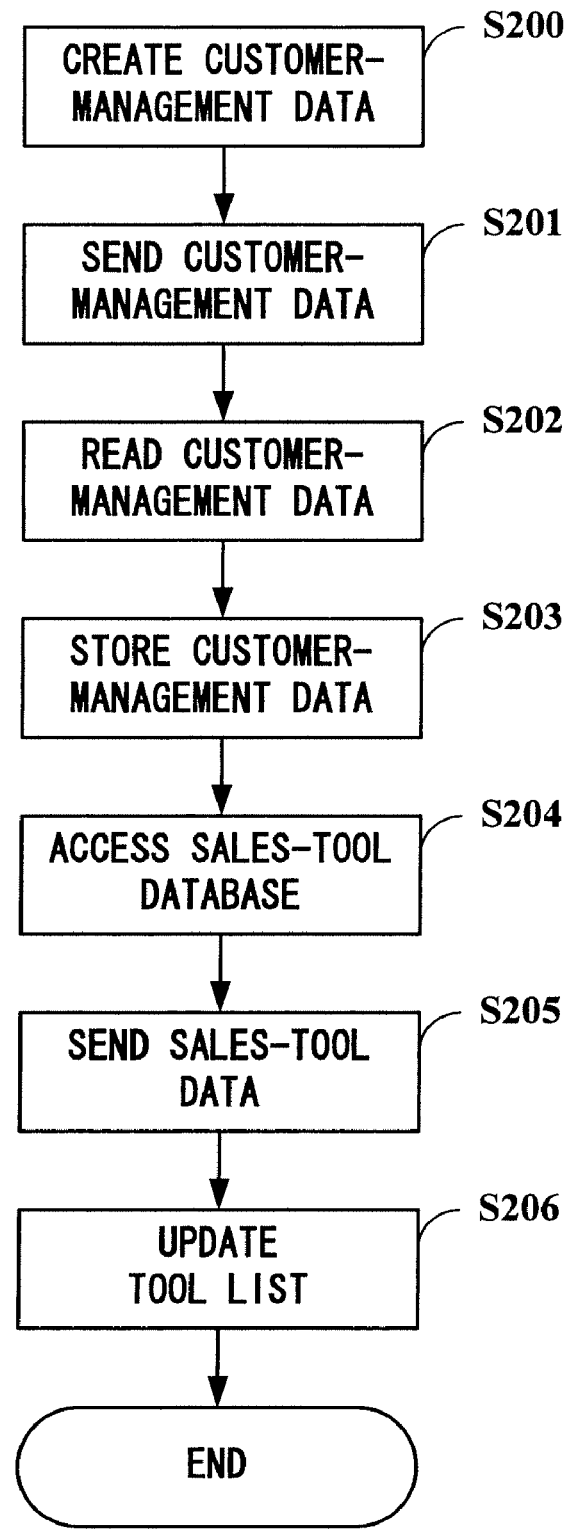
FIG. 42 is a flowchart for explaining a process for transmitting sales-tool data.

FIG. 42 is a flowchart for explaining a process for sending the sales-tool data 151 stored in the sales-tool database 55 to the terminal 61 installed in the office.

In this process, in response to the staff operation of the input device 87, the terminal 61 creates the customer-management data 150 (Step S200). The terminal 61 sends the customer-management data 150 to the sales-force server 20 (Step S201).

In the sales-force server 20, the tool manager 26 reads out the customer-management data 150 received from the terminal 61, in order to specify the "office name", "maturity level", and "product name" (Step S202). The tool manager 26 sorts the customer-management data 150 by maturity level and product name, and stores the sorted data in the customer database 51 (Step S203). The tool manager 26 accesses the sales-tool database 55, in order to retrieve the sales-tool data 151 corresponding to the sales-management data 150 read out in the step S202 (Step S204). The maturity level included in the sales-tool data 151 retrieved from the sales-tool database 55 is higher, by one level, than that of the customer-management data 150 read out in the step S202. Note that the "product name" in the sales-tool data 151 retrieved from the sales-tool database 55 is the same as that of the customer-management data 150 read out in the step S202. The sales-tool data 151 retrieved from the sales-tool database 55 corresponds to a predetermined sales tool, which is quite frequently used. The tool manager 26 refers to the "validity" included in the tool list 30, in order to specify the "usage frequency" of each sales tool.

The tool manager 26 sends the sales-tool data 151 acquired in the step S204, to the terminal 61 having sent the customer-management data 150 in the step S201 (Step S205). That is, the sales-tool data 151, corresponding to a frequently-used sales tool, is transmitted to the terminal 61 at first.

The tool manager 26 updates the tool list 30, so as to store the number of sales tool sent in the step S204 (Step S206). In the data group 119 corresponding to the sales-tool data 151 transmitted in the step S205, the number of the sales tool which corresponds to this data 151 is added to the "total number of transmitted sales tools".

The terminal 61 having received the sales-tool data 151 from the sales-tool server 20 supplies the tool generator 64 with the source data included in the sales-tool data 151, so as to generate a sales tool.

Figure 43A:
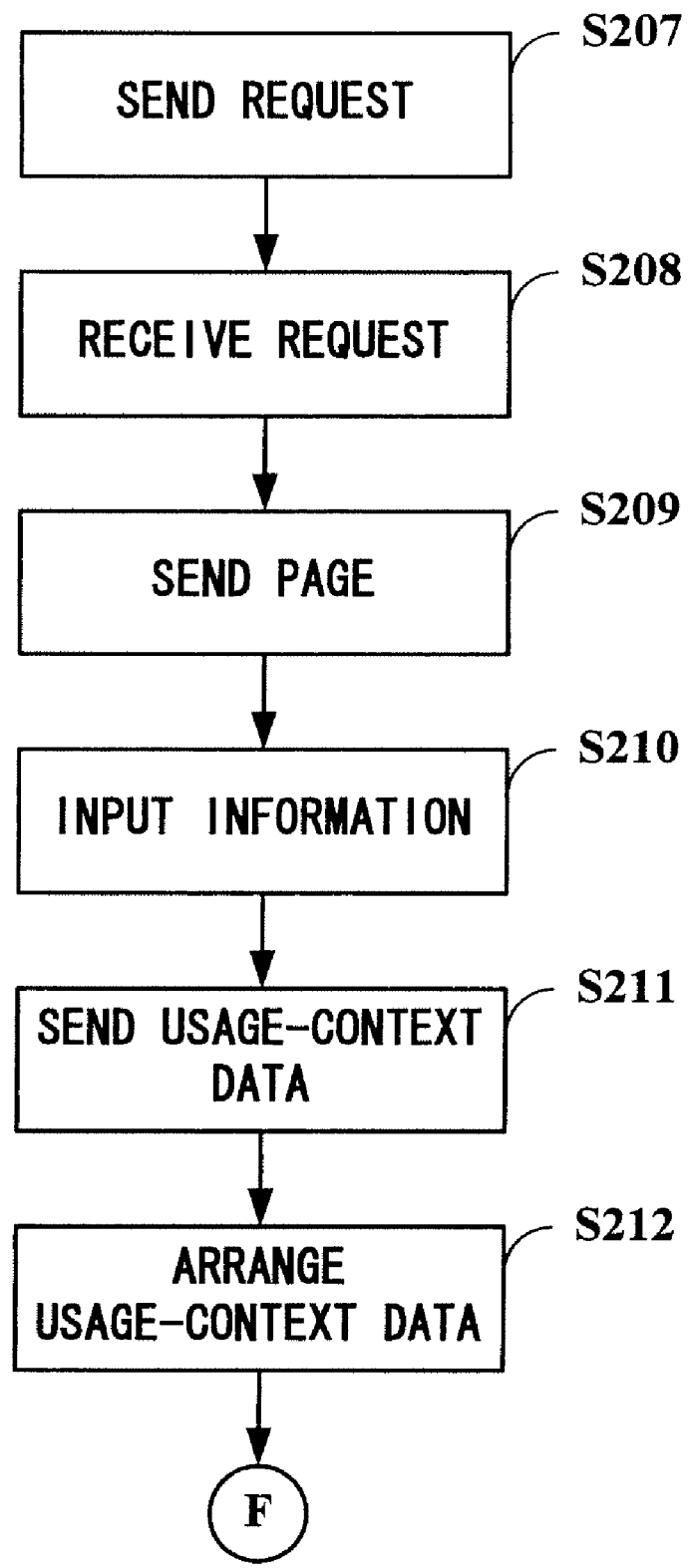
FIGS. 43A and 43B are flowcharts for explaining a process for calculating the "usage frequency" of a predetermined sales tool.
Figure 43B:
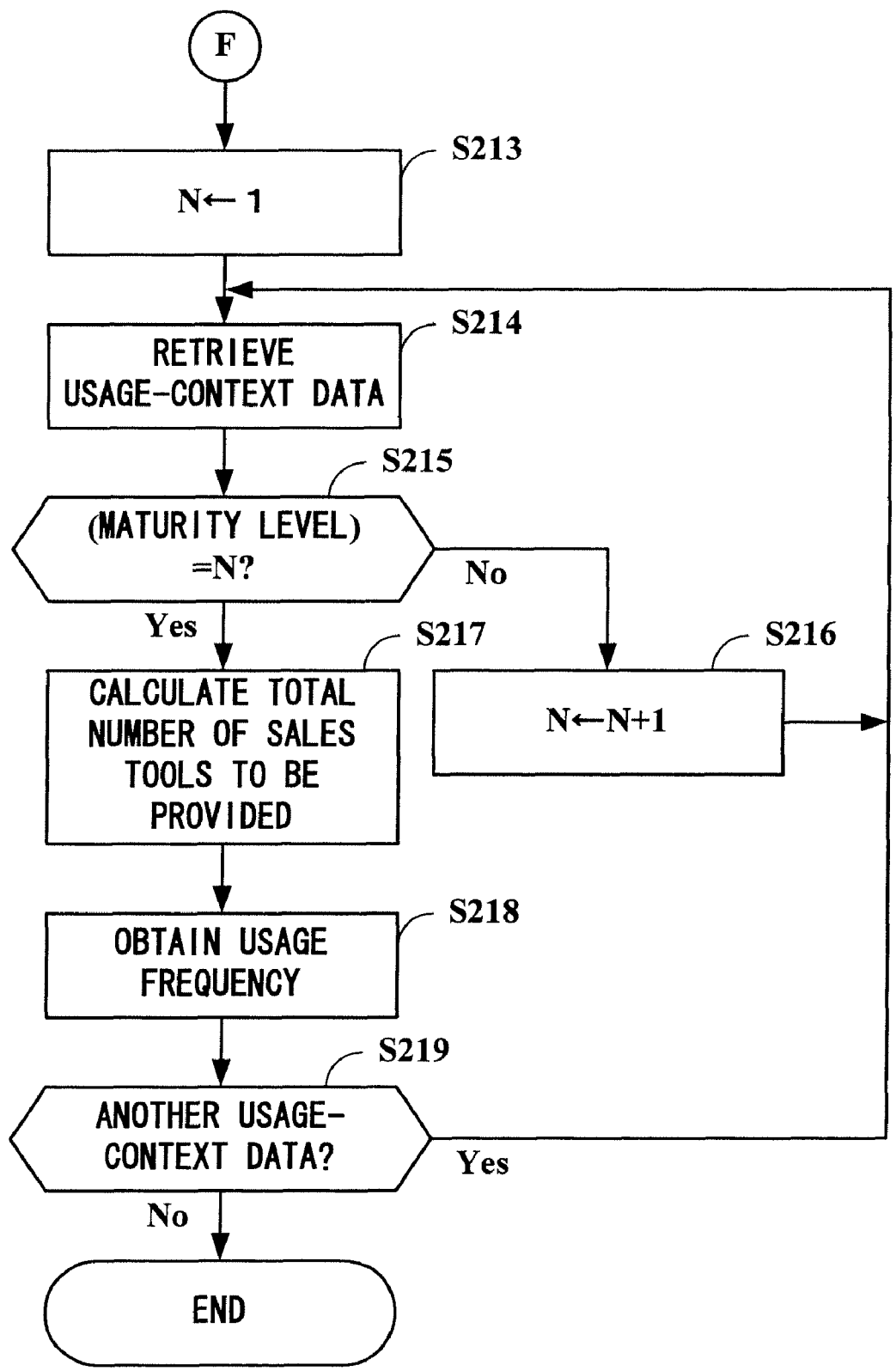

FIGS. 43A and 43B are flowcharts showing a process for calculating the usage frequency of each sales tool.

As shown in FIGS. 43A and 43B, the terminal 61 sends a request for the tool list 30 to the sales-force server 20, in response to the staff operation of the input device 87 (Step S207). The sales-force server 20 receives this request from the terminal 61 (Step S208).

Figure 44:
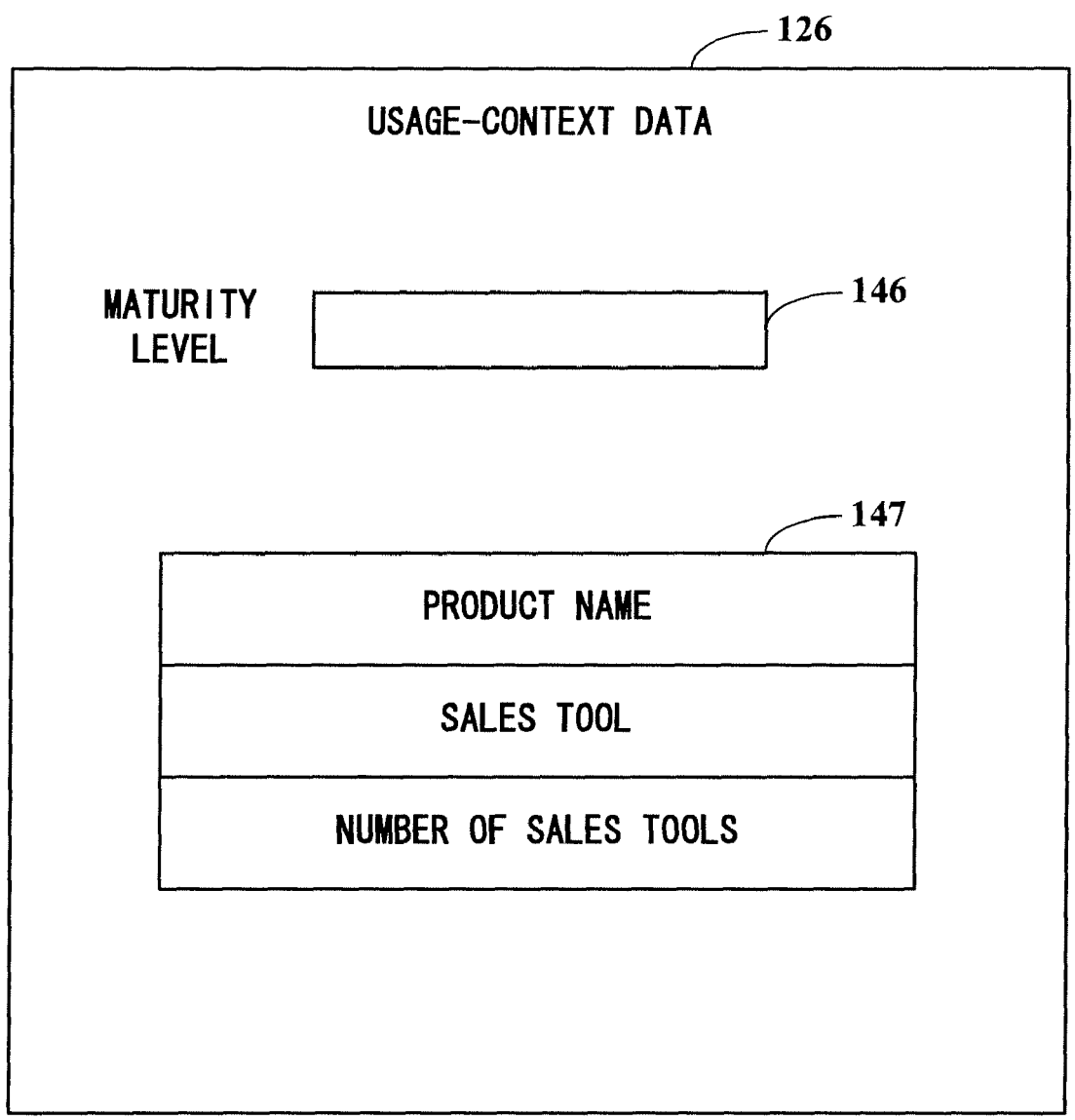
FIG. 44 is a diagram showing a page which is created by a data retriever shown in FIG. 37.

In the sales-force server 20, the data retriever 27 creates a page 126 shown in FIG. 44, in response to the request from the terminal 61. The page 126 includes two fields 146 and 147, for inputting the usage-context data 152 therein. The field 146 is so set that the maturity level of the sales activities can be specified therein. The field 147 is so set as to specify the "product name", the "sales-tool name", and the "number of used sales tools". The data retriever 17 sends the page 126 to the terminal 61 having sent the request therefor in the step S201 (Step S209).

In the terminal 61, the network application 90 controls the output device 88 to display the page 126, received from the sales-force server 20. In response to the staff operation, the input device 81 inputs information regarding the usage contents of the sales tool, in the fields 146 and 147 (Step S210). The network application 84 creates the usage-context data 152 based on the information input in the fields 146 and 147, and sends the created data to the sales-force server 20 (Step S211).

In the sale-force server 20, the data retriever 27 sorts the usage-context data 152 received from the terminal 61, in an ascending order of the maturity level (Step S212). In this case, the usage-context data 152 sorted in the step S212 is retained in a non-illustrative memory, for example.

The data retriever 27 sets "1" as a variable N (Step S213 of FIG. 43B). The variable N is used by the data retriever 27 and the verification processor 28, in order to identify the maturity level of the sales activities. The data retriever 27 retrieves the usage-context data 152 sorted in the step S212, in accordance with the sorted order (Step S214). The data retriever 27 compares the variable N with the maturity level of the usage-context data 152 retrieved in the step S214. As a comparison result, the data retriever 27 determines whether the variable N coincides with the maturity level of the usage-context data 152 (Step S215).

In the case where it is determined that the variable N does not coincide with the variable N in the step S215, the data retriever 27 increments the variable N by one (Step S216). After this, the flow returns to the procedure of the step S214.

On the contrary, in the case where it is determined that the variable N coincides with the variable N in the step S215, the data retriever 27 updates the data group 119 corresponding to the usage-context data 152, as will more specifically be explained below. The data retriever 27 reads out the usage-context data 152 retrieved in the step S214, in order to specify the number of the usage sales tools. The data retriever 27 adds the number of used sales tool retrieved from the usage-context data 152, to the "total number of sales tools to be provided" included in the data group 19 corresponding to the usage-context data 152 retrieved in the step S214 (Step S217). The data retriever 27 obtains the "usage frequency" of the data group 119 including the "total number of sales tools to be provided" updated in the step S217 (Step S218). Hence, the "usage frequency" included in the data group 119 is updated.

The data retriever 27 determines whether there is usage-context data 152 which has not yet been retrieved in the step S214 (Step S219).

In the case where it is determined there is non-retrieved usage-context data 152 in the step S219, the flow returns to the procedure of the step S214.

On the contrary, in the case where it is determined that there is such usage-context-data 152 in the step S219, the process shown in FIGS. 43A and 43B is terminated at this moment.

Figure 45A:
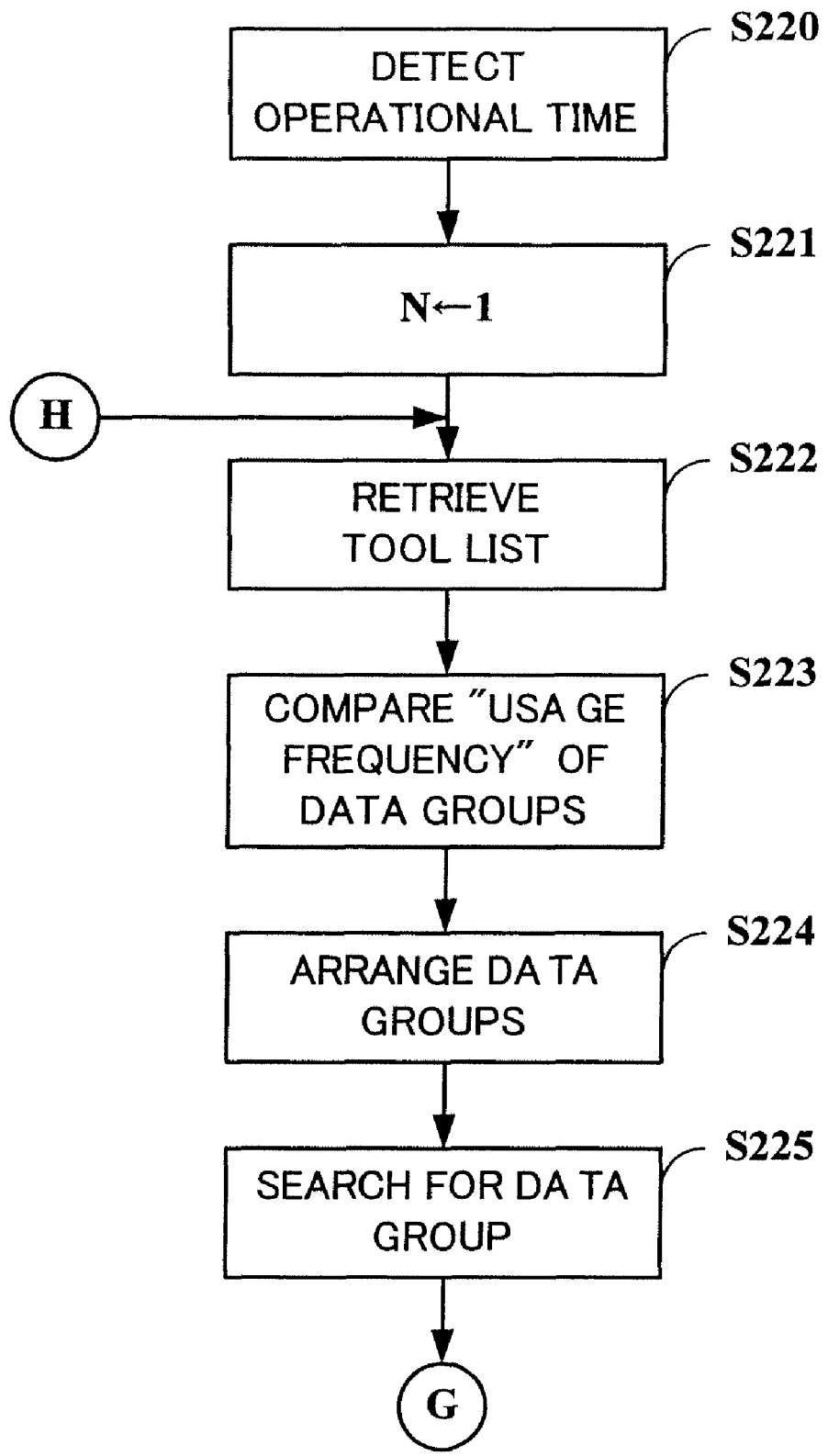
FIGS. 45A and 45B are flowcharts for explaining a process for verifying the validity of a sales tool.
Figure 45B:
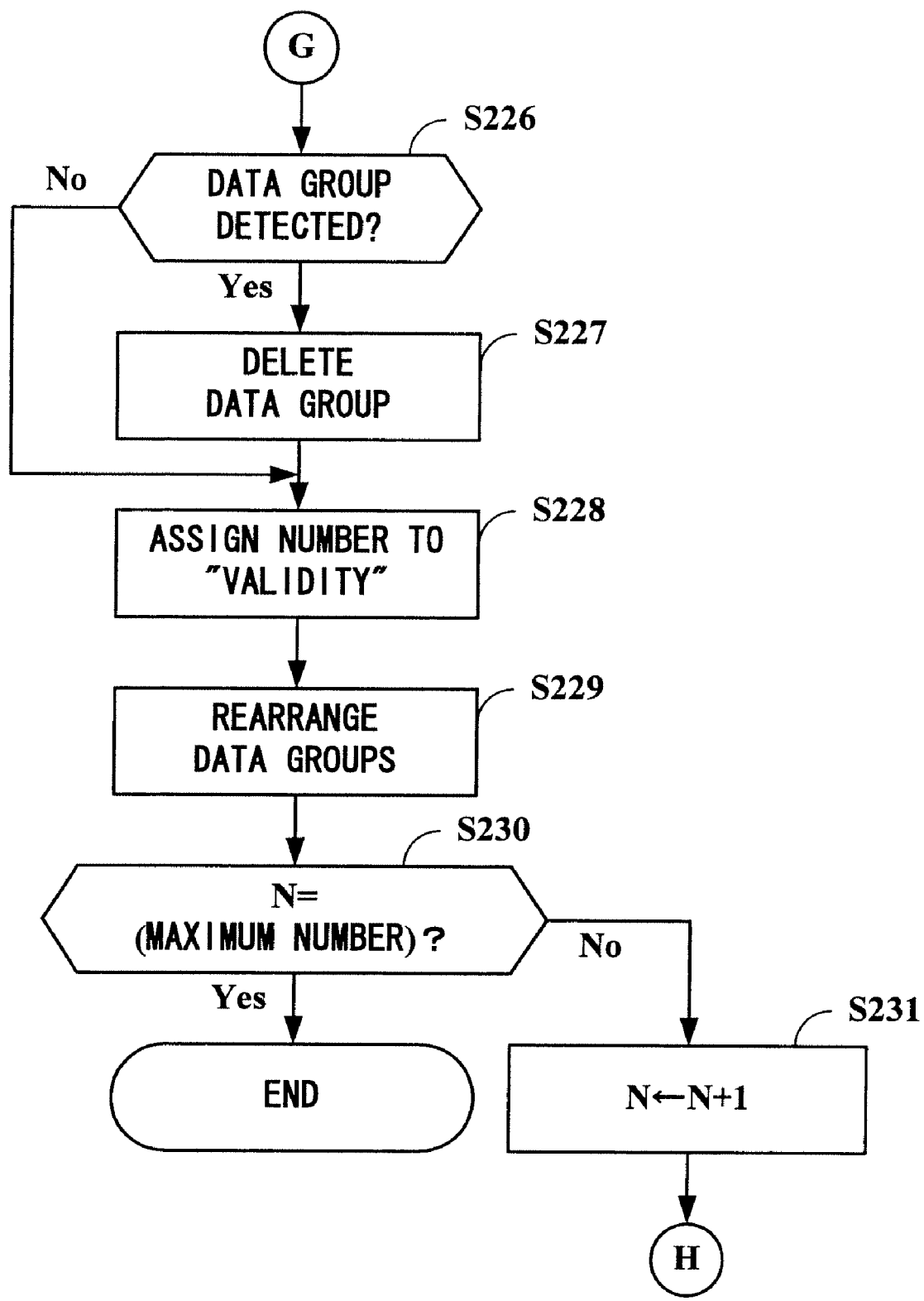

FIGS. 45A and 45B are flowcharts for explaining a process for verifying the validity of a target sales tool.

As shown in FIGS. 45 and 45B, the verification processor 28 detects that the time identified by the timer 29 shows the operational time of the verification processor 28 (Step S220). For example, the operational time is set in advance to 24:00 pm in advance.

Upon detection of the operational time, the verification processor 28 sets "1" as a variable N (Step S221).

The verification processor 28 reads out the tool list 30 corresponding to the same maturity level of the set variable N (Step S222). The verification processor 28 retrieves those data groups 119 having the same "product name", and compares the data items of "usage frequency" included in the retrieved data groups 119 (Step S223). Based on the result of the step S223, the verification processor 28 arranges the data groups 119, in a descending order of the "usage frequency" (Step S224). For example, the arranged data groups 119 are retained in a non-illustrative memory.

The verification processor 28 finds out any one of those arranged data groups 119, that includes the "usage frequency" of smaller than a predetermined threshold value (Step S225). As a result of the step S225, the verification processor 28 determines whether there is found a data group 119 having the "usage frequency" of smaller than the predetermined threshold value (Step S226).

In the case where it is determined that there is found the data group 119 having the "usage frequency" indicating a value smaller than the threshold value, the verification processor 28 deletes the found data group 119 from the tool list 30, and deletes also the sales-tool data 151 corresponding to the deleted data group 19, from the sales-tool database 55 (Step S227).

In the case where it is determined that there is no data group 119 having the "usage frequency" of smaller than the predetermined threshold value in the step S226, the procedure of the step S227 is skipped.

The verification processor 28 assigns the "validity" of each of the non-deleted data groups 119 a numerical number corresponding to its order number (Step S228). For example, "1" is assigned to the "validity" of the first data group 119, while "2" is assigned to the "validity" of the second data group 119. The verification processor 28 rearranges the data groups 119 of the tool list 30, in accordance with the assigned number of the step S225 (Step S229).

The verification processor 28 determines whether the variable N is the maximum number of the maturity level (Step S230).

In the case where it is determined that the variable N is not the maximum number of the maturity level, the verification processor 28 increments the variable N by one (Step S231). After this, the flow returns to the procedure of the step S222.

In the case where it is determined that the variable N is the maximum number of the maturity level, the process shown in FIGS. 45A and 45B is terminated at this moment.

Third Embodiment

A computer network system according to the third embodiment of the present invention will now be described. In the third embodiment of the present invention, the sales-force server 20 receives history information regarding the customer access toward the computer network system of this embodiment, from a Web server 70 and a call center 72. The sales-force server 20 receives also audio data created by the terminal 62 therefrom. Upon reception of the data from the Web server 70, the call center 72 or the terminal 62, the sales-force server 20 creates data for facilitating the sales activities of the sales staff. The data created by the sales-force server 20 is sent to the terminal 62 used by the sales staff. That is, the terminal 62 can provide the sales staff with various information regarding the sales activities to be done by the staff. In this structure, the computer network system according to the third embodiment of the present invention can adequately facilitate the sales activities of the staffs of the company. The sales-force server 20 sends text data which can be created using the audio data, to a central server 71. Upon this, the central server 71 determines the business solutions, and provides the sales staff with the business solutions through the terminal 62 having sent the audio data thereto.

Figure 46:
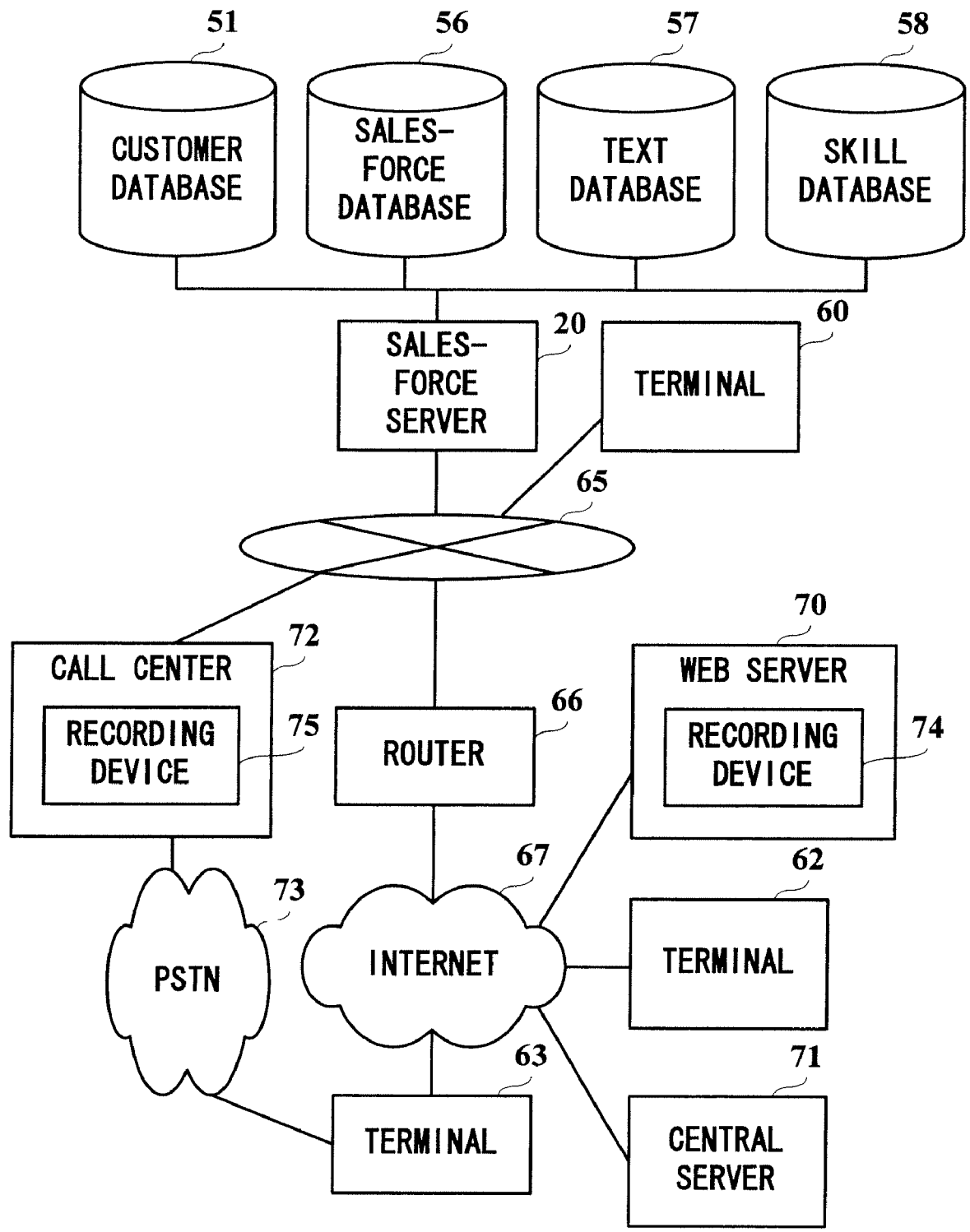
FIG. 46 is a diagram showing a computer network system according to the third embodiment of the present invention.

FIG. 46 shows the computer network system according to the third embodiment of the present invention. As shown in FIG. 46, the computer network system includes the sales-force server 20, the customer database 51, a sales-force database 56, a text database 57, a skill database 58, terminals 60, 62 and 63, the LAN 65, the router 66, the Web server 70, the central server 71, the call center 72, the Internet 67 and a PSTN (Public Switched Telephone Network) 73.

Figure 47:
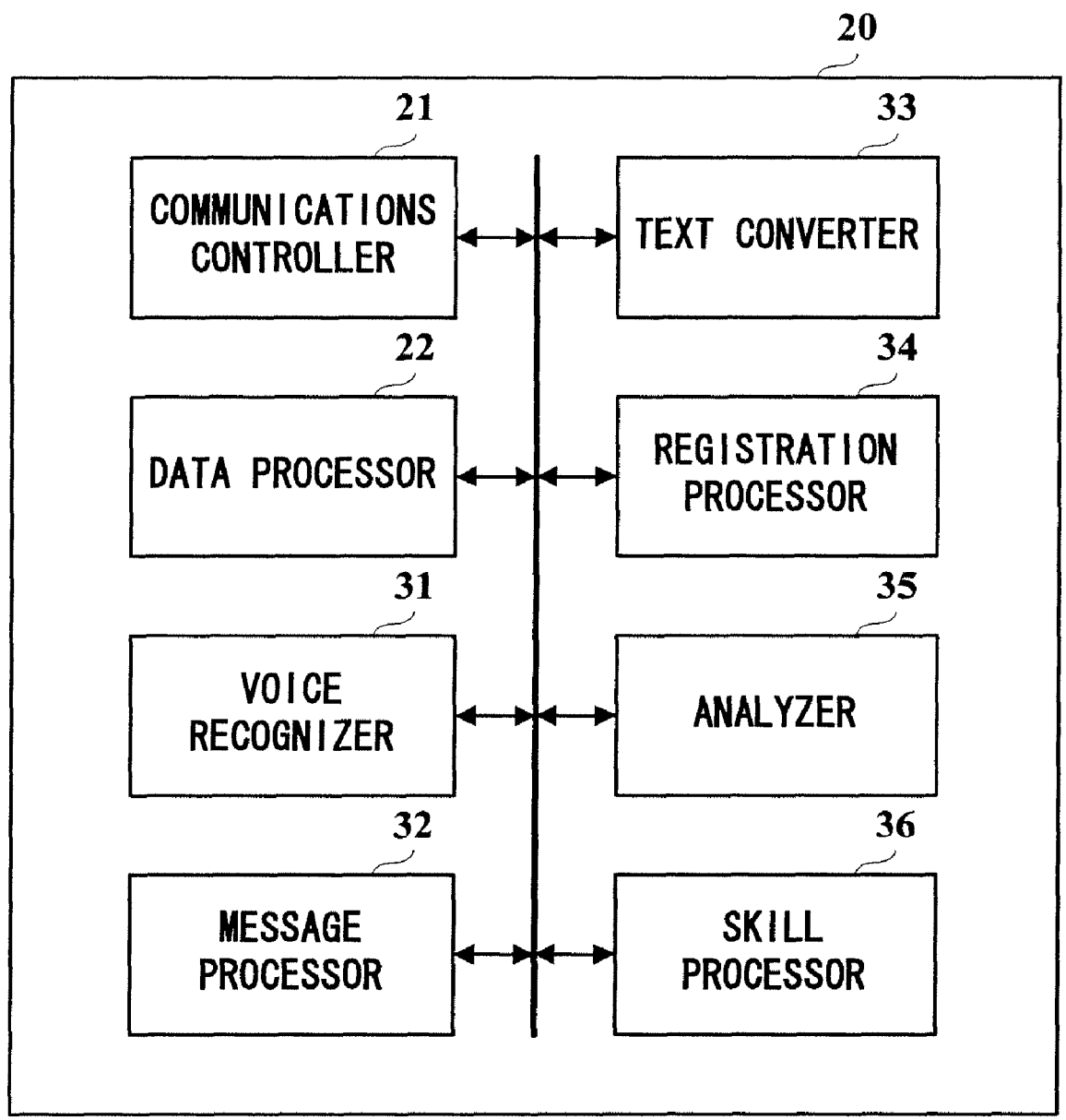
FIG. 47 is a diagram showing the structure of a sales-force server included in the computer network system of FIG. 46.

As shown in FIG. 47, the sales-force server 20 according to the third embodiment of the present invention includes the communications controller 21, the data processor 22, a voice recognizer 31, a message processor 32, a text converter 33, a registration processor 34, an analyzer 35 and a skill processor 36. For example, the CPU of the sales-force server 20 executes the program stored in the HDD of the sales-force server 200, thereby realizing and controlling such a structure of the sales-force server 20.

The data processor 22 of the computer network system of this embodiment stores the customer-management data 150, which is described in the second embodiment and received from the terminal 62, in the customer database 51. The data processor 22 stores business-transaction history received from the terminal 62 in the customer database 51, in association with the customer management data 150. The business-transaction history is history information regarding the business transaction(s) to be dealt with the customer. The data processor 22 stores access-history data 153 received from the Web server 70 in the customer database 51 in association with the customer-management data 150. The data processor 22 stores call-history data 154 received from the call center 72 in the customer-database 51 in association with the customer-management data 150.

Figure 48:
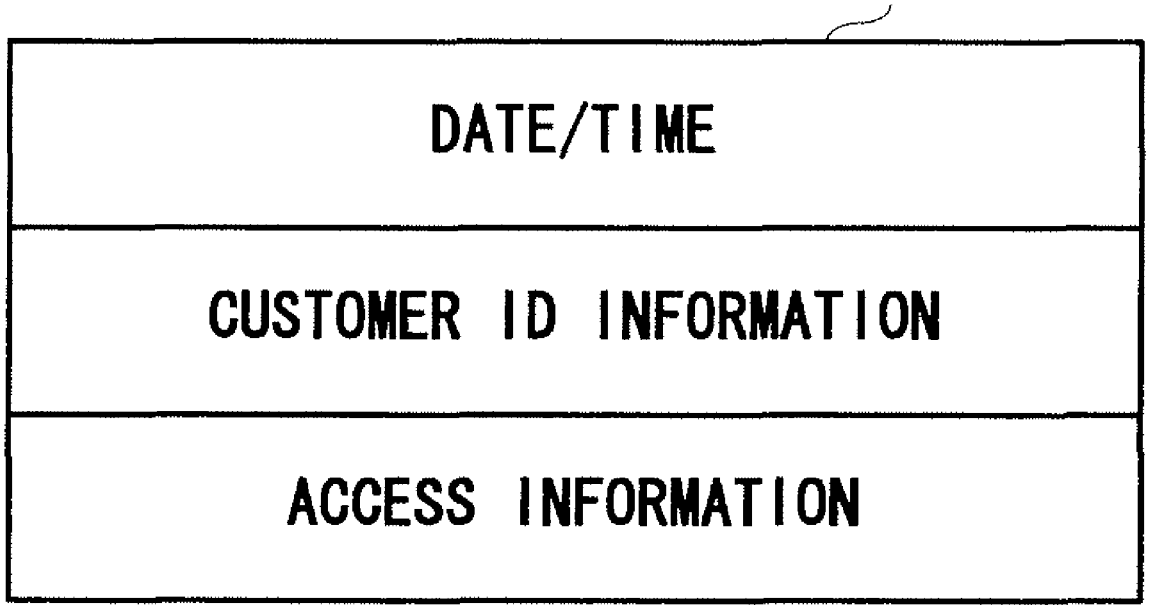
FIG. 48 is a diagram showing an example of access-history data.

FIG. 48 shows an example of the access-history data 153. The access-history data 153 shown in FIG. 48 includes data items of "date/time", "customer ID information", and "access information". The data item of "customer ID information" of the access-history data 153 is to specify customer, who has accessed the Web server 70, such as his/her e-mail address, IP (Internet Protocol) address, etc.

Figure 49:
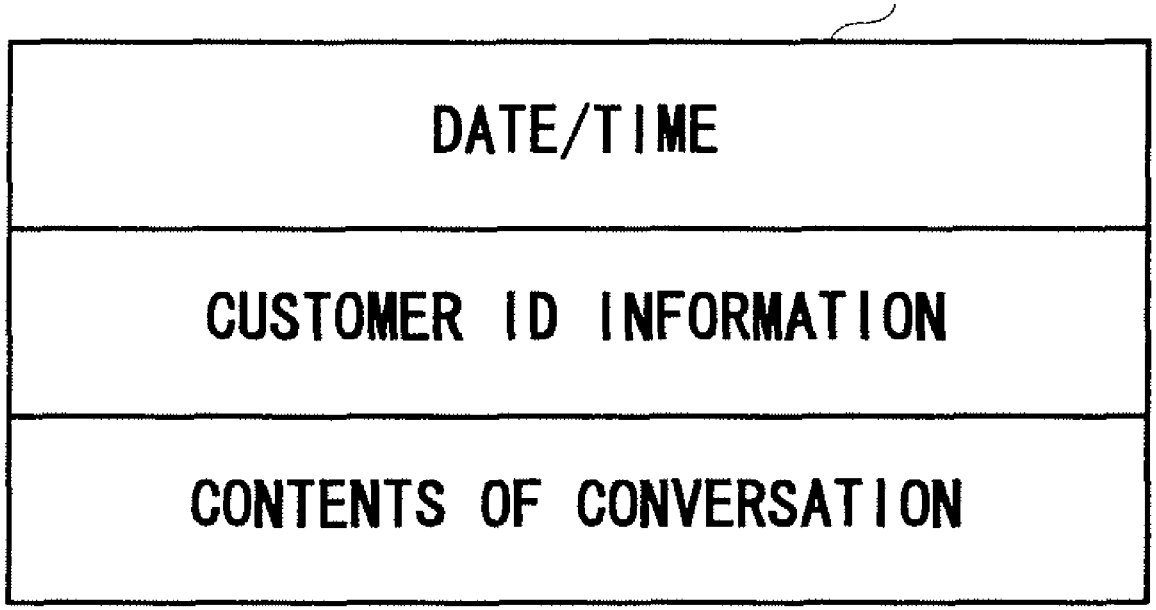
FIG. 49 is a diagram showing an example of call-history data.

FIG. 49 shows an example of the call-history data 154. The call-history data 154 shown in FIG. 49 includes data items of "date/time", "customer ID information", and "contents of conversation". The "customer ID information" in the call-history information 154 is to specify the customer, who has called the call center 72, such as his/her phone number, etc.

The data processor 22 creates target information 155 used for facilitating the sales activities to be done by the sales staff, based on the customer-management data 150, the access-history data 153 and the call-history data 154. The target information 155 created by the data processor 22 is sent to the terminal 62.

Figure 50:
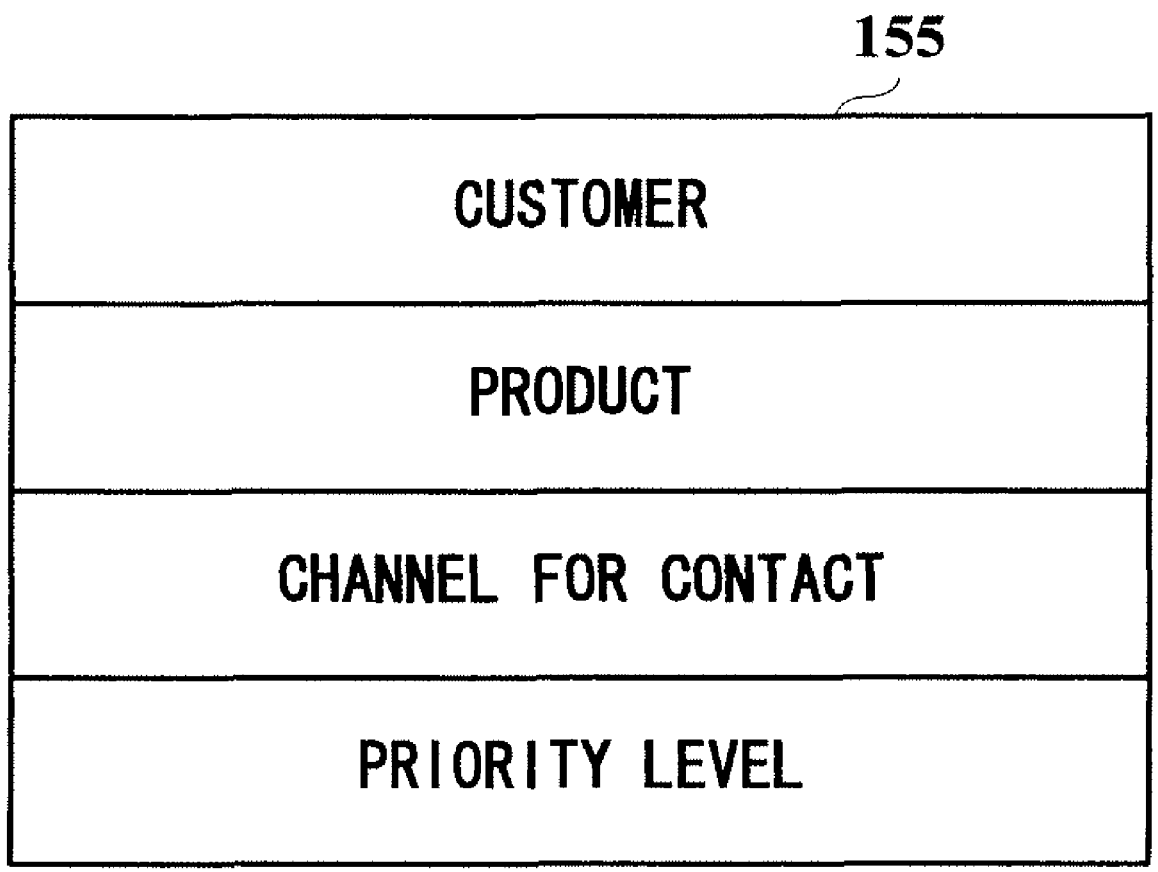
FIG. 50 is a diagram showing an example of target information.

FIG. 50 shows an example of the target information 155. The target information 155 shown in FIG. 50 includes data items of "customer name", "product name", "channel for making contact with customer", and "priority".

The data item of "channel for making contact with customer" of the target information 155 represents a channel, such as the post, FAX, telephone, visiting, e-mail, and office, etc. by or at which the sales staff contacts the customer.

The data item of "priority" numerically represents the priority level of the sales activities in relation to the product identified by the "product name".

The voice recognizer 31 detects errors in the utterance of the sales staff, using a predetermined voice recognition technology. For example, the voice recognizer 31 detects errors in the product name pronounced by the sales staff. The voice recognizer 31 detects any product names that the sales staff mentioned in the utterance with the customer. Further, the voice recognizer 31 retrieves catalogue information corresponding to the detected product names, from the sales-force database 56, and sends the retrieved information to the terminal 62 having sent the audio data to the voice recognizer 31.

In the case where the voice recognizer 31 has detected the errors, the message processor 32 creates a message for instructing the sales staff to correct the errors, and sends the created message to the terminal 62. In response to the message from the message processor 32, the terminal 62 controls the output device 93 to output the correction. The message processor 32 retrieves information corresponding to the explanations of the sales staff, from the sales-force database 56, based on the identification result of the voice recognizer 31. The information retrieved by the message processor 32 is sent to the terminal 62 having sent the audio data to the voice recognizer 31. In the terminal 62, the output device 93 outputs the explanation information sent from the message processor 32.

The text converter 33 converts the audio data sent form the terminal 62 into text data. The text data output from the text converter 33 is stored in the text database 57. In addition, the text converter 33 sends the text data to the central server 71.

The registration processor 34 extracts, from the text data generated as a result of the conversion by the text converter 33, a data portion regarding the sales activities, a data portion regarding the business transactions, and a data portion regarding the customer needs. The registration processor 34 stores the extracted text data regarding the business activities, in the sales-force database 56 as sales-activity information. The registration processor 34 stores the extracted text data regarding the business transactions, in the sales-force database 56 as business-transaction information. The registration processor 34 stores the extracted text data regarding the customer needs, in the sales-force database 56 as customer-needs information.

The analyzer 36 executes a search process, a retrieval process, a referring process and an analyzing process, for the data stored in the sales-force database 56. For example, in response to an instruction of the terminal 60, the analyzer 35 collects information regarding the sales activities, which are done by a particular sales staff in a one-month range, from the sales-force database 56. The analyzer 35 executes various statistical processes based on the collected information. The results of the statistical processes are sent to the terminal 60 having sent the instruction to the analyzer 35.

The skill processor 36 evaluates the sales abilities of each sales staff, based on the data output from the voice recognizer 31. The skill processor 36 creates a skill table 99 showing the evaluated sales abilities of each sales staff. FIG. 51 shows an example of thus created skill table 99. The skill table 99 shown in FIG. 51 includes two columns 156 and 157. The column 156 contains data corresponding to some elements (e.g. understanding of product, presentation ability, approaching ability, suggesting ability, total, etc.), based on which the sales ability of each staff is evaluated. The column 157 contains data representing the evaluated data of each element which is calculated by the skill processor 36.

For example, the skill processor 36 creates information regarding any materials or training which may contribute to improving the sales abilities of the sales staff, based on the data included in the skill table 99. The information regarding such materials or training is output by the output device 93, so that the sales staff can refer to the output information. Alternatively, the skill processor 36 makes advice for instructing the sales staff, based on the data contained in the skill table 99. The advice created by the skill processor 36 is output by the output device 82 of the terminal 60, used by the manager (boss) of the sales staff, so that the boss of the sales staff can refer to the provided advice.

The customer database 51 stores the customer-management data 150, the access-history data 153, the call-history data 154, and business-transaction history. The business-transaction history represents records of business transactions made between the sales staff and the customer, and information obtained in the business promotion activities of the sales staff toward the customer. The business-transaction history includes data representing the maturity level of the sales activities that are proceeded by the sales staff.

The sales-force database 56 stores the sales-activity information, business transaction information, product information, and customer-needs information, etc. The sales-activity information represents the progressive level of the business activities done by the sales staff for the customer. Specifically, the sales-activity information represents that: a sales staff Z had sales approaches to a manager of company A, and talked about a printer from 14:00 pm until 16:00 on March 23; the printer was sold at the price of ¥1,000,000; and the competitor of the company A is company C. The business transaction information is management information regarding sales projects and sales activities to be done. The product information is catalogue information representing the product specifications, service information, model type of the product. The customer-needs information represents any products that may meet the customer demand. For example, the customer-needs information may be information representing a particular product, such as a high-speed laser printer, etc. Otherwise, the customer-needs information may represents potential needs of the customers, that are expected to be highly demanded afterwards. The sales-force database 56 may be built in the sales-force server 20. The information stored in the sales-force database 56 may arbitrarily be updated in accordance with the business style of the staffs.

The text database 57 stores the text data, which is created by the text converter 33 using the audio data. The text database 57 may be built in the sales-force server 20.

The skill database 58 may store the skill table 99 created by the skill processor 36 of the sales-force server 20. The skill database 58 may be included in the sales-force server 20.

The terminal 62 shown in FIG. 46 is a portable information processor, such as a PDA (Personal Digital Assistants) or a notebook-type computer, including a CPU, a ROM, a RAM, an HDD, a display device, a keyboard, etc. The terminal 62 is used by the sales staff. The terminal 61 performs data communications with the sales-force server 20 or the central server 71, through the Internet 67, etc.

Figure 52:
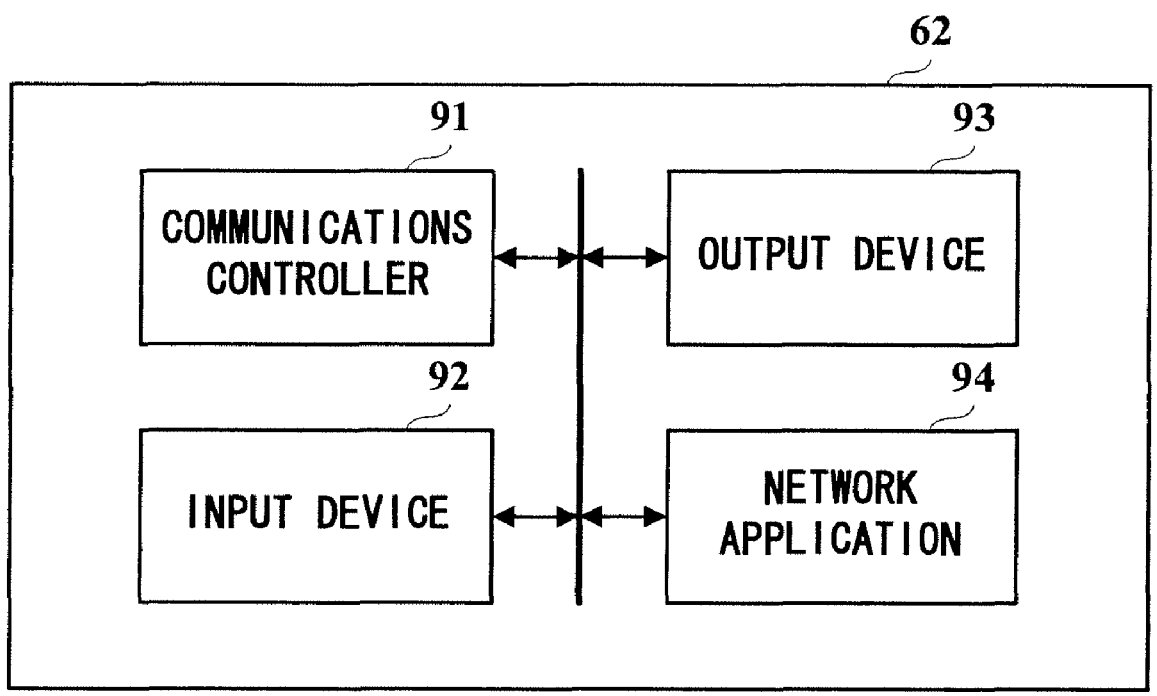
FIG. 52 is a diagram showing the structure of a terminal included in the computer network system of FIG. 46.

FIG. 52 shows the structure of the terminal 62 included in the computer network system of the third embodiment. The terminal 62 of FIG. 52 includes a communications controller 91, an input device 92, the output device 93, and a network application 94. The input device 92 includes an encoder which encodes voice signals input from a microphone, in order to create audio data. The terminal 62 may be replaced by a plurality of terminals corresponding respectively to a plurality of sales staffs.

The terminal 63 shown in FIG. 46 is a notebook computer or desktop computer, including a CPU, a ROM, a RAM, an HDD, a display device, a keyboard, etc. The terminal 63 is used by the customer. The terminal 63 can access the Web server 70 through the Internet 67. The customer who uses the terminal 63 may sometimes call the call center 72 through the PSTN 73. The terminal 63 may be replaced by a plurality of terminals corresponding respectively to a plurality of customers.

Figure 53:
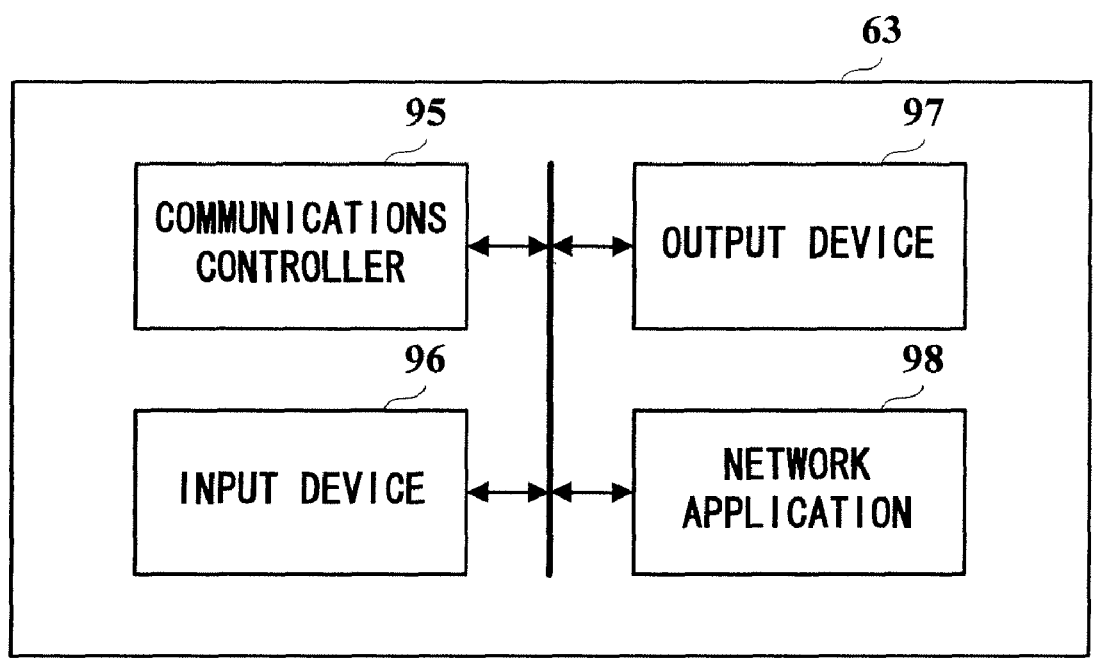
FIG. 53 is a diagram showing the structure of another terminal of the computer network system of FIG. 46.

FIG. 53 shows the structure of the terminal 63 included in the computer network system according to the third embodiment of the present invention. The terminal 63 shown in FIG. 53 includes a communications controller 95, an input device 96, an output device 97, and a network application 98.

The Web server 70 shown in FIG. 46 is a computer system including a CPU, a ROM, a RAM, an HDD, and a network interface. The Web server 70 transmits Web pages to the terminal 63 through the Internet 67. The Web pages to be transmitted by the Web server 70 includes information to be provided from a company providing products or services to customers. Each Web page transmitted by the Web server 70 may include the contents of a portal. For example, the portal site provides various information services to their customers, such as a search engine, a chat room, a BBS (Bulletin Board System), or a Web-mail system, etc. The Web server 70 may provide personalized information which has been customized in accordance with the user preference. The Web server 70 includes a recording device 74 for recording the access-history data 153.

The central server 71 has the same hardware structure as that of the Web server 70. The central server 71 determines the business solutions, representing one or more most-demanded products, based on the text data received from the sales-force server 20. The central server 71 creates suggestion data representing the determined business solutions, and provides the terminal 62 with the created suggestion data. For example, the output device 93 displays an image representing a proposal based on the suggestion data.

The call center 72 executes various business tasks corresponding to telephone calls from the customers, using a CTI (Computer Telephony Integration) technique. A CTI server including a CPU, a ROM, a RAM, an HDD, a display, and a keyboard, etc. is one example of the computerized call center 72. For example, the call center 72 executes various tasks, such as receiving orders from customers using telephones, responding to the inquiries from the customers, and performing sales tasks through telephone call. In the call center 72, the operator of the call center 72 may talk to the customer on the phone for carrying out the business transactions. Except during the business hours, such as the nighttime, etc., an answering machine may be provided for recording messages from the customers in the call center 72. The call center 72 is designed to correspond both to inbound and outbound operations. When processing an inbound call, the call center 72 may display customer telephone number, etc. on the display of the CTI server, in order to provide the operation with the customer information. The call center 72 includes a recording device 75 for storing the call-history data 154.

Operations of the computer network system according to the third embodiment of the present invention will now be explained.

In the third embodiment of the present invention, the sales staff operates the terminal 62, to input the business-transaction history. The business-transaction history is sent from the terminal 62 to the sales-force server 20 through the Internet 67. In the sales-force server 20, the data processor 22 stores the business-transaction history received from the terminal 62 in the customer database 51. The business-transaction history is classified by customer, and stored in the customer database 51 in association with the customer-management data 150. In this way, the customer database 51 stores the history information of business transactions performed with the customer in the past.

Figure 54:
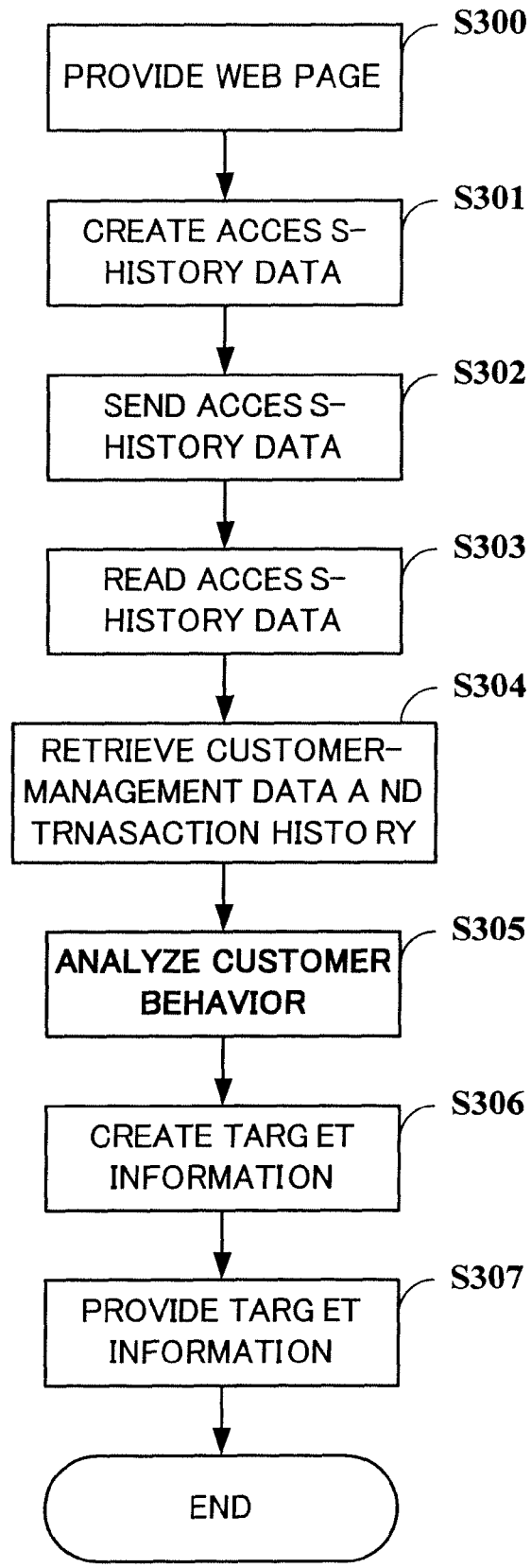
FIG. 54 is a flowchart for explaining a process for managing sales activities, based on history information regarding the customer access toward a Web server.

FIG. 54 is a flowchart for explaining a process for managing the sales activities, based on the history information regarding the customer access toward the Web server 70.

As shown in FIG. 54, in response to a request from the terminal 63, the Web server 70 provides the terminal 63 with a Web page through the Internet 67 (Step S300). Every time the Web server 70 provides the terminal 63 with a Web page, it creates the access-history data 153 (Step S301). The Web server 70 stores the access-history data 153 in the recording device 74, and also sends the access-history data 153 to the sales-force server 20 (Step S302).

In the sales-force server 20, the data processor 22 reads out the access-history data 153 received from the Web server 70, in order to specify a customer who has accessed and browsed the provided Web page (Step S303). The data processor 22 retrieves, from the customer database 51, the customer-management data 150 corresponding to the specified customer and the business-transaction history corresponding to this customer-management data 150 (Step S304). The data processor 22 reads out the maturity level of the sales activities which is included in the business-transaction history retrieved from the customer database 51.

Based on the customer-management data 150, the access-history data 153 and the business-transaction history, the data processor 22 analyzes the customer behavior, in consideration of the access frequency to the Web server 70, the frequency of shopping, the sales records, contacts with the sales staff, the maturity level of the sales activities toward the customer, etc. (Step S305). As a result of the step S305, the data processor 22 creates the target information 155 (Step S306). The data processor 22 provides the terminal 62 with the target information 155 (Step S307). For example, the output device 93 displays the target information 155 received from the sales-force server 20.

The target information 155 represents the priority level of the business activities toward the customer, and represents also a channel for making contact with the customer. Thus, the terminal 62 can inform the sales staff about the most-preferable time and way to carry out the business activities toward the corresponding customer.

In the process shown in FIG. 54, every time the Web server 70 provides the terminal 63 with a Web page, it sends the access-history data 153 to the sales-force server 20. Otherwise, the Web server 70 collects the access-history data 154 of the corresponding customer and sends the collected data 153 to the sales-force server 20, every time it receives an instruction for making contact with the sales staff from the terminal 63.

Upon reception of the access-history data 153 from the Web server 70, the data processor 22 may execute a process for an information item, defining the tasks to be processed in accordance with the corresponding sales activities.

Figure 55:
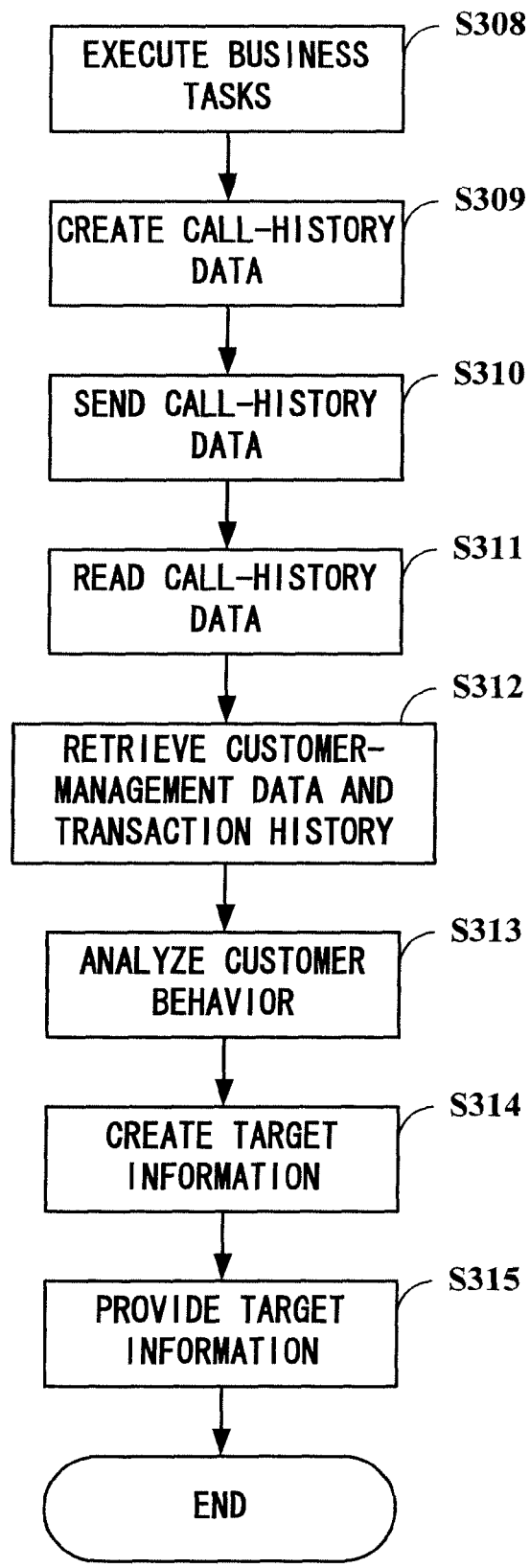
FIG. 55 is a flowchart for explaining a process for managing sales activities, based on the calling history regarding telephone calls from a customer.

The customer may call the call center 72 through the PSTN 73, using a non-illustrative telephone, etc. As long as the terminal 63 is a communications device including a telephony system, the customer may call the call center 72 using the terminal 63. FIG. 55 is a flowchart for explaining a process for managing the sales activities, based on the calling history regarding the telephone calls from the customer.

As shown in FIG. 55, upon reception of a call from the customer, the call center 72 executes various business tasks (Step S308). Every time the call center 72 receives a telephone call from the customer, it creates the call-history data 154 including the data representing the inquiries from the customer (Step S309). The call center 72 stores the call-history data 154 in the recording device 75, and sends the data to the sales-force server 20 (Step S310).

The data processor 22 reads out the call-history data 154 received from the call center 72, in order to specify the customer who has called the call center 72 (Step S311). The data processor 22 retrieves, from the customer database, the customer-management data 150 of the customer specified in the step S311, and the business-transaction history corresponding this customer-management data 150 (Step S312). The data processor 22 reads out the maturity level of the sales activities shown in the business-transaction history retrieved from the customer database 51.

Based on the customer-management data 150, the call-history data 154 and the business-transaction history, the data processor 22 analyzes the customer behavior, in consideration of the access frequency to the call center 72, the frequency of shopping, the sales records, contacts with the sales staff, the maturity level of the sales activities toward the customer, etc. (Step S313). As a result of the step S313, the data processor 22 creates the target information 155 (Step S314). The data processor 22 provides the terminal 62 with the target information 155 (Step S315). As a result of this, the terminal 62 can inform the sales staff about the most-preferable time and way to carry out the business activities toward the corresponding customer.

In the process shown in FIG. 55, every time the call center 72 receives a call from the customer, it sends the call-history data 154 to the sales-force server 20. Otherwise, every time the customer asks the sales staff to visit the customer, the call center 72 gets the call-history data 154 of the customer, and sends the data to the sales-force server 20. Upon reception of the call-history data 154 from the call center 72, the data processor 22 may carry out a process for registering a new business information item in the sales-force database 56.

Figure 56:
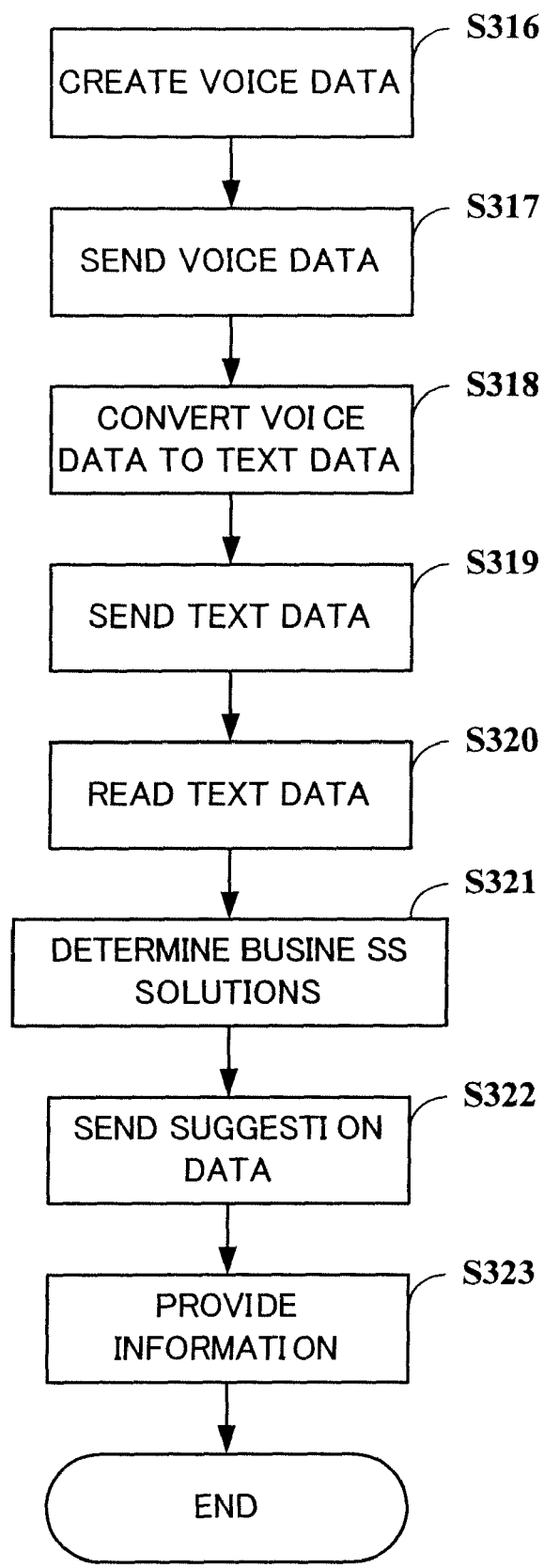
FIG. 56 is a flowchart for explaining a process for providing the terminal with the business solutions created by a central server shown in FIG. 46.

FIG. 56 is a flowchart showing a process for providing the terminal 62 with the business solutions created by the central server 71.

As shown in FIG. 56, the input device 92 encodes the audio signals so as to create audio data, when business activities are done between the customer and sales staff (Step S316). The terminal 62 sends the audio data to the sales-force server 20 (Step S317).

The text converter 33 converts the audio data into text data (Step S318). The text converter 33 sends the text data to the central server 71 (Step S319). The central server 71 reads out the text data sent from the text converter 33 (Step S320). The central server 71 determines the business solutions based on the text data read out in the step S320 (Step S321). The central server 71 creates suggestion data representing the business solutions, and sends the created suggestion data to the terminal 62 having sent the audio data in the step S317 (Step S322).

The terminal 62 provides the sales staff with information corresponding to the suggestion data received from the central server 71 (Step S323).

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A computer network system for facilitating a plurality of sales activities to be performed by at least one sales staff, comprising:
    a tool generator which generates a plurality of sales tools used in an office for selling products;
    a database which sorts data used by said tool generator for generating the plurality of sales tools, based on a plurality of maturity levels corresponding to a progressive level of a business transaction currently being carried out between the at least one sales staff and at least one customer and also on products, and stores the sorted data;
    a terminal which is installed in the office, and supplies said tool generator with data acquired from said database; and
    a sales-force server comprising a tool manager which transmits the data stored in said database to said terminal,
    a plurality of tool lists which are prepared in accordance with one of the plurality of maturity levels which corresponds a progressive level of the business transaction, and store data for managing the plurality of sales tools,
    a data retriever which acquires information representing a total number of sales tools provided to the at least one customer, and updates said plurality of tool lists, and
    a verification processor which verifies validity of the sales tools provided to the at least one customer, based on the data stored in each of the plurality of tool lists.

2. The computer network system according to claim 1, wherein:
    said data retriever calculates a usage frequency of each of the plurality of sales tools, said usage frequency indicating a proportion of a total number of sales tools generated by said tool generator to a total number of sales tools corresponding to the data transmitted by said tool manager; and
    the usage frequency calculated by said data retriever is stored in each of said plurality of tool lists, in association with each of the plurality of sales tools therein.

3. The computer network system according to claim 2, wherein said verification processor deletes data representing any of the plurality of sales tools which corresponds to the usage frequency smaller than a predetermined threshold value.

4. The computer network system according to claim 2, wherein said verification processor assigns a numerical number to each of the plurality of sales tools corresponding to the data stored in said database, in descending order of the usage frequency calculated by said data retriever.

5. The computer network system according to claim 2, wherein said tool manager transmits data corresponding to one or more sales tools whose usage frequency is equal to or greater than a predetermined value.

6. The computer network system according to claim 1, wherein: said terminal creates customer-management data representing a state in which the business transaction is carried out between the at least one customer and the at least one sales staff; and
    said tool manager transmits the data stored in said database to said terminal, upon reception of the customer-management data created by said terminal.

7. The computer network system according to claim 6, wherein the customer-management data represents the maturity level of the business transaction.

8. The computer network system according to claim 7, wherein said tool manager transmits, to said terminal, data representing at least one sales tool corresponding to one maturity level which is higher by one level than the maturity level shown in the received customer-management data.

9. The computer network system according to claim 6, further comprising a customer-data storage which stores the customer-management data created by said terminal, in a state wherein said customer-management data is sorted by maturity level and product.

10. A computer implemented method of facilitating a plurality of sales activities to be performed by at least one sales staff in a business transaction to be achieved between the at least one sales staff and at least one customer, comprising:
    storing data for generating a plurality of sale tools in a database;
sending the data stored in the database to a terminal installed in an office for selling products to the at least one customer, in order to generate the sales tools;
    acquiring, from said terminal, information representing a total number of sales tools provided to the at least one customer;
    verifying validity of the sales tools provided to the at least one customer, based on the acquired information;
    calculating, using the computer, a usage frequency indicating a proportion of a total number of sales tools provided to the at least one customer to a total number of sales tools corresponding to the data transmitted to said terminal, in order to verify validity of each of the sales tools; and
    assigning a numerical number to each of the plurality of sales tools corresponding to the data stored in said database, in descending order of the usage frequency, in order to verify validity of each of the plurality of sales tools;
deleting data representing any of the plurality of sales tools which corresponds to the usage frequency smaller than a predetermined threshold value, from said database; and transmitting data corresponding to one or more sales tools whose usage frequency is equal to or greater than a predetermined value, to said terminal.

11. A computer implemented method of facilitating a plurality of sales activities to be performed by at least one sales staff in a business transaction to be achieved between the at least one sales staff and at least one customer, comprising:

storing data for generating a plurality of sale tools in a database;

sending the data stored in the database to a terminal installed in an office for selling products to the at least one customer, in order to generate the sales tools;

acquiring, from said terminal, information representing a total number of sales tools provided to the at least one customer;

verifying, using the computer, validity of the sales tools provided to the at least one customer, based on the acquired information; and transmitting, to said terminal, the data stored in said database, upon reception of customer-management data representing both one of a plurality of maturity levels indicating a progressive level of the business transaction and also a state in which the business transaction is carried out between the at least one customer and the at least one sales staff.

12. The method according to claim 11, further comprising the step of transmitting, to said terminal, data representing at least one sales tool corresponding to one maturity level which is higher by one level than a maturity level shown in the customer-management data.

13. A non-transitory computer readable medium having stored thereon a program generator that when executed by a computer causes the computer to perform a method for facilitating a plurality of sales activities to be performed by at least one sales staff in a business transaction between the at least one sales staff and at least one customer, said method comprising:

storing data for generating a plurality of sale tools in a database;

sending the data stored in the database to a terminal installed in an office for selling products to the at least one customer, in order to generate the sales tools;

acquiring, from said terminal, information representing a total number of sales tools provided to the at least one customer;

verifying validity of the sales tools provided to the at least one customer, based on the acquired information;

calculating a usage frequency indicating a proportion of a total number of sales tools provided to the at least one customer to a total number of sales tools corresponding to the data transmitted to said terminal, in order to verify validity of each of the sales tools;

assigning a numerical number to each of the plurality of sales tools corresponding to the data stored in said database, in descending order of the usage frequency, in order to verify validity of each of the plurality of sales tools;

deleting data representing any of the plurality of sales tools which corresponds to the usage frequency smaller than a predetermined threshold value, from said database; and transmitting data corresponding to one or more sales tools whose usage frequency is equal to or greater than a predetermined value, to said terminal.

14. A non-transitory computer readable medium having stored thereon a program generator that when executed by a computer causes the computer to perform a method for facilitating a plurality of sales activities to be performed by at least one sales staff in a business transaction between the at least one sales staff and at least one customer, said method comprising:

storing data for generating a plurality of sale tools in a database;

sending the data stored in the database to a terminal installed in an office for selling products to the at least one customer, in order to generate the sales tools; acquiring, from said terminal, information representing a total number of sales tools provided to the at least one customer;

verifying validity of the sales tools provided to the at least one customer, based on the acquired information; and transmitting, to said terminal, the data stored in said database, upon reception of customer-management data representing both one of a plurality of maturity levels indicating a progressive level of the business transaction and also a state in which the business transaction is carried out between the at least one customer and the at least one sales staff.

15. The non-transitory computer readable medium according to claim 14, further comprising:

transmitting, to said terminal, data representing at least one sales tool corresponding to one maturity level which is higher by one level than a maturity level shown in the customer-management data.

* * * * *